(12) United States Patent
Eckert et al.

(10) Patent No.: US 11,561,440 B2
(45) Date of Patent: Jan. 24, 2023

(54) PHOTOALIGNMENT COMPOSITION FOR THE STABILIZATION OF THE PRE-TILT ANGLE IN LIQUID CRYSTAL LAYERS

(71) Applicant: ROLIC TECHNOLOGIES AG, Allschwil (CH)

(72) Inventors: Jean-Francois Eckert, Kientzville (FR); I. -E. Sophie Blattmann, Muttenz (CH); Yuichiro Yamada, Nagoya (JP); Masato Hoshino, Basel (CH); Qian Tang, Oberwil (CH)

(73) Assignee: ROLIC TECHNOLOGIES AG, Allschwil (CH)

( * ) Notice: Subject to any disclaimer, the term of this patent is extended or adjusted under 35 U.S.C. 154(b) by 354 days.

(21) Appl. No.: 16/490,179

(22) PCT Filed: Feb. 27, 2018

(86) PCT No.: PCT/EP2018/054816
§ 371 (c)(1),
(2) Date: Aug. 30, 2019

(87) PCT Pub. No.: WO2018/158254
PCT Pub. Date: Sep. 7, 2018

(65) Prior Publication Data
US 2020/0073181 A1    Mar. 5, 2020

(30) Foreign Application Priority Data

Mar. 3, 2017  (EP) ..................................... 17159210
Apr. 7, 2017  (EP) ..................................... 17165423

(51) Int. Cl.
*G02F 1/1337*   (2006.01)
(52) U.S. Cl.
CPC .. *G02F 1/133788* (2013.01); *G02F 1/133723* (2013.01); *C09K 2323/027* (2020.08)
(58) Field of Classification Search
CPC ......... G02F 1/133723; G02F 1/133788; C09K 2323/027; C09K 2019/0448; C09K 19/56; C09K 19/02; C09K 19/586; C08G 73/0694; C08G 73/18; C08G 73/105; C08G 73/1078; C08G 73/1085; C09D 179/08
See application file for complete search history.

(56) References Cited

U.S. PATENT DOCUMENTS

| | | |
|---|---|---|
| 5,389,698 A | 2/1995 | Chigrinov et al. |
| 5,602,661 A | 2/1997 | Schadt et al. |
| 5,838,407 A | 11/1998 | Chigrinov et al. |
| 6,160,597 A | 12/2000 | Schadt et al. |
| 6,215,539 B1 | 4/2001 | Schadt et al. |
| 6,300,991 B1 | 10/2001 | Schadt et al. |
| 6,369,869 B2 | 4/2002 | Schadt et al. |
| 6,608,661 B1 | 8/2003 | Schadt et al. |
| 6,717,644 B2 | 4/2004 | Schadt et al. |
| 10,160,910 B2 | 12/2018 | Mizusaki |
| 2008/0069974 A1* | 3/2008 | Shin .................. G02F 1/133711 428/1.2 |
| 2010/0266814 A1 | 10/2010 | Bury et al. |
| 2012/0114907 A1 | 5/2012 | Eckert et al. |
| 2014/0024753 A1* | 1/2014 | Tsai .................. C08G 73/1042 524/104 |
| 2017/0058200 A1* | 3/2017 | Eckert ............... G02F 1/133788 |

FOREIGN PATENT DOCUMENTS

| | | | |
|---|---|---|---|
| EP | 1386910 A1 | 2/2004 | |
| EP | 3628054 B1 * | 10/2021 | ......... C08G 73/0694 |
| JP | 2010-256857 A | 11/2010 | |
| JP | 2011-43748 A | 3/2011 | |
| JP | 2014-205659 A | 10/2014 | |
| JP | 2015215591 A * | 12/2015 | |
| TW | 200942598 A | 10/2009 | |
| TW | 201634590 A | 10/2016 | |
| WO | 2009048201 A1 | 4/2009 | |
| WO | 2009080147 A1 | 7/2009 | |
| WO | 2013017467 A1 | 2/2013 | |
| WO | 2013026691 A1 | 2/2013 | |
| WO | WO-2015124483 A1 * | 8/2015 | ......... C08G 73/1025 |
| WO | 2016052285 A1 | 4/2016 | |
| WO | 2016156079 A1 | 10/2016 | |

OTHER PUBLICATIONS

International Search Report dated Oct. 17, 2018, in International Application No. PCT/EP2018/054816.

* cited by examiner

*Primary Examiner* — Sophie Hon
(74) *Attorney, Agent, or Firm* — Sughrue Mion, PLLC

(57) ABSTRACT

The present invention relates to a photoalignment composition for the alignment of liquid crystals and the stabilization of the pre-tilt angle in liquid crystal layers. Further the present invention relates to the liquid crystal alignment film and coating layer prepared from the said composition and the use to fabricate optical and electrooptical elements and devices.

13 Claims, No Drawings

PHOTOALIGNMENT COMPOSITION FOR THE STABILIZATION OF THE PRE-TILT ANGLE IN LIQUID CRYSTAL LAYERS

CROSS REFERENCE TO RELATED APPLICATIONS

This application is a National Stage of International Application No. PCT/EP2018/054816 filed Feb. 27, 2018, claiming priority based on European Patent Application Nos. 17159210.8 filed Mar. 3, 2017 and 17165423.9 filed Apr. 7, 2017.

The present invention relates to novel photoalignment compositions for the alignment of liquid crystals or liquid crystals polymers and for the stabilization of the pre-tilt angle of liquid crystals or liquid crystals polymers.

Liquid crystal devices are used in many different applications. Examples are optical films, in particular polarizing films and retardation films, as well as security devices for preventing forgery, counterfeiting and copying and also liquid crystal displays (LCD).

Liquid crystal displays are currently dominating the field of visualization of electronic information. They have found widespread use in TV, automotive and telecommunication devices, in monitors for computer, laptops and tablet PC's and in smart phones and digital cameras. Recently developed LCD's are characterized by fast response times, wide viewing angles, high luminance and high contrast ratios.

In the preparation of LCD devices the method of alignment of the liquid crystal (LC) molecules plays a crucial role. Usually an alignment layer which defines a direction of orientation for the liquid crystal molecules is used. As a result the longitudinal axes of the liquid crystals become aligned with the direction of orientation defined by the alignment layer. In addition to this directional alignment, for some applications, the alignment layer should also be able to impart to the liquid crystal molecules an angle of tilt, also called pre-tilt angle, so that the molecules align themselves at an angle out of the surface of the alignment layer. The pre-tilt angle has to be kept stable during the preparation and use of the LCD devices. Many factors can influence the stability of pre-tilt angle, one example being ionic contamination. Such ionic contamination sources may be the lack of cleanness of the substrates, or impurities of the liquid crystals, or of alignment material itself or of other chemicals used during the preparation of the LCD devices, such as for example sealants.

Methods for the preparation of these alignment layers are known to the specialists in the field. Conventionally, a thin polymer layer on the LCD glass substrates, mostly a polyimide type polymer, is uniaxially rubbed by a special cloth. However, this method has a series of drawbacks, as for instance the formation of dust which interferes with the integrated electronics and also the formation of scratches which leads to problems in the manufacture of high resolution displays. Furthermore, the rubbing process renders the production of structured alignment layers very difficult.

Such disadvantages can be avoided by replacing the alignment via the rubbing process by the photoalignment method, using a thin polymer layer which is irradiated with polarized light. The polymers in the layer are thereby oriented into one direction and this orientation information is then induced on the adjacent liquid crystal layer. See for example "Photoalignment of Liquid Crystalline Materials: Physics and Applications", by V. G. Chigrinov, V. M. Kozenkov, Hoi-S. Kwok, Wiley-SID Series in Display Technology, John Wiley & Sons, Ltd, 2008, and references cited therein. By way of the photoaligment method, the adjacent liquid crystals can be oriented vertically (VA alignment) or horizontally. Preferred is the vertical alignment of the liquid crystals.

Photoalignment is nowadays an established technology in the production of VA (Vertical Alignment)-LCD's. In order to fulfil the current display performance requirements the alignment materials must satisfy various material characteristics, the most important being:

High voltage holding (retention) ratio (VHR).
Low alignment energy profile (short irradiation time or low irradiation energy).
Reduced AC image sticking.

Concerning voltage retention, an electrical charge is applied to the pixel electrodes during a short time period and subsequently must not be drained away due to the resistance of the liquid crystal material. The ability to hold the charge and avoid the voltage drop is quantified by the so-called "voltage holding ratio" (VHR). It is the ratio of the RMS-voltage (root mean square voltage) at a pixel within one frame period and the initial value of the voltage applied.

Currently most preferred polymer materials for alignment films for the photoalignment method are resins from the class of polyamic acids, polyimides which are derived from the corresponding polyamic acids, resins derived from polysiloxanes or poly(meth)acrylates. These materials are known for their outstanding physical properties, such as heat resistance, affinity to the liquid crystal materials and mechanical strength. Such polymers are said to be photoreactive, if they react upon irradiation with polarized or unpolarized light by orienting themselves into one direction. A photoreactive compound comprises a photoalignment group, as for example a cinnamate group.

Generally a photoalignment composition comprises not only photoreactive polymers and solvents but also other non-photoreactive polymers and additives to fine-tune and optimize the final formulation for manufacturing liquid crystal displays with good performance.

US patent application No. 2010/0266814 A1 describes a photoalignment composition comprising at least (I) one photoreactive polymer that contains photoalignment groups and at least (II) one non-photoreactive polymer that does not contain a photoalignment group. Such compositions are called blends. But there is a growing demand from the display industry to develop more economical and more effective photoalignment compositions for use in liquid crystal displays. The non-photoreactive polymeric compound (II) used in a blend composition should not have any adverse effects on the performance of the final photoalignment composition. Therefore it is required that the photoalignment composition comprising non-photoreactive polymeric compound (II) should maintain very good liquid crystal aligning properties without losing the electrical characteristics, as high voltage holding ratio. Another important requirement is that the non-photoreactive polymeric compound (II) should not destroy the liquid crystal alignment information imparted by the photoreactive polymer.

During LCD fabrication, the LCD cell is filled with liquid crystals using the so-called "one drop filling method". By using this method, the liquid crystals may enter into contact with the uncured material used to seal the LCD cell and the liquid crystals may be contaminated by the uncured sealing material. Contaminated liquid crystals may lose orientation information. This can results in display defects that are ascribable to the liquid crystal contamination. Therefore, there is the constant need to develop photoalignment compositions which further to the requirements described above, are more resistant to liquid crystal contamination by the sealant during the fabrication process.

One type of liquid crystal contamination is high ionic contamination. High ionic contamination may locally destabilize the pre-tilt angle of the liquid crystals. This non-uniform orientation of the liquid crystal layer can result in, inter alia, a luminescence non-uniformity, which is also called "Mura effect". Therefore a photoalignment composition fulfilling all the requirements above and with higher resistance to high ionic contamination is needed.

Surprisingly, the present inventors have found that photoalignment compositions according to the present invention provide very good liquid crystal alignment properties and stabilize the pre-tilt angle of liquid crystals even in cases of ionic contamination. The photoalignment compositions comprise polymers from the class of polyimide and/or polyamic acid comprising repeating structural units (Ia) and/or (Ib) and optionally comprising repeating structural units (IIIa) and/or (IIIb) and at least one photoalignment material. The polymers comprise repeating structural units (Ia) and/or (Ib), wherein the repeating structural units (Ia) and (Ib) are derived from diamines and are represented by formulae

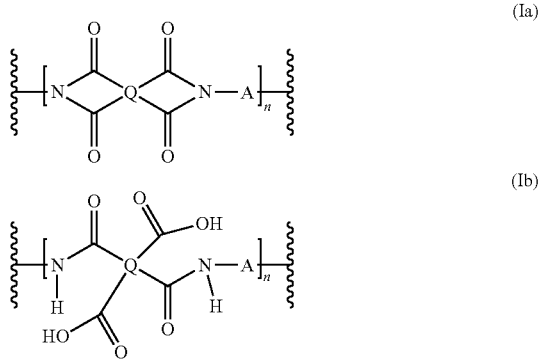

wherein Q is a tetravalent organic residue of a tetracarboxylic dianhydride; and
wherein n is ≥1 and
wherein group A is a divalent organic residue of a diamine and is represented by Formula (II)

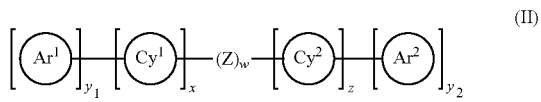

wherein $Ar^1$ and $Ar^2$ are independently from each other unsubstituted or substituted aryl groups of $C_5$-$C_{40}$ atoms; and
wherein $Cy^1$ and $Cy^2$ are independently from each other a substituted or unsubstituted heterocyclic group of $C_5$-$C_{40}$ atoms, wherein at least one C—, CH—, $CH_2$— group in the heterocyclic group is replaced by nitrogen; and
wherein Z is a linking group; and
wherein $y_1$, $y_2$, x and z are independently from each other 0, 1 or 2; and
wherein w is 0, 1, 2, 3 or 4; and
wherein x+z≥1;
with the proviso that A of formula (II) is linked into formula (Ia) and/or (Ib) at least at one $Ar^1$, $Ar^2$, $Cy^1$ or $Cy^2$.

The polymers optionally also comprise repeating structural units of formulae (IIIa) and/or (IIIb)

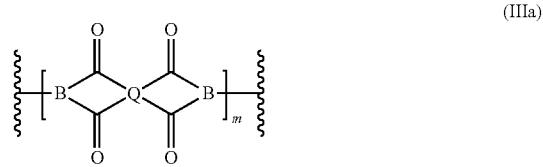

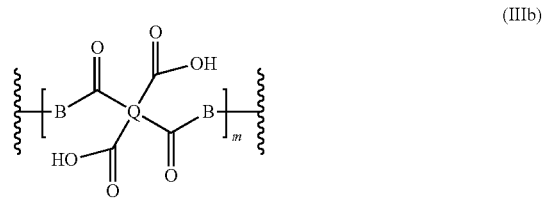

wherein m is ≥1; and
wherein Q has the same meaning as defined above; and
wherein Q can be the same or different than in the compounds of formula (Ia) or (Ib); and wherein B is a divalent diamine residue.

Preferred are polymers comprising repeating structural units of formulae (Ia) and/or (Ib) and comprising repeating structural units of formulae (IIIa) and/or (IIIb).

The mole ratio in the composition between the sum of the monomers of formulae (Ia) and/or (Ib) and the sum of the monomers of formulae (IIIa) and/or (IIIb) is comprised between 0.01:99.99 and 99.99:0.01.

It can also be envisaged that the photoalignment composition comprises polymer containing only repeating structural units of formulae (Ia) and/or (Ib). In case the photoalignment composition comprises said polymer comprising only repeating structural units of formulae (Ia) and/or (Ib), the photoalignment composition must further comprise an additional polymer comprising repeating structural units of formulae (IIIa) and/or (IIIb), preferably comprising only repeating structural units of formulae (IIIa) and/or (IIIb). The mole ratio between the two structural repeating units in the photoalignment composition is also in this case between 0.01:99.99 and 99.99:0.01.

In a preferred embodiment ring systems $Ar^1$ and $Ar^2$ are independently from each other, unsubstituted or substituted carbocyclic ring groups selected from a monocyclic ring of four to six atoms, or at least two adjacent monocyclic rings of five or six atoms, or a fused bicyclic ring system of eight, nine or ten atoms, or a fused tricyclic ring system of thirteen or fourteen atoms.

More preferably aryl groups $Ar^1$ and $Ar^2$ are selected from the group consisting of unsubstituted or substituted furanylene, phenanthrylene, pyrene, naphthylene, anthracene, xylene, toluene and phenylene.

$Ar^1$ and $Ar^2$ may be unsubstituted or mono- or poly-substituted by a halogen atom, a hydroxyl group and/or a polar group like nitro, nitrile or a carboxy group, and/or a cyclic, straight-chain or branched alkyl residue having from 1 to 30 carbon atoms, which is unsubstituted, mono- or poly-substituted by methyl, fluorine and/or chlorine, wherein one or more, preferably non-adjacent —$CH_2$— groups independently may be replaced by a group selected from —O—, —CO—, —CO—O—, —O—CO—, —$NR^a$—, —$NR^a$—CO—, —CO—$NR^a$, $NR^a$—CO—O—, —O—CO—$NR^a$—, —$NR^a$—CO—$NR^a$—, —CH=CH—, —C≡C—, —O—CO—O— and —Si($CH_3$)$_2$—O—Si($CH_3$)

₂—, an aromatic or an alicyclic group, wherein R$^a$ is a hydrogen atom or lower alkyl; and/or an acryloyloxy, alkoxy, alkylcarbonyloxy, alkyloxocarbonyloxy, methacryloyloxy, vinyl, allyl, vinyloxy and/or allyloxy group, having from 1 to 20 carbon atoms, preferably having from 1 to 10 carbon atoms.

Heterocyclic groups Cy$^1$ and Cy$^2$ are independently from each other a substituted or unsubstituted heterocyclic group of C$_5$-C$_4$O atoms, wherein at least one C—, CH—, CH$_2$- group in the heterocyclic group is replaced by at least one nitrogen atom.

In a further aspect of the invention, in Cy$^1$ and Cy$^2$ an additional C—, CH—, CH$_2$— group in the heterocyclic group may be replaced by at least one other atom as for example at least one sulphur atom, at least one oxygen atom, or at least one additional nitrogen atom.

Cy$^1$ and Cy$^2$ may be unsubstituted or mono- or poly-substituted by a halogen atom, a hydroxyl group and/or a polar group like nitro, nitrile or a carboxyl group, and/or a cyclic, straight-chain or branched alkyl residue having from 1 to 30 carbon atoms, which is unsubstituted, mono- or poly-substituted by methyl, fluorine and/or chlorine, wherein one or more, preferably non-adjacent —CH$_2$— groups independently may be replaced by a group selected from —O—, —CO—, —CO—O—, —CO—O—, —O—CO—, —NR$^a$—, —NR$^a$—CO—, —CO—NR$^a$—, —NR$^a$—CO—O—, —O—CO—NR$^a$—, —NR$^a$—CO—NR, —CH=CH—, —C≡C—, —O—CO—O—, and —S—, an aromatic or an alicyclic group, wherein R$^a$ is a hydrogen atom or lower alkyl; and/or an acryloyloxy, alkoxy, alkylcarbonyloxy, alkyloxocarbonyloxy, methacryloyloxy, vinyl, allyl, vinyloxy and/or allyloxy group, having from 1 to 20 carbon atoms, preferably having from 1 to 10 carbon atoms.

More preferably Cy$^1$ and Cy$^2$ may be unsubstituted or mono- or poly-substituted by one or more =O, —OH, methyl, ethyl, propyl, C$_1$-C$_6$ alkoxy, amino, phenyl, tolyl, piperidine fragment, piperidinyl or aniline.

Preferably Cy$^1$ and Cy$^2$ are selected from the group consisting of unsubstituted or mono or poly-substituted pyridine, imidazole, benzimidazole, oxazole, benzoxazole, oxadiazole, thiaoxazole, benzothiazole, benzothioxazole, pyrazole, quinazolinone, pyrimidine, triazine, triazole, pyrimidinone, pteridine, isoindole, quinoline, acridine, carbazole and purine.

More preferably Cy$^1$ and Cy$^2$ are selected from the group consisting of substituted or unsubstituted imidazole, benzimidazole, oxazole, benzoxazole, benzothiazoles, carbazole, oxadiazole, quinazolinone, quinolone, pyrimidine and pyridine.

The term "linking group", as used in the context of the present invention is preferably selected from a single bond, an unsubstituted or substituted, branched or linear alkylene chain of C$_1$-C$_{30}$, preferably C$_1$-C$_8$ alkylene, wherein one or more C-atom may be substituted by a "bridging group"; one or more unsubstituted or substituted alicyclic groups, preferably cyclohexylene, one or more unsubstituted or substituted aromatic groups, such as phenylene; heteroatom; —O—; —CO; -arylen-; —CO—O—; —O—CO—; —N=; CN; —NH—; —NH—CO—; —NR$^{10}$—; —NR$^{10}$—CO—; —CO— NR$^{10}$—; —NR$^{10}$—CO—O—; —O—CO— NR$^{10}$—; —NR$^{10}$—CO—NR$^{10}$—; —CH=CH—; —C≡C—; —O— CO—O— or —S— and wherein:

R$^{10}$ represents a hydrogen atom or C$_1$-C$_6$ alkyl; and wherein with the proviso that oxygen atoms of linking groups are not directly linked to each other.

The term "bridging group" as used in the context of the present invention is selected from single bond, aromatic group, preferably phenylene, aryl group, preferably cyclohexylene and —O—.

Substituents of the substituted straight-chain or branched alkylene chain, of the alicyclic group or of the aromatic group of the linking groups may be one or more and are preferably halogene, such as fluorine, chlorine, bromine, iodine, and preferably fluorine and/or chlorine and more preferably fluorine; or C$_1$-C$_6$ alkoxy, such as preferably methoxy, or trifluoromethyl, or OCF$_3$.

Preferably the linking groups are selected from the group consisting of: single bond, nitrogen, unsubstituted or mono- or poly-substituted C$_1$-C$_8$ alkylene, preferably methylene, ethylene, propylene, butylene or pentylene, unsubstituted or mono- or poly-substituted phenyl, unsubstituted or mono- or poly-substituted naphthalene, unsubstituted or mono- or poly-substituted anthracene, or alkoxy groups.

Group A according to the present invention is a divalent organic residue of a diamine. This divalent organic residue has two linkages to the polyimide or polyamic acid comprising repeating structural units of formulae (Ia) or (Ib). These linkages can occur at any ring Ar$^1$, Ar$^2$, Cy$^1$ or Cy$^2$ and both linkages can occur at the same or at different rings.

Residue A of formula (II) is linked into formula (Ia) and/or (Ib) at least at one Ar$^1$, Ar$^2$, Cy$^1$ or Cy$^2$. This means that the divalent residue A is linked via Ar$^1$ and Ar$^2$, or via Ar$^1$ and Cy$^1$, or via Ar$^1$ and Cy$^2$, or via Cy$^1$ and Cy$^2$, or via Cy$^1$ and Ar$^2$, or via Cy$^1$ and Cy$^2$ or twice linked at Ar$^1$, or twice linked at Cy$^1$ or twice linked at Cy$^2$ or twice linked at Ar$^2$.

Non-limiting examples of the corresponding diamine comprising group the divalent organic residue A, also called H$_2$N-A-NH$_2$, are compounds of formulae (IVa) to (XVIII):

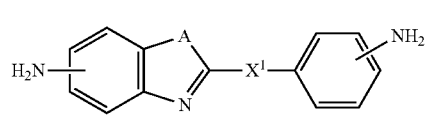

(IVa)

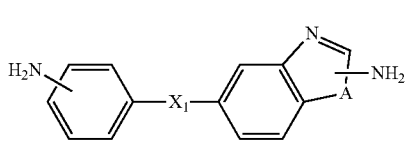

(IVb)

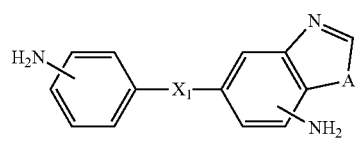

(IVc)

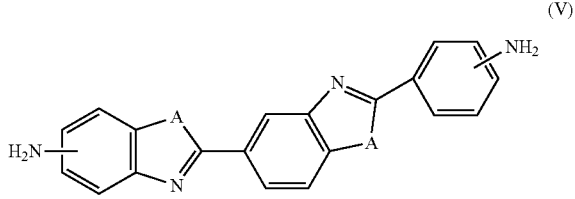

(V)

-continued
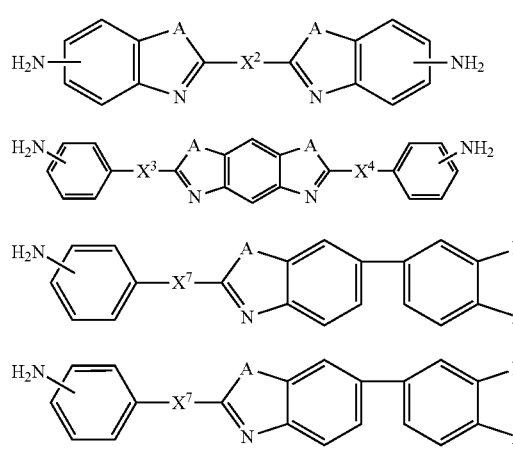
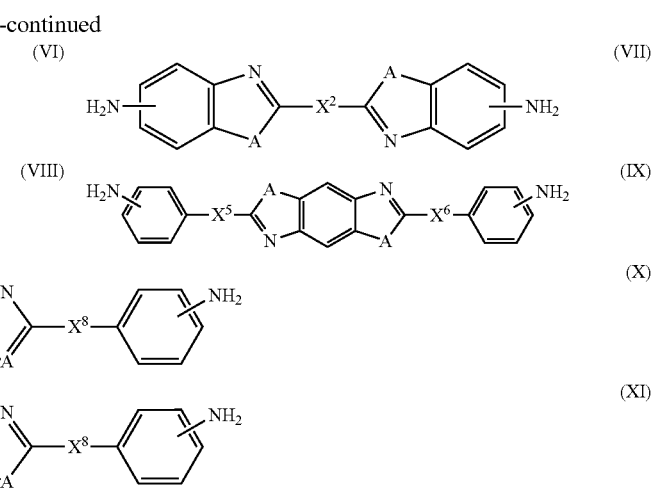
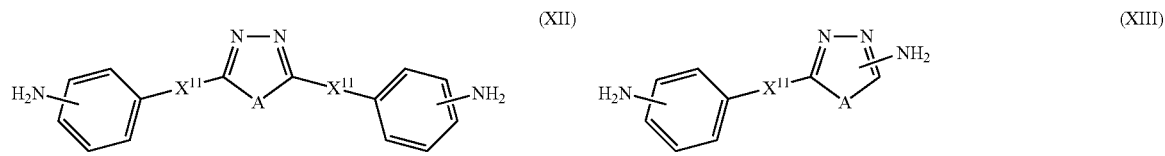
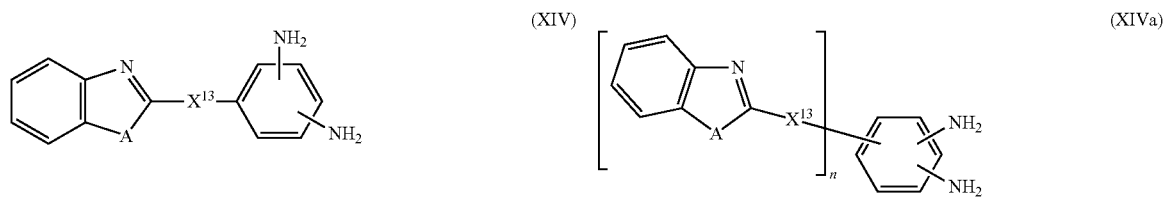
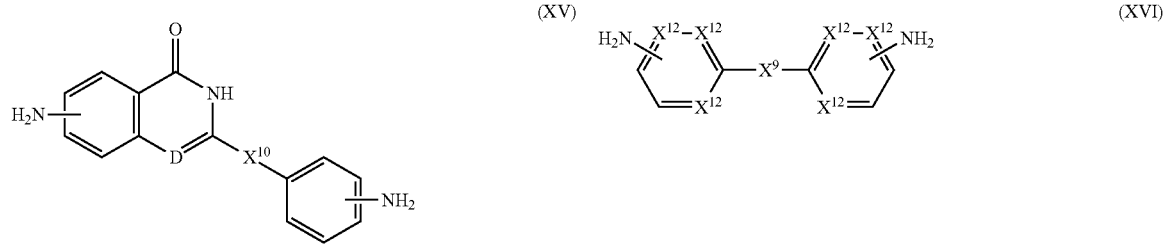
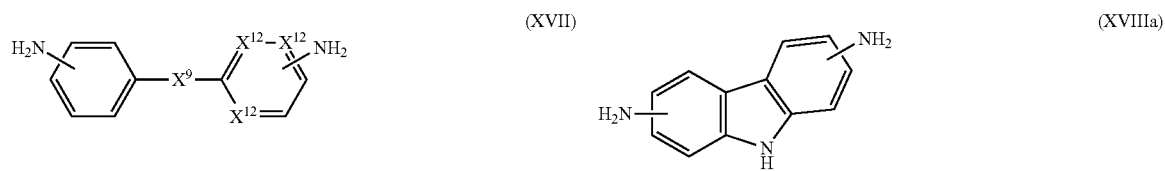

Wherein $X^1$, $X^2$, $X^3$, $X^4$, $X^5$, $X^6$, $X^7$, $X^8$, $X^9$, $X^{10}$, $X^{11}$, $X^{13}$, $X^{14}$ are linking groups as defined above; preferably selected from single bonds or straight-chain or branched, substituted or unsubstituted $C^1$-$C^8$ alkylene groups, wherein one or more C-atom may be substituted by a "bridging group" as defined above; and $X^{12}$ are independently from each other either N or CH, provided that at least one $X^{12}$ is N; and A is selected from NH, $CH_2$, O or S, preferably A is NH, $CH_2$, or O; and wherein n is 0, 1, 2, 3 or 4.

Preferably, $H_2N$-A-$NH_2$ diamines are selected from the following compounds:

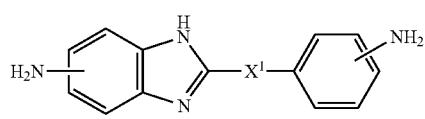 (IVa′)

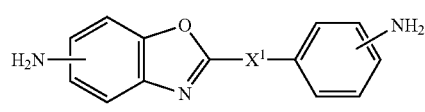 (IVa″)

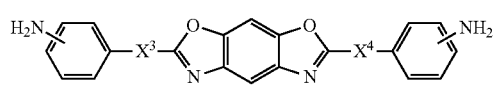 (VIII′)

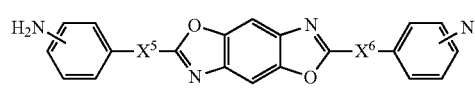 (IX′)

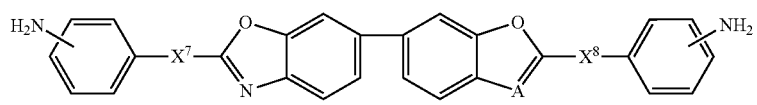 (X′)

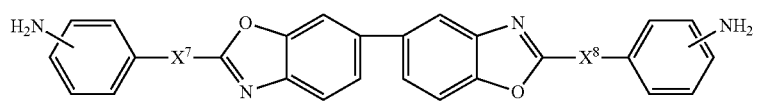 (XI′)

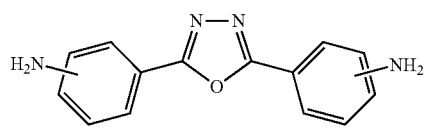 (XII′)

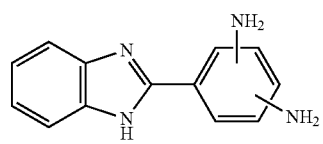 (XIV′)

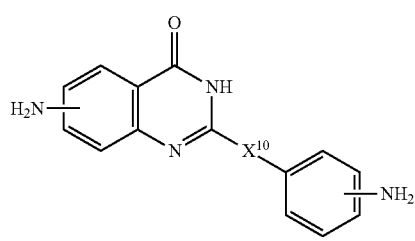 (XV′)

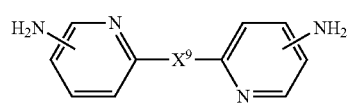 (XVI′)

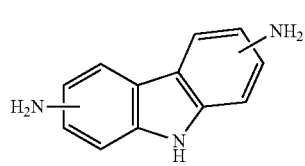 (XVIII′)

or a compound of formulae (VI) or (VII) wherein $X^2$ is a phenyl ring and A is O; or a compound of formula (XVII) wherein two $X^{12}$ are N;

wherein $X^1$, $X^3$, $X^4$, $X^5$, $X^6$, $X^7$, $X^8$, $X^9$ and $X^{10}$ have the same meaning and preferences as described above.

More preferably, $H_2N-A-NH_2$ diamines are compounds of formulae (XIX)-(XXVI):

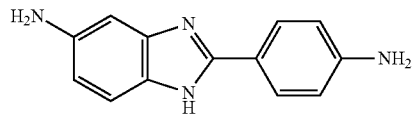

(XIX)

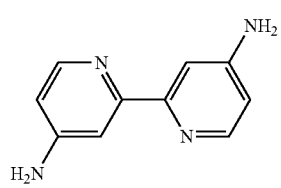

(XX)

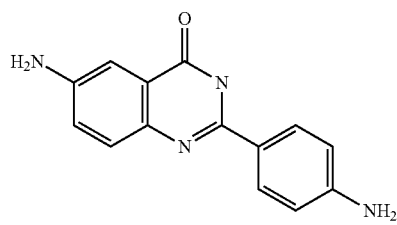

(XXI)

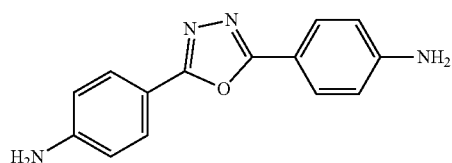

(XXII)

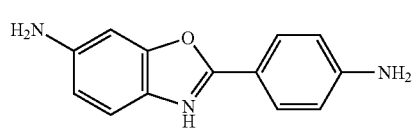

(XXIII)

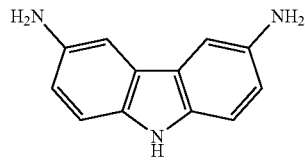

(XXIV)

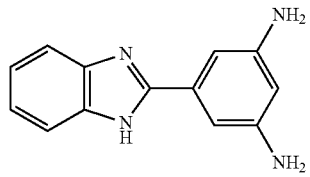

(XXV)

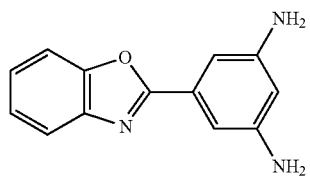

(XXVI)

The tetracarboxylic dianhydrides comprising the tetravalent organic residue comprising residue Q according to the present invention are not especially limited. They include aliphatic tetracarboxylic dianhydrides, cycloaliphatic/alicyclic tetracarboxylic dianhydrides or araliphatic/aromatic tetracarboxylic dianhydrides. Cycloaliphatic/alicyclic tetracarboxylic dianhydrides are preferred. Many of the tetracarboxylic dianhydrides are known to the specialists in the field of liquid crystal alignment materials and are used as monomers or comonomers to prepare liquid crystal alignment films for the rubbing method or the photoalignment technique. They can be used alone or in a combination of two or more. They are represented by the following general Formula (XXVII)

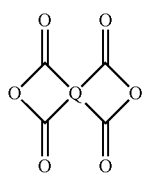

(XXVII)

Examples of aliphatic or cycloaliphatic/alicyclic tetracarboxylic dianhydrides useful in the present invention include:
2,3,5-tricarboxy-cyclopentylacetic-1,2:3,4-dianhydride (all isomers)
1,2,3,4-cyclobutanetetracarboxylic dianhydride;
1,3-dimethyl-1,2,3,4-cyclobutanetetracarboxylic dianhydride;
1,3-dimethyl-1,3-dimethyl-1,2,3,4-cyclobutanetetracarboxylic dianhydride;
1,2,3,4-tetramethyl-1,2,3,4-cyclobutanetetracarboxylic dianhydride;
1,2,3,4-cyclopentanetetracarboxylic dianhydride;
2,3,5-tricarboxycyclopentylacetic dianhydride;
3,5,6-tricarboxynorbornane-2-acetic dianhydride;
2,3,4,5-tetrahydrofuranetetracarboxylic dianhydride;
5-(2,5-dioxotetrahydro-3-furanyl)-3a,4,5,9b-tetrahydronaphtho[1,2-c]furan-1,3-dione;
5-(2,5-dioxotetrahydro-3-furanyl)-5-methyl-3a,4,5,9b-tetrahydronaphtho[1,2-c]furan-1,3-dione;
5-(2,5-dioxotetrahydro-3-furanyl)-5-ethyl-3a,4,5,9b-tetrahydronaphtho[1,2-c]furan-1,3-dione;
5-(2,5-dioxotetrahydro-3-furanyl)-7-methyl-3a,4,5,7a-tetrahydro-2-benzofuran-1,3-dione;
5-(2,5-dioxotetrahydro-3-furanyl)-7-ethyl-3a,4,5,7a-tetrahydro-2-benzofuran-1,3-dione;
5-(2,5-dioxotetrahydro-3-furanyl)-6-methylhexahydro-2-benzofuran-1,3-dione,
6-(2,5-dioxotetrahydro-3-furanyl)-4-methylhexahydro-2-benzofuran-1,3-dione,
5-(2,5-dioxotetrahydrofural)-3-methyl-3-cyclohexene-1,2-dicarboxylic dianhydride;
bicyclo[2.2.2]oct-7en-2,3,5,6-tetracarboxylic dianhydride;
bicyclo[2.2.2]octane-2,3,5,6-tetracarboxylic acid dianhydride;
1,8-dimethylbicyclo[2.2.2]oct-7-ene-2,3,5,6-tetracarboxylic acid dianhydride;
tetrahydro-4,8-methanofuro[3,4-d]oxepin-1,3,5,7-tetrone;
3-(carboxymethyl)-1,2,4-cyclopentanetricarboxylic acid 1,4:2,3-dianhydride;
hexahydrofuro[3',4':4,5]cyclopenta[1,2-c]pyran-1,3,4,6-tetrone;
rel-[1S,5R,6R]-3-oxabicyclo[3.2.1]octane-2,4-dione-6-spiro-3'-(tetrahydrofuran2',5'-dione);

4-(2,5-dioxotetrahydrofuran-3-yl)tetrahydronaphthalene-1,2-dicarboxylicacid dianhydride,
5-(2,5-dioxotetrahydro-furan-3-yl)-3-methyl-3-cyclohexene-1,2-dicarboxylic-acid dianhydride,
4-tert-butyl-6-(2,5-dioxotetrahydro-3-furanyl)-2-benzofuran-1,3-dione;
9-isopropyloctahydro-4,8-ethenofuro[3',4':3,4]cyclobuta[1,2-f][2]benzofuran-1,3,5,7-tetrone;
1,2,5,6-cyclooctanetetracarboxylic acid dianhydride;
octahydro-4,8-ethenofuro[3',4':3,4]cyclobuta[1,2-f][2]benzofuran-1,3,5,7-tetrone;
octahydrofuro[3',4':3,4]cyclobuta[1,2-f][2]benzofuran-1,3,5,7-tetrone;
tetrahydro-3,3'-bifuran-2,2',5,5'-tetrone;
tetrahydro-5,9-methano-1H-pyrano[3,4-d]oxepin-1,3,6,8 (4H)-tetrone.

Examples of aliphatic and aromatic tetracarboxylic dianhydrides useful in the present invention include:
pyromellitic acid dianhydride;
3,3',4,4'-benzophenonetetracarboxylic acid dianhydride;
4,4'-oxydiphthalic acid dianhydride;
3,3',4,4'-diphenylsulfonetetracarboxylic acid dianhydride;
1,4,5,8-naphthalenetetracarboxylic acid dianhydride;
2,3,6,7-naphthalenetetracarboxylic acid dianhydride;
3,3',4,4'-dimethyldiphenylsilanetetracarboxylic acid dianhydride;
3,3',4,4'-tetraphenylsilanetetracarboxylic acid dianhydride;
1,2,3,4-furantetracarboxylic acid dianhydride;
4,4'-bis(3,4-dicarboxyphenoxy)diphenyl sulfide dianhydride;
4,4'-bis(3,4-dicarboxyphenoxy)diphenyl sulfone dianhydride;
4,4'-bis(3,4-dicarboxyphenoxy)diphenylpropane dianhydride;
3,3',4,4'-biphenyltetracarboxylic acid dianhydride;
ethylene glycol bis(trimellitic acid) dianhydride;
4,4'-(1,4-phenylene)bis(phthalic acid) dianhydride;
4,4'-(1,3-phenylene)bis(phthalic acid) dianhydride;
4,4'-(hexafluoroisopropylidene)diphthalic acid dianhydride;
4,4'-oxydi(1,4-phenylene)bis(phthalic acid) dianhydride;
4,4'-methylenedi(1,4-phenylene)bis(phthalic acid) dianhydride;
4-tert-butyl-6-(2,5-dioxotetrahydro-3-furanyl)-2-benzofuran-1,3-dione.

Especially preferred examples of tetracarboxylic dianhydrides useful in the present invention include:
1,2,3,4-cyclobutanetetracarboxylic acid dianhydride;
1,2,3,4-cyclopentanetetracarboxylic acid dianhydride;
2,3,5-tricarboxycyclopentylacetic acid dianhydride;
tetrahydro-4,8-methanofuro[3,4-d]oxepin-1,3,5,7-tetrone;
3-(carboxymethyl)-1,2,4-cyclopentanetricarboxylic acid 1,4:2,3-dianhydride;
hexahydrofuro[3',4':4,5]cyclopenta[1,2-c]pyran-1,3,4,6-tetrone;
5-(2,5-dioxotetrahydrofuran-3-yl)-3-methyl-3-cyclohexene-1,2-dicarboxylic acid dianhydride;
pyromellitic acid dianhydride;
4-(2,5-dioxotetrahydrofuran-3-yl)tetrahydronaphthalene-1,2-dicarboxylic acid dianhydride;
5-(2,5-dioxotetrahydro-3-furanyl)-5-methyl-3a,4,5,9b-tetrahydronaphtho[1,2-c]furan-1,3-dione;
5-(2,5-dioxotetrahydro-3-furanyl)-3a,4,5,9b-tetrahydronaphtho[1,2-c]furan-1,3-dione;
5-(2,5-dioxotetrahydro-3-furanyl)-7-methyl-3a,4,5,7a-tetrahydro-2-benzofuran-1,3-dione;
4-tert-butyl-6-(2,5-dioxotetrahydro-3-furanyl)-2-benzofuran-1,3-dione;
4,4'-(hexafluorneoisopropylidene)diphthalic acid dianhydride and
bicyclo[2.2.2]oct-7-ene-2,3,5,6-tetracarboxylic acid dianhydride;
tetrahydro-5,9-methano-1H-pyrano[3,4-d]oxepin-1,3,6,8 (4H)-tetrone.

The polyimic and/or polyamic acid of comprising the repeating structural unit of formulae (IIIa) and/or (IIIb) comprising a divalent diamine residue B are not especially limited. The repeating structural unit of formulae (IIIa) or (IIIb) represents the polymerized reaction product of a diamine of general formula $H_2N$—B—$NH_2$ and a tetracarboxylic dianhydride as described above. The diamine of formula $H_2N$—B—$NH_2$ does not contain a photoaligning group. The structure of formula $H_2N$—B—$NH_2$ has 6 to 40 C atoms. Said diamines of formula $H_2N$—B—$NH_2$ belong to the classes of aliphatic diamine, cycloaliphatic diamine and/or diamine comprising aryl groups. Many of them are known to the specialists in the field of polymer chemistry and liquid crystal alignment materials and are used as monomers or comonomers to prepare liquid crystal alignment films for the rubbing method or the photoalignment technique. They can be used alone or in a combination of two or more.

Aliphatic diamines are compounds of formula (XXVIII)

$$H_2N\text{-alkylen-}NH_2 \quad (XXVIII)$$

wherein the term "alkylen" has the meaning of $(C_1-C_{24})$ alkylene, preferably $(C_1-C_{12})$ alkylene, which is branched, straight chain, substituted, unsubstituted, uninterrupted or interrupted by a linking group as defined above, or an alicyclic group, such as cyclohexylen or a $C_{17}-C_{40}$ alicyclic group, or —Si($R^3$)$_2$— or —O—Si($R^3$)$_2$—, wherein $R^3$ represents hydrogen, fluorine, chlorine, nitrile, unsubstituted or with fluorine substituted $C_1-C_{12}$alkyl, in which one or more C-atom, —CH= or CH$_2$— group may be replaced by a linking group; preferably hydrogen, methyl or fluorine, and more preferably hydrogen.

Cycloaliphatic diamines are compounds of formulae (XXIX)-(XXX)

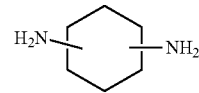
(XXIX)

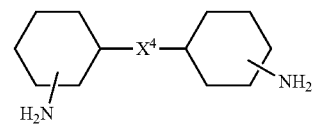
(XXX)

wherein $X^4$ is a linking group as defined above, preferably —COO—, —CONH—; a single bond, —O—, —S—, methylen, ethylen, propylene, more preferably single bond, or, with CF$_3$, OCF$_3$, F, substituted or unsubstituted methylen, ethylen, propylene, butylen or pentylen, and wherein the cyclohexylene groups may be unsubstituted or independently from each other be mono- or poly-substituted by hydrogen, halogen, hydroxyl, a carbocyclic or heterocyclic non-aromatic group or $C_1-C_{30}$ alkyl, which is branched, straight chain, substituted, unsubstituted, uninterrupted or interrupted by a linking group as described above, more preferably by a carbocyclic or heterocyclic non-aromatic group, such as cyclohexylen or a $C_{17}-C_{40}$ alicyclic group, more preferably the cyclohexylen groups may be independently from each other be substituted by halogen or substituted or unsubstituted methylen, ethylen, propylene.

Aromatic diamines or diamines comprising an aryl group are compounds of formulae (XXXI)-(XXXVI).

Compounds of formula (XXXI)

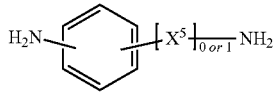
(XXXI)

wherein $X^5$ is a single bond or $C_1$-$C_{30}$ alkyl, and wherein the phenylene ring may be unsubstituted or substituted by hydrogen, halogen, hydroxyl, a carbocyclic or heterocyclic non-aromatic group or $C_1$-$C_{30}$alkyl, and wherein preferably $C_1$-$C_{30}$alkyl is methyl, ethyl, propyl, butyl, pentyl, or the phenylene ring is unsubstituted or substituted by hexyl, 1,1'-cyclohexyl, 4-($C_1$-$C_{30}$ alkyl)-cyclohexyl, 3,4"-bis[4'-($C_1$-$C_{30}$alkyl)-1,1'-bi(cyclohexyl)-4-yl], 1,1'-bi(cyclohexyl)-4-yl, 2-pyridine, pyrrolidine-2,5-dione, which is unsubstituted or substituted by $CF_3$, $OCF_3$, F, benzyl, pentyl, benzoic acid ester, 4-(phenoxycarbonyl), carboxylic acid, —$SO_3H$, —$PO_3H$, —$OR^{15}$, wherein $R^{15}$ is $C_1$-$C_{30}$ alkyl; unsubstituted or substituted benzyl;

or compounds of formula (XXXII)

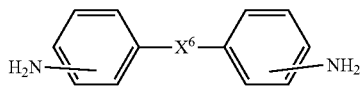
(XXXII)

wherein $X^6$ is a linking group as defined above, and preferably $X^6$ is for example single bond, —O—, —S— or substituted or unsubstituted, straight-chain or branched $C_1$-$C_6$ alkylen, —O—$(CH_2CH_2O)_n$—; —O—$(C_1$-$C_{12}$alkyl)n-O—, —S—$(C_1$-$C_{12}$alkyl)n-S—, triazine, 1,3,5-triazinane-2,4,6-trione, 1,1'-cyclohexylene, $NR^5((C_1$-$C_6$alkyl)$_n$$NR^6$), -(piperidine)$_{n1}$-($C_1$-$C_6$alkyl)$_n$-(piperidine)$_n$, wherein n is an integer from 1 to 6, and n1 is an integer from 0 to 6, preferably X6 is single bond, straight-chain or branched $C_1$-$C_6$ alkylen or —O—; and wherein $R^5$ and $R^6$ each independently from each other represents a hydrogen or $C_1$-$C_6$ alkyl, preferably hydrogen; and wherein the phenylene rings are unsubstituted or substituted by, hydrogen, halogen, hydroxyl, a carbocyclic or heterocyclic non-aromatic group, $C_1$-$C_{30}$alkyl or 2-methylheptane, and wherein $C_1$-$C_{30}$alkyl is preferably methyl, ethyl, propyl, butyl, pentyl, or the phenylene rings are unsubstituted or substituted by hexyl, 1,1'-cyclohexyl, 4-($C_1$-$C_{30}$ alkyl)-cyclohexyl, 3,4"-bis[4'-($C_1$-$C_{30}$alkyl)-1,1'-bi(cyclohexyl)-4-yl], 1,1'-bi(cyclohexyl)-4-yl, 2-pyridine, pyrrolidine-2,5-dione, which is unsubstituted or substituted by $CF_3$, $OCF_3$, F, benzyl, pentyl, benzoic acid ester, 4-(phenoxycarbonyl), carboxylic acid, —$SO_3H$, —$PO_3H$, —$OR^{15}$, wherein $R^{15}$ is $C_1$-$C_{30}$ alkyl; unsubstituted or substituted benzyl;

or compounds of formula (XXXIII)

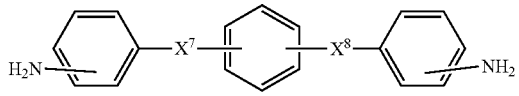
(XXXIII)

wherein $X^7$ and $X^8$ are a linking group as defined above;

or compounds of formula (XXXIV)

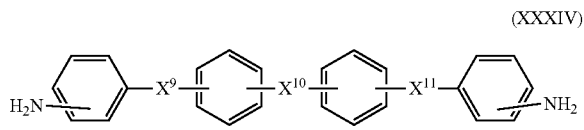
(XXXIV)

wherein $X^9$, $X^{10}$ and $X^{11}$ are a linking group as defined above;

or compounds of formulae (XXXV)

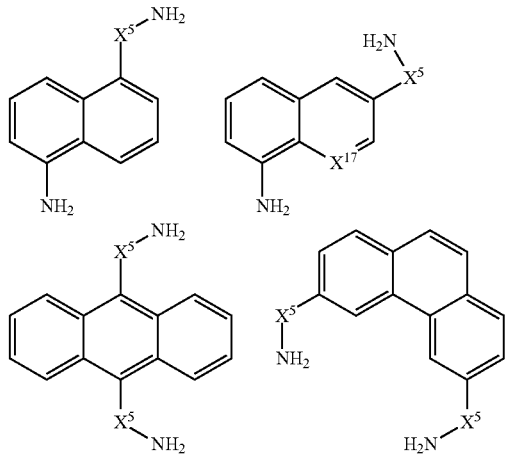

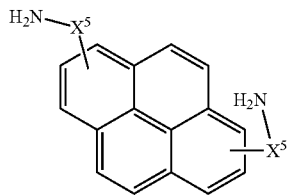

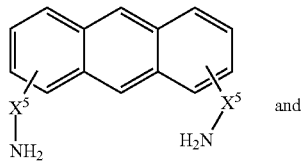

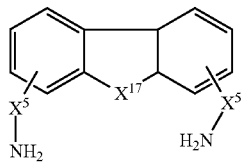

(compounds of formulae XXXV)

wherein $X^5$ has the meaning given above and $X^{17}$ is $CH_2$, O, NH;

or compounds of formula (XXXVI)

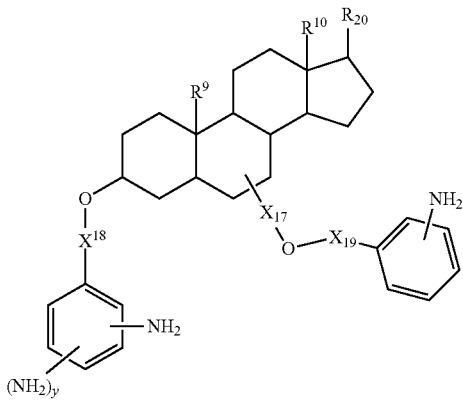

(XXXVI)

Wherein $R^9$ and $R^{10}$ are $C_1$-$C_{30}$alkyl, and preferably methyl, and $R^{20}$ is 2-methylheptane and wherein n and y are 0 or 1 and wherein n is 0, if y is 1 and y is 0 if n is 1, and y1 is a single or a double bond, and $X^{17}$, $X^{18}$ and $X^{19}$ is carbonyl or a single bond or NH; or Preferred compounds of formula (XXXI) are:

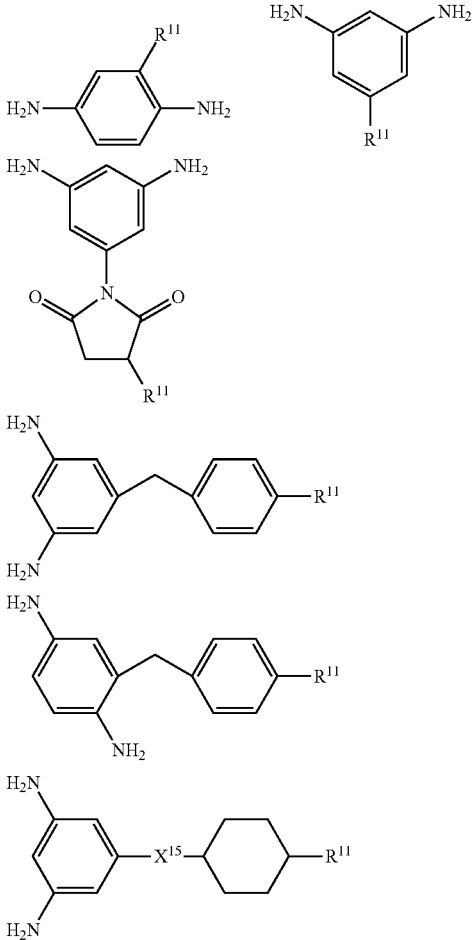

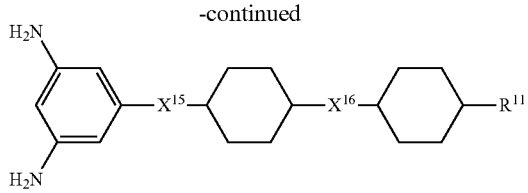

wherein $R^{11}$ is selected from hydrogen, halogen, hydroxyl, a carbocyclic or heterocyclic non-aromatic group, $C_1$-$C_{30}$alkyl or 2-methylheptane, and wherein $C_1$-$C_{30}$alkyl is preferably methyl, ethyl, propyl, butyl, pentyl, or the phenylene rings are unsubstituted or substituted by hexyl, 1,1'-cyclohexyl, 4-($C_1$-$C_{30}$ alkyl)-cyclohexyl, 3,4"-bis[4'-($C_1$-$C_{30}$alkyl)-1,1'-bi(cyclohexyl)-4-yl], 1,1'-bi(cyclohexyl)-4-yl, 2-pyridine, pyrrolidine-2,5-dione, which is unsubstituted or substituted by $CF_3$, $OCF_3$, F, benzyl, pentyl, benzoic acid ester, 4-(phenoxycarbonyl), carboxylic acid, —$SO_3H$, —$PO_3H$, —$OR^{15}$, wherein $R^{15}$ is $C_1$-$C_{30}$ alkyl; unsubstituted or substituted benzyl, preferably $R^{11}$ is methyl, ethyl, propyl, butyl, pentyl or hydroxyl; and wherein $X^{15}$ and $X^{16}$ are independently from each other a single bond or $C^1$-$C^{30}$alkyl, preferably $C^1$-$C^6$ alkyl, —COO— and —CONH—; —COO($C^1$-$C^6$alkylene)-, —CONH($C^1$-$C^6$alkylene)-.

Preferred compounds of formula (XXXII) are

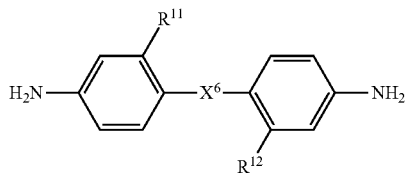

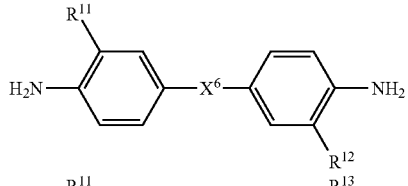

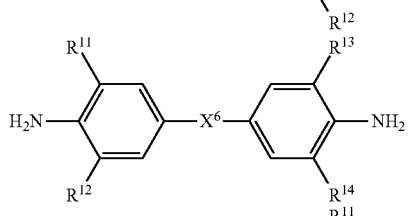

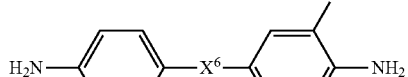

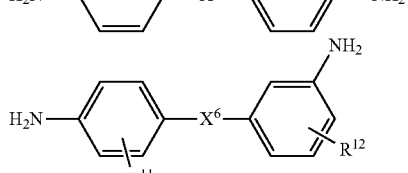

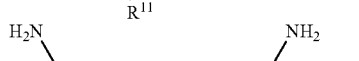

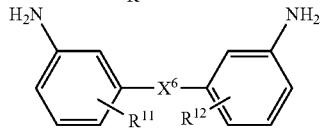

wherein $X^6$ and $R^{11}$ have the same meanings and preferences as described above and wherein $R^{12}$, $R^{13}$ and $R^{14}$ are independently from each other hydrogen, halogen, hydroxyl, a carbocyclic or heterocyclic non-aromatic group or $C_1$-$C_{30}$alkyl, wherein preferably $C_1$-$C_{30}$alkyl is methyl, ethyl, propyl, butyl, pentyl, or the phenylene ring is unsubstituted or substituted by hexyl, 1,1'-cyclohexyl, 4-($C_1$-$C_{30}$ alkyl)-cyclohexyl, 3,4''-bis[4'-($C_1$-$C_{30}$alkyl)-1,1'-bi(cyclohexyl)-4-yl], 1,1'-bi(cyclohexyl)-4-yl, 2-pyridine, pyrrolidine-2,5-dione, which is unsubstituted or substituted by $CF_3$, $OCF_3$, F, benzyl, pentyl, benzoic acid ester, 4-(phenoxycarbonyl), carboxylic acid, —$SO_3H$, —$PO_3H$, —$OR^{15}$, and wherein $R^{15}$ is $C_1$-$C_{30}$ alkyl; unsubstituted or substituted benzyl. Preferably $R^{11}$ and $R^{12}$ are hydrogen, $C_1$-$C_6$alkyl, hydroxy, or 4-($C_1$-$C_{30}$alkyl)-cyclohexyl or 3,4''-bis[4'-($C_1$-$C_{30}$ alkyl)-1,1'-bi(cyclohexyl)-4-yl], preferably $R^{12}$, $R^{13}$ and $R^{14}$ are methyl, ethyl, propyl, butyl, pentyl or hydroxyl.

More preferred compounds of formula (XXXII) are

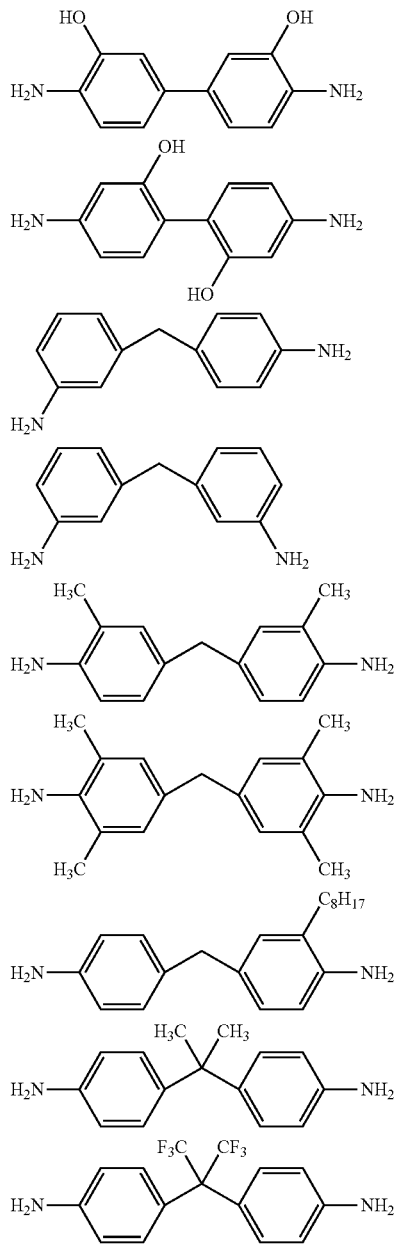

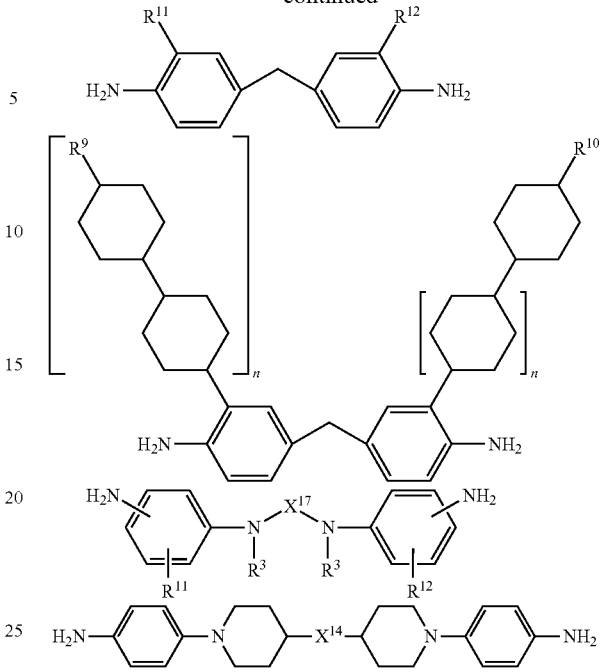

Wherein n is 0 or 1, $R^9$, $R^{10}$, $R^{11}$ and $R^{12}$ have the same meanings as defined above, $X^{17}$ is $CH_2$, O, NH, $R^3$ is hydrogen, halogen or nitrile; unsubstituted or with halogen substituted $C_1$-$C_{12}$alkyl, in which one or more C—, CH—, $CH_2$— group may be replaced by a linking group; preferably $R^3$ is hydrogen, nitrile or fluorine, and more preferably $R^3$ is hydrogen and/or nitrile, and most preferably $R^3$ is hydrogen, and $X^{14}$ is a linking group as defined above, preferably —COO—, —CONH—; a single bond, —O—, —S—, methylen, ethylen, propylene, more preferably single bond, or, with $CF_3$, $OCF_3$, F, substituted or unsubstituted methylen, ethylen, propylene, butylen or pentylen, and wherein the cyclohexylene groups may be unsubstituted or independently from each other be substituted by hydrogen, halogen, hydroxyl, a carbocyclic or heterocyclic non-aromatic group or $C_1$-$C_{30}$ alkyl, which is branched, straight chain, substituted, unsubstituted, uninterrupted or interrupted by a linking group as described above, more preferably by a carbocyclic or heterocyclic non-aromatic group, such as cyclohexylen or a $C_{17}$-$C_{40}$ alicyclic group, more preferably the cyclohexylen groups may be independently from each other be substituted by halogen or substituted or unsubstituted methylen, ethylen, propylene.

Further preferred are 4,4'-diaminodiphenyl, 4,4'-diaminodiphenyl-3,3'-dimethoxy, 4,4'-diaminodiphenyl-3,3'-dimethyl, 4,4'-diaminodiphenyl-3,3'-dihydroxy, 4,4'-diaminodiphenylmethane, 4,4'-diamino-diphenylsulfide, 4,4'-diamino-diphenylsulfone, 4,4'-diaminodiphenylcarbonyl, 4,4'-diaminodiphenyl oxomethylene, 4,4'-diaminodiphenyl-bis(trifluoromethyl)-methylene, 4,4'-diaminodiphenyl-bis(trifluoromethyl)methylene-3,3'-dimethoxy or 4,4'-diaminodiphenyl-bis(trifluoromethyl)methylene-3,3'-dihydroxy, 4,4'-diaminodiphenyl ether, 3,4'-diaminodiphenyl ether, 4,4'-diamino-2,2'-dimethylbiphenyl, 4,4'-(p-phenylene-isopropylidene)bisaniline, 2,2-bis[4-(4-aminophenoxy)phenyl]-hexafluoro-propane, 2,2'-bis[4-4-amino-2-trifluoromethyl-phenoxy-)phenyl)hexafluoropropane, 4,4'-diamino-2,2'-bis/trifluoromethyl)-biphenyl, 4,4'-bis[4-amino-2- trifluoromethyl)phenoxy]-octafluorobiphenyl, 2-amino-4-[1-(3-amino-4-hydroxyphenyl)-1-methyl-ethyl]phenol.

Preferably, $X^7$ and $X^8$, $X^9$ and $X^{10}$ or $X^{11}$ of the compounds of formulae (XXIX) and (XXX) are a single bond or $C_1$-$C_{30}$alkyl or $C_1$-$C_{12}$ alkoxy. Even more preferably, $X^7$ and $X^8$, $X^9$ and $X^{10}$ or $X^{11}$ are independently from each other a single bond, —O-alkoxy-, such as —O— methylen-, methylen-O—; $C_1$-$C_{12}$alkylen such as methylene, ethylen, propylene, butylen, pentylen or hexylen, substituted or unsubstituted 1,1'-cyclohexylene, —SO—, —S—, —SO$_2$—, —O—, —N(R$^{25}$)—, —C(CH$_3$)$_2$—, —C(CF$_3$)$_2$—, 1,1'-cyclohexyl, substituted or unsubstituted 4-(C$_1$-C$_{30}$ alkyl)-cyclohexyl, substituted or unsubstituted 3,4"-bis[4'-(C$_1$-C$_{30}$alkyl)-1,1'-bi(cyclohexyl)-4-yl], 1,1'-bi(cyclohexyl)-4-yl, wherein R$^{25}$ is hydrogen of a $C_1$-$C_6$ alkyl; preferably $X^{10}$ is —SO—, —SO$_2$—, —O—, —N(CH$_3$)—, —C(CH$_3$)$_2$—, —C(CF$_3$)$_2$—, 1,1'-cyclohexyl, 4-(C$_1$-C$_{30}$ alkyl)-cyclohexyl, 3,4"-bis[4'-(C$_1$-C$_{30}$ alkyl)-1,1'-bi(cyclohexyl)-4-yl] or 1,1'-bi(cyclohexyl)-4-yl, and preferably $X^9$ and $X^{11}$ are identical and are methylene, ethylen, propylene, butylen, pentylen, hexylen or —O—;

Preferred compounds of formula (XXXIII) are

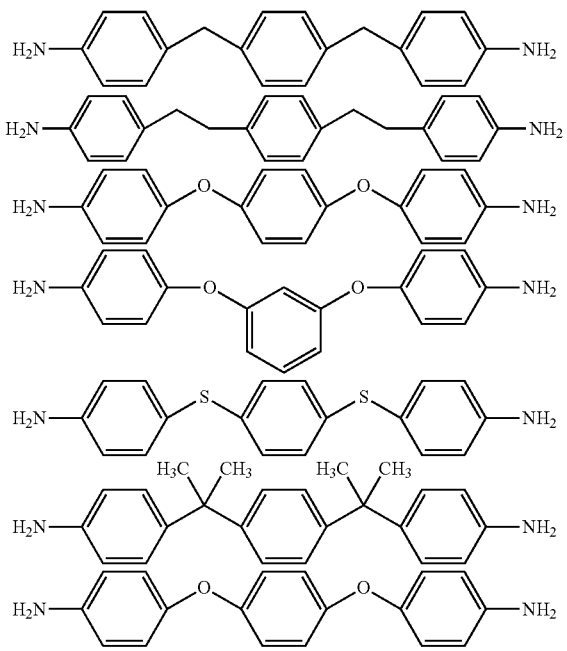

Preferred compounds of formula (XXXIV) are

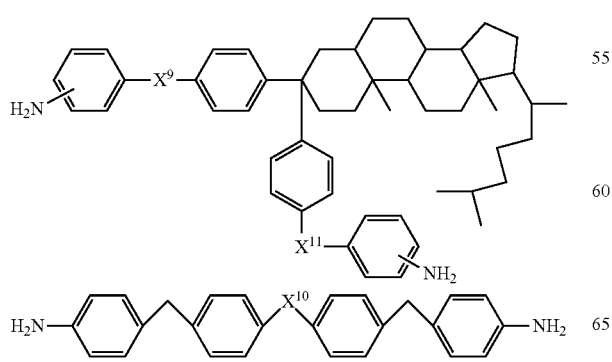

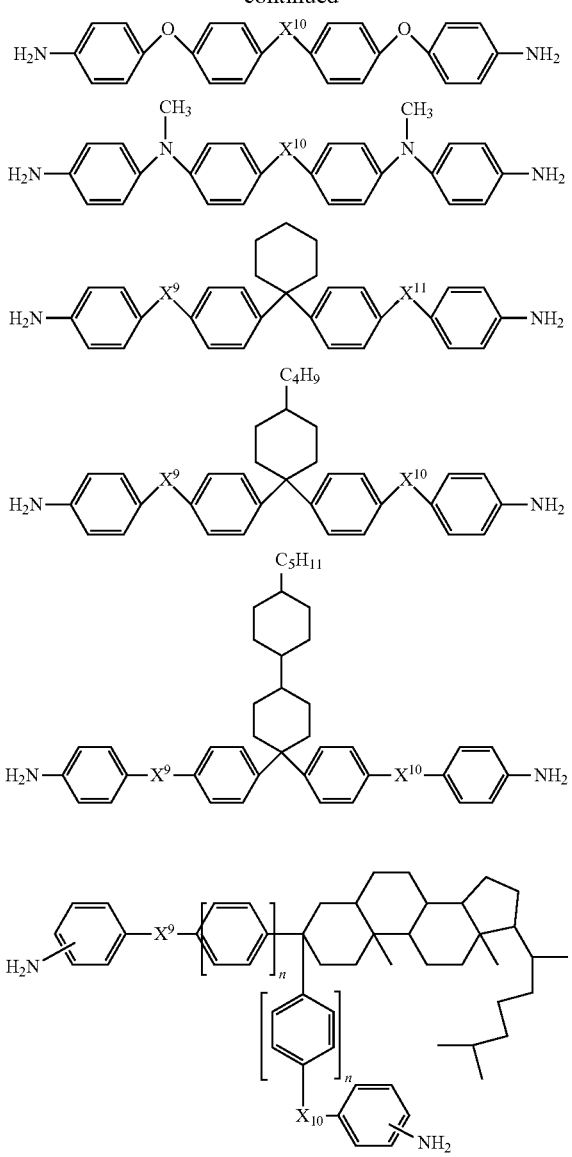

wherein n is 0 or 1 and wherein $X^9$, $X^{10}$ and $X^{11}$ have the same meanings and preferences as described above.

Preferred diamines of formula (XXXVI) are

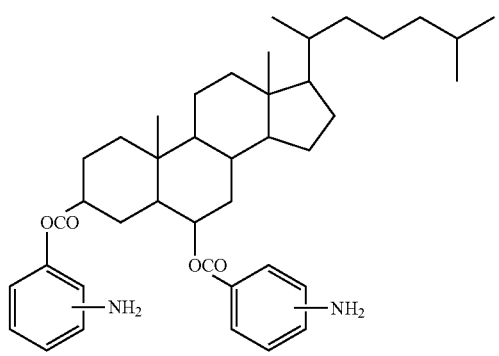

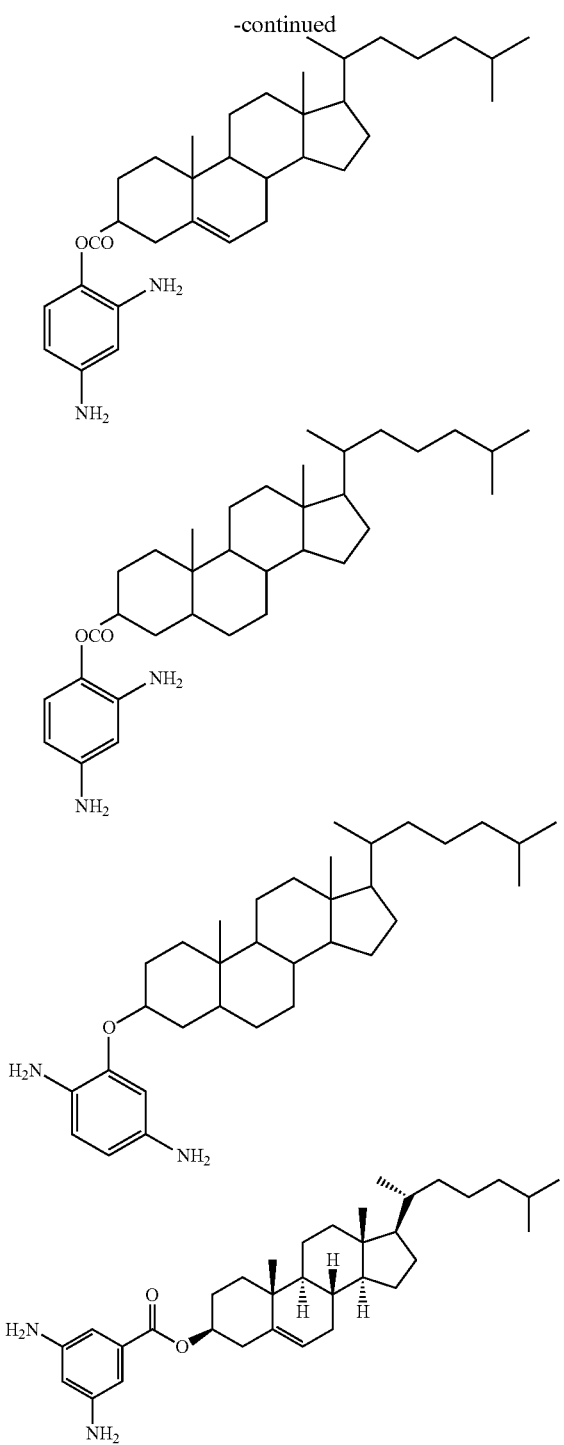

and further, 1-cholesteryl-oxy-2,4-diamino-benzene, 1-cholestanyloxy-2,4-diaminobenzene, cholesteryloxy(3,5-diamino-benzoyl), cholestan-yloxy(3,5-diaminobenzoyl).

The diamines comprising at least one aryl group are preferred.

Examples of aliphatic and cycloaliphatic diamines $H_2N-B-NH_2$ include:
trimethylene diamine;
tetramethylene diamine;
hexamethylene diamine;
octamethylene diamine;
1,4-diaminocyclohexan;
4,4'-methylenebis(cyclohexylamin);
4,4'-methylenebis(2-methylcyclohexylamine);
isophorone diamine;
tetrahydrodicyclopentadienylene diamine;
1,3-adamantanediamine;

Examples of the preferred diamines $H_2N-B-NH_2$ comprising an aryl group include:
1,3-bis(aminomethyl)benzene;
1,4-bis(aminomethyl)benzene;
m-phenylenediamine;
p-phenylenediamine;
1,5-diaminonaphthalene;
4,4'-diaminodiphenyl ether;
3,4'-diaminodiphenyl ether;
4,4'-diaminodiphenyl sulfide;
4,4-diamino-2,2'-dichlorodiphenyl disulphide;
4,4'-diaminodiphenyl sulfone;
3,3'-diaminodiphenyl sulfone;
4,4'-diaminodiphenylmethane;
3,3'-diaminodiphenylmethane;
3,4'-diaminodiphenylmethane;
4,4'-diamino-3,3'-dimethyldiphenyl methane;
4,4'-diaminodiphenylethane;
3,3'-diaminobenzophenone;
4,4'-diaminobenzophenone;
3,4'-diaminobenzophenone;
2,2-bis(4-aminophenyl)hexafluoropropane;
2,2-bis[4-(4-aminophenoxy)phenyl]hexafluoropropane;
2,2-bis[4-(4-aminophenoxy)phenyl]propane;
1,4-bis(4-aminophenoxy)benzene;
1,3-bis(4-aminophenoxy)benzene;
4,4'-diamino-diphenylene-cycylohexane;
3,5-diamino-3'-trifluormethylbenzanilide;
3,5-diamino-4'-trifluormethylbenzanilide;
4,4'-diaminobenzanilide;
2-amino-4-[1-(3-amino-4-hydroxy-phenyl)-1-methyl-ethyl] phenol;
Diaminofluorene derivatives, such as 2,7-diaminofluorene;
9,9-bis(4-aminophenyl)fluorene;
Diaminoanthraquinone derivatives, such as 1,5-diaminoanthraquinone;
Benzidine derivatives such as 4,4'-diaminobiphenyl; 4,4'-Diamino-3,3'-dimethylbiphenyl;
4,4'-diamino-2,2'-dimethylbiphenyl; tetramethylbenzidine; 4,4'-diamino-2,2'-bis(trifluormethyl)biphenyl; 2,2',5,5'-tetrachloro-4,4'-diaminobiphenyl; 2,2'-dichloro-4,4'-diamino-5,5'-dimethoxybiphenyl; 3,3'-dimethoxy-4,4'-diaminobiphenyl;
5-amino-1-(4'-aminophenyl)-1,3,3-trimethylindan;
6-amino-1-(4'-aminophenyl)-1,3,3-trimethylindan;
4,4'-methylene-bis(2-chloroaniline);
4,4'-(p-phenyleneisopropylidene)bisaniline;
4,4'-(m-phenyleneisopropylidene)bisaniline;
bis(4-aminophenoxy)-2,2-dimethylpropane;
1,5-diaminonaphthalene, 2,7-diaminofluorene.

Examples of the more preferred aromatic diamines $H_2N-B-NH_2$ include:
m-phenylenediamine;
p-phenylenediamine;
1,5-diaminonaphthalene;
4,4'-diaminodiphenyl ether;
3,4'-diaminodiphenyl ether;
4,4'-diaminodiphenyl sulphide;
4,4'-diaminodiphenyl sulfone;
4,4'-diaminodiphenylmethane;
4,4'-diaminodiphenylethane;

2,2-bis(4-aminophenyl)hexafluoropropane;
2,2-bis[4-(4-aminophenoxy)phenyl]hexafluoropropane;
2,2-bis[4-(4-aminophenoxy)phenyl]propane;
1,4-bis(4-aminophenoxy)benzene;
1,3-bis(4-aminophenoxy)benzene;
2,7-diaminofluorene;
4,4'-diaminobiphenyl;
4,4'-diamino-3,3'-dimethylbiphenyl;
4,4'-diamino-2,2'-dimethylbiphenyl;
4,4'-(p-phenylenebisisopropylidene)bisaniline;
4,4'-(m-phenylenebisisopropylidene)bisaniline;
bis(4-aminophenoxy)-2,2-dimethylpropane;
2-amino-4-[1-(3-amino-4-hydroxyphenyl)-1-methyl-ethyl]phenol.

Especially preferred aromatic diamines $H_2N$—B—$NH_2$ are:
p-phenylenediamine;
4,4'-diaminodiphenyl ether;
3,4'-diaminodiphenyl ether;
4,4'-diaminodiphenyl sulfide;
4,4'-diaminodiphenylmethane;
4,4'-diaminodiphenylethane;
2,2-bis[4-(4-aminophenoxy)phenyl]propane;
1,4-bis(4-aminophenoxy)benzene;
1,3-bis(4-aminophenoxy)benzene;
4,4'-Diamino-3,3'-dimethylbiphenyl;
4,4'-diamino-2,2'-dimethylbiphenyl;
4,4'-(p-phenylenebisisopropylidene)bisaniline;
4,4'-(m-phenylenebisisopropylidene)bisaniline;
bis(4-aminophenoxy)-2,2-dimethylpropane;
2-amino-4-[1-(3-amino-4-hydroxyphenyl)-1-methyl-ethyl]phenol.

Even more preferred aromatic diamines $H_2N$—B—$NH_2$ are:
4,4'-diaminodiphenyl ether;
3,4'-diaminodiphenyl ether;
4,4'-diamino-2,2'-dimethylbiphenyl;
2-amino-4-[1-(3-amino-4-hydroxyphenyl)-1-methyl-ethyl]phenol.

The photoaligning material according to the present invention is a photoactive compound comprising photoalignment groups. At least one photoaligning material has to be included in the photoalignment composition of the present invention to impart the necessary photoalignment properties. It is understood that the composition may comprise more than one photoaligning material. These different photoaligning materials can differ in the photoalignment group, in the polymerizable group or in both the photoalignment group and the polymerizable group.

Many of the photoaligning materials comprising photoalignment groups are known to the specialists in the field of liquid crystal alignment materials. They are used for the preparation of liquid crystal photoalignment films for the fabrication of optical and electro-optical devices. Such photoaligning materials for the photoalignment method and their application are for instance disclosed in the following publications: O. Yaroshuk, Y. Renikov, J. Mater. Chem., 2012, 22, 286-300 and references cited therein; U.S. Pat. Nos. 5,389,698; 5,838,407; 5,602,661; 6,160,597; 6,369,869; 6,717,644; 6,215,539; 6,300,991 and 6,608,661.

In the context of the present invention "photoalignment groups" are photoactive functional groups which anisotropically absorb light radiation. They induce anisotropic molecular alignment of liquid crystals by irradiation with aligning light, which in most cases consists of polarized light radiation. Upon irradiation, the photoalignment groups as disclosed herein undergo photoreactions, such as photocrosslinking reactions, dimerization reactions, cis/trans isomerization reactions, rearrangement reactions and degradation reactions. Therefore the photoalignment groups of the present invention are functional groups which undergo the above reactions.

Generally photoaligning materials comprising photoalignment groups according to the present invention are monomers, oligomers, dendrimers, prepolymers and polymers including copolymers, where the photoalignment groups comprise photoactive functional groups such as alpha, beta-unsaturated nitrile groups; alpha, beta-unsaturated carbonyl groups, where the carbonyl group can also be part of an ester-, amide, imide, hydrazine or thioester functional group, including cinnamates and chalcones;
coumarines and quinolones;
stilbenes and cyanostilbenes;
azo groups;
chromones and chromenes;
mono- and di-acetylene groups such as diphenylacetylene group;
benzylidenephtalimide group, benzylideneacetophene group, phenylenediacryloyl group;
or
photodegradable polymers,
where these photoactive functional groups can be unsubstituted or comprise substituents such as:
halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

Preferred photoaligning materials comprising photoalignment groups are oligomers, polymers including copolymers, where the photoalignment groups comprise photoactive functional groups such as alpha, beta-unsaturated nitrile groups; alpha, beta-unsaturated carbonyl groups, where the carbonyl group can also be part of an ester-, amide or thioester functional group, including cinnamates and chalcones;
coumarines;
stilbenes and
azo groups,
where these photoactive functional groups can be unsubstituted or comprise substituents such as:
halogen (fluorine, chlorine, bromine); cyano; $C_1$-$C_4$-alkoxy; carboxylic acid; ester groups with linear or branched $C_1$-$C_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

The photoalignment materials according to the present invention may contain one or more different photoaligning groups and one or more different polymerizable groups.

The polymerizable group is a functional group that can be subjected to polymerization (optionally with other comonomers) to yield an oligomer, dendrimer, polymer or copolymer. For a person skilled in the art it will be obvious which functional groups are intended for any specific polymer. Thus for example in case of "imid monomer" as the indicated polymer backbone group it is obvious to a person skilled in the art that the actual monomer units for polymerization to yield a polyimide are e.g. diamines and dianhydrides. Similarly regarding the "urethane monomer" the actual monomer units are diols and diisocyanates.

Accordingly, in the context of the present invention the wording " . . . , and which derives from at least one monomer" has the meaning that the polymerizable group of the monomer of the photoaligning material corresponds accordingly to its polymerized form in the polymer, homo- or copolymer or oligomer.

Hence, the present invention relates preferably to polymer, homo- or copolymer or oligomer comprising a monomer in its polymerised form, wherein polymerizable group denotes the corresponding polymerised group to the described polymerizable groups.

The polymerizable group is preferably selected from unsubstituted or substituted acrylate, methacrylate, 2-chloroacrylate, 2-phenylacrylate, optionally N-lower alkyl substituted acrylamide, methacrylamide, 2-chloroacrylamide, 2-phenylacrylamide, vinyl, allyl, vinyl ether and ester, allyl ether and ester, carbonic acid ester, acetal, urea, maleinimide, norbornene, norbornene derivatives, epoxy, styrene and styrene derivatives, for example alpha-methylstyrene, p-methylstyrene, p-tert-butyl styrene, p-chlorostyrene, siloxane, silane, diamine, imide monomers, amic acid monomers and their esters, maleic acid and maleic acid derivatives, for example, di-n-butyl maleate, dimethyl maleate, diethyl maleate, etc, fumaric acid and fumaric acid derivatives, for example, di-n-butyl fumarate, di-(2-ethylhexyl) fumarate, etc, urethanes or their corresponding homo- and co-polymers.

More preferably the polymerizable group is selected from acrylate, methacrylate, vinyl ether and ester, epoxy, styrene derivatives, siloxane, silane, maleinimide, diamine, norbornene, norbornene derivatives, imide monomers, amic acid monomers and their corresponding homo and copolymers, or an unsubstituted or substituted, aliphatic, aromatic and/or alicyclic diamine group.

Furthermore preferably polymerizable group represents an unsubstituted or substituted, aliphatic, aromatic and/or alicyclic diamine group, siloxane, maleinimide, especially diamine group having from 1 to 40 carbon atoms; wherein the diamine group comprises an aliphatic group, which may comprise one or more heteroatom and/or bridging group; and/or an aromatic group; and/or an alicyclic group.

Accordingly, polymerizable group is preferably selected from unsubstituted or substituted polymerized groups, preferably polyacrylate, polymethacrylate, poly-2-chloroacrylate, poly-2-phenylacrylate, optionally N-lower alkyl substituted polyacrylamide, polymethacrylamide, poly-2-chloroacrylamide, poly-2-phenylacrylamide, polyvinyl, polyallyl, polyvinyl ether and polyester, polyallyl ether and/or ester, polycarbonic acid ester, polyacetal, polyurea, polymaleinimide, polynorbornene, polyepoxy, polystyrene and polystyrene derivatives, for example poly-alpha-methylstyrene, poly-p-methylstyrene, poly-p-tert-butyl styrene, poly-p-chlorostyrene, etc., polysiloxane, polydiamine, polyimide, polyamic acid and their esters, polyamidimide, polymaleic acid and polymaleic acid derivatives, for example, poly-di-n-butyl maleate, poly-dimethyl maleate, poly-diethyl maleate, etc, polyfumaric acid and polyfumaric acid derivatives, for example, poly-di-n-butyl fumarate, poly-di-(2-ethylhexyl) fumarate, etc, poly-urethanes or their corresponding homo- and co-polymers. More preferably the polymerized group D is selected from polyacrylate, polymethacrylate, polyvinyl ether and polyvinyl ester, polyepoxy, polystyrene derivatives, polysiloxane, polydiamine, polynorbornene, polyimide, polyamic acid and their corresponding homo and copolymers, or an unsubstituted or substituted, aliphatic, aromatic and/or alicyclic polydiamine group.

The photoaligning material can be a copolymer wherein at least one repeating structural unit is a photoaligning material as discussed previously and at least one additional repeating structural unit which comprises a non-photoaligning group. The non-photoaligning group is a carbocyclic or heterocyclic aromatic and/or alicyclic or aliphatic group, which is unsubstituted or substituted by an acrylate group, vinyl group, allyl group, epoxy group, maleinimide group, straight-chain or branched $C_1$-$C_{16}$ alkyl group, $C_1$-$C_{16}$ alkylacrylate group, $C_1$-$C_{16}$ alkylvinyl group, $C_1$-$C_{16}$ alkylallyl group, $C_1$-$C_{16}$ alkylepoxy group, $C_1$-$C_{16}$ alkylmaleinimide group, preferably unsubstituted or substituted by $C_1$-$C_{16}$ alkylacrylate group, more preferably by $C_1$-$C_6$ alkylacrylate group.

More preferably the non-photoaligning group is an unsubstituted or substituted steroidal skeleton such as a cholesterol group, which is uninterrupted or interrupted by at least a single heteroatom and/or at least a single linking group as defined above or the non-photoaligning group is a group A as defined above. Preferably, a cholesterol group is cholesteryl, cholestanyl, cholestan. In the context of the present invention the non-photoaligning group may be reactive to heat treatment, and is preferably also a thermic reactive group.

Such kind of copolymers are described in WO2013/017467 which is incorporated here as reference.

Therefore, according to the present invention, the photoaligning material is a homopolymer or a copolymer, wherein the copolymer is a copolymer comprising different photoaligning groups as defined above, or the copolymer comprises one or more photoaligning groups as defined above and one of more non-photoaligning groups as defined above, wherein said non-photoaligning groups can be unsubstituted or substituted steroidal skeleton as defined above and/or groups A as defined above.

Preferred photoactive compounds can be represented by the generic structural formulae (XXXVIIIa) and/or (XXXVIIb):

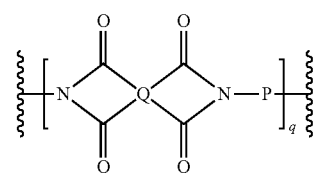

(XXXVIIa)

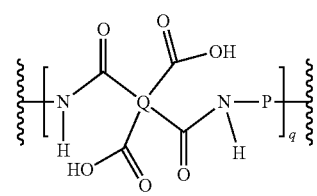

(XXXVIIb)

where Q is a tetravalent organic residue of a tetracarboxylic dianhydride and has the same meaning as explained for the compounds of formulae (Ia) or (Ib) or (IIIa) or (IIIb), q is an integer indicating the number of repeating structural units in the molecular chain; q has a value of at least 1 and has an average value from about 3 to about 15000, especially from 4 to 500, more especially from 6 to 200, and P is the divalent residue of an aromatic diamine comprising the above mentioned photoactive photoalignment groups in the molecular structure. Such photoalignment groups are represented in the following formulae (XXXVIII)-(XLIII). The stars at the ends of the generic molecules indicate the positions where the groups can be built into the residue P.

X in structure (XXXVIII) represents —O—, —S— or NR$^1$, wherein R$^1$ represents a hydrogen atom or a C$_1$-C$_6$-alkyl group.

The photoalignment groups can be linked to the polymer backbone via a single bond, via an ester group, a thioester group, an ether group, a carbonate group, an amide group or a sulfide group. Preferably the photoalignment group is linked to the polymer backbone by using several spacer groups together. The term "spacer group" as used in the context of the present invention is an unsubstituted or substituted aromatic, carbocyclic or heterocyclic group with 6-40 C-atoms or preferably is a cyclic, linear or branched, substituted or unsubstituted C$_1$-C$_{24}$-alkylene group, where one or more non-adjacent —CH$_2$-groups may independently from each other be replaced by a group selected from —O—, —CO—, —CO—O—, —O—CO, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, and —(CH$_3$)$_2$Si—O—Si(CH$_3$)$_2$—, wherein R$^1$ represents a hydrogen atom or a C$_1$-C$_6$-alkyl group.

One, two or three photoalignment groups can be comprised in the divalent diamine residue comprising P.

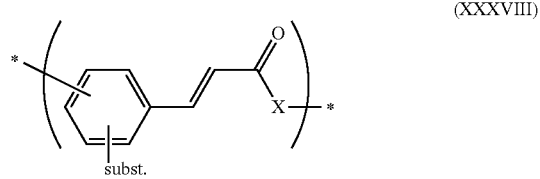

(XXXVIII)

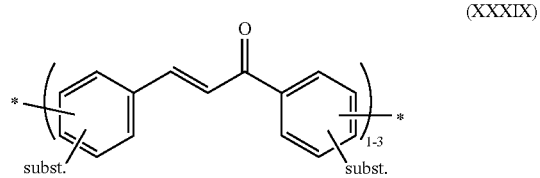

(XXXIX)

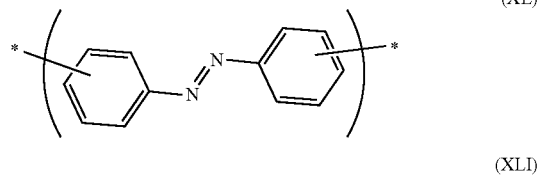

(XL)

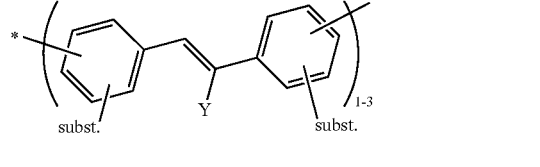

(XLI)

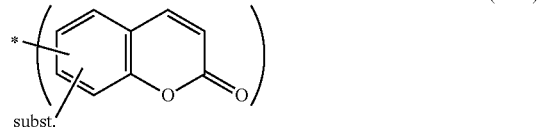

(XLII)

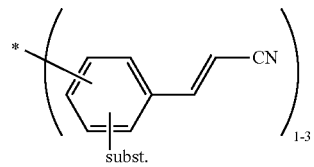

(XLIII)

Structure (XXXVIII) represents a cinnamate group as an example of an alpha, beta-unsaturated carbonyl group, where X includes —O—; —S— or —NR$^1$— with R$^1$ being H or C$_1$-C$_6$-alkyl and subst. stands for substituents such as halogen (fluorine, chlorine, bromine); cyano; C$_1$-C$_4$-alkoxy; carboxylic acid; ester groups with linear or branched C$_1$-C$_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups. Up to 3 such substituents can be comprised in the aromatic moiety of structure (XXXVIII) and the diamine NH$_2$—P—NH$_2$ can carry the structure (XXXVIII) once or twice.

Structure (XXXIX) represents a chalcone group and subst. stands for the same as described for structure (XXXVIII).

Structure (XL) represents an azo group.

Structure (XLI) represents a stilbene group, where Y is H, nitrile (CN) or other electron withdrawing group, and subst. stands for the same as described for structure (XXXVIII).

Structure (XLII) represents a coumarine group, and subst. stands for the same as described for structure (XXXVIII).

Structure (XLIII) represents an alpha, beta-unsaturated nitrile group, and subst. stands for the same as described for structure (XXXVIII).

Especially preferred photoaligning materials are polyimide and/or polyamic acid polymers and copolymers, where the photoalignment groups are chosen from the groups of cinnamates (XXXVIII), azo groups (XL), coumarines (XLII) and stilbenes (XLI). These photoalignment groups can be unsubstituted or comprise substituents such as halogen (fluorine, chlorine, bromine); cyano; C$_1$-C$_4$-alkoxy; carboxylic acid; ester groups with linear or branched C$_1$-C$_{12}$ alkyl, optionally substituted with fluorine or cyano groups; linear or branched alkyl and cycloalkyl groups with 1-12 C atoms, optionally substituted with fluorine or cyano groups; aromatic groups with 6-18 C atoms optionally substituted with the aforementioned groups.

Even more especially preferred photoaligning materials are polyimide and/or polyamic acid polymers and copolymers wherein the photoalignment group is of formula (XLIX)

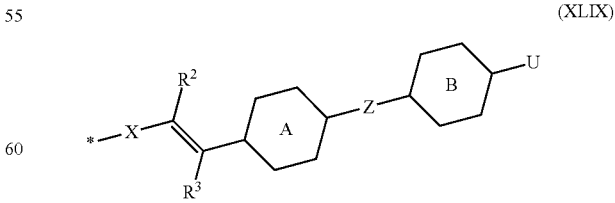

(XLIX)

wherein
Z is a bridging group,
A and B independently from each other represent an unsubstituted or substituted carbocyclic or heterocyclic aromatic or alicyclic group selected from a monocyclic ring of five or six atoms, two adjacent monocyclic rings of five or six atoms, a bicyclic ring system of eight, nine or ten atoms, or a tricyclic ring system of thirteen or fourteen atoms, preferably A and B are benzene or phenylene, pyridine, triazine, pyrimidine, biphenylene, naphthalene, phenanthrene, triphenylene, tetraline which are uninterrupted or interrupted by at least a single heteroatom and/or at least a single bridging group; preferred are benzene, phenylene, naphthalene, biphenylene, phenanthrene, or triphenylen and more preferred are benzene, phenylene and biphenylene, especially phenylene, or a steroidal skeleton; further preferred B is cyclohexylene or a steroidal skeleton;

$R^2$ and $R^3$ are independently from each other hydrogen, halogen or nitrile; unsubstituted or with halogen substituted $C_1$-$C_{12}$ alkyl, in which one or more C—, CH—, $CH_2$— group may be replaced by a linking group; preferably $R^2$ and $R^3$ are independently from each other hydrogen, nitrile or fluorine, and more preferably $R^2$ and $R^3$ are hydrogen and/or nitrile;

U represents hydrogen or a straight-chain or branched, unsubstituted or at least once, with halogen, nitrile, ether, ester, siloxane, amide or amine substituted $C_1$-$C_6$ alkyl group, especially $C_1$-$C_{12}$ alkyl group, more especially $C_1$-$C_6$alkyl group, wherein one or more C—, CH—, $CH_2$— group is independently from each other not replaced or replaced by a linking group within the above given meaning and preferences; especially a C—, CH—, $CH_2$-group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CON$H_3$—, —O—, —CO, —CO—O—, —O—CO—, —CH=CH—, —C≡C—, —O—CO—O—, or unsubstituted or substituted cyclohexylen or unsubstituted or substituted phenylene;

preferably U is hydrogen; or unsubstituted, or with halogen, nitrile, ether, ester, amide or amine; preferably with fluorine or nitrile, especially with 1, 2, 3, 4, 5, 6, 7, 8, 9 or 10, more especially with 1, 2, 3, 4, 5, 6 or 7, and most especially by 1, 2, 3 or 5 fluorine; substituted $Q^1$-($C_1$-$C_6$alkylen), wherein one or more C—, CH—, $CH_2$— group is independently from each other not replaced or replaced by a linking group within the above given meaning and preferences; especially a C—, CH—, $CH_2$— group is replaced by —NH—, —$NCH_3$—, —NH—CO—, —CO—NH—, —NH—CO—O—, —O—CO—NH—, —NH—CONH—, —$NCH_3$—, $NCH_3$—CO—, —CO—$NCH_3$—, —$NCH_3$—CO—O—, —O—CO—$NCH_3$—, —$NCH_3$—CON$H_3$—, —O—, —CO, —CO—O—, —O—CO—, —CH=CH—, —C≡C—, —O—CO—O—, or unsubstituted or substituted cyclohexylen or unsubstituted or substituted phenylene; and wherein $Q^1$ represents a single bond or —NH—, —N($CH_3$)—, —NH—CO—, —CO—NH—, —NH—CO—O—, —O—CO—NH—, —NH—CONH—, —CON($CH_3$)—, —($CH_3$)NCO—, —O—, —CO—, —COO—, —OCO—, —OC$F_2$—, —$CF_2$—O—, —$CF_2$S—, —SC$F_2$—, —$CF_2$NH—, —NHC$F_2$—, —S—, —CS—, —SCS—, —SCO—, —CH=CH—, —C≡C— or —O—CO—O—;

preferably $Q^1$ is —O—, —CO—, —COO—, —OCO— or a single bond more preferably —O— or a single bond;

preferably the fluorine substituents are in the terminal position of the alkyl group, at the opposite side of the linkage to ring B, more preferably the alkyl group is represented or has as terminal group a fluorine alkyl residue of formula —$CF_3$, —$CF_2$H, —$CH_2$F, —$CF_2CF_3$, —$CF_2CHF_2$, —$CF_2CH_2$F, —$CFHCF_3$, —$CFHCHF_2$, —$CFHCH_2$F, —$CF_2CH_3$, —$CFHCHF_2$, —$(CF_2)_2CF_3$, —$(CF_2)_2CHF_2$, —$(CF_2)_2CH_2$F, —$(CF_2)_2CH_3$, —$(CF_2)_3CHF_2$, —$(CF_2)_3CH_2$F, —$(CF_2)_3CF_3$, —$CF(CF_3)_2$ or —$CF_2(CHF)CF_3$, and most preferably of formula —$CF_2$H, —$CF_2$H, —$CH_2$F, —$CF_3$, —$CF_2CF_3$, —$CF_2CHF_2$; and especially most preferably of formula —$CF_3$, —$CH_2$F, —$CF_2CF_3$, especially —$CF_3$;

more preferably U is hydrogen, —$CF_3$, —$CF_2$H, —$CH_2$F, -$Q^1$-($C_1$-$C_6$alkylen)-$CF_3$, -$Q^1$-($C_1$-$C_6$ alkylen)-$CF_2$H, -$Q^1$-($C_1$-$C_6$ alkylen)-$CH_2$F, -$Q^1$-($C_1$-$C_6$ alkylen)-$CF_2CF_3$, -$Q^1$-($C_1$-$C_6$ alkylen)-$CF_2CHF_2$, -$Q^1$-($C_1$-$C_6$ alkylen)-$CF_2CH_2$F, -$Q^1$-($C_1$-$C_6$ alkylen)-$CFHCF_3$, -$Q^1$-($C_1$-$C_6$ alkylen)-$CFHCHF_2$, -$Q^1$-($C_1$-$C_6$ alkylen)-$CFHCH_2$F, -$Q^1$-($C_1$-$C_6$alkylen)-$CF_2CH_3$, -$Q^1$-($C_1$-$C_6$ alkylen)-$CFHCHF_2$, -$Q^1$-($C_1$-$C_6$ alkylen)-$(CF_2)_2CF_3$, -$Q^1$-($C_1$-$C_6$ alkylen)-$(CF_2)_2CHF_2$, -$Q^1$-($C_1$-$C_6$alkylen)-$(CF_2)_2CH_2$F, -$Q^1$-($C_1$-$C_6$alkylen)-$(CF_2)_2CH_3$, -$Q^1$-($C_1$-$C_6$alkylen)-$(CF_2)_3CHF_2$, -$Q^1$-($C_1$-$C_6$alkylen)-$(CF_2)_3CH_2$F, -$Q^1$-($C_1$-$C_6$alkylen)-$(CF_2)_3$ $CF_3$, -$Q^1$-($C_1$-$C_6$alkylen)-$CF(CF_3)_2$, -$Q^1$-($C_1$-$C_6$alkylen)-$CF_2(CHF)CF_3$, wherein one or more C—, CH—, $CH_2$— group is independently from each other not replaced or replaced by a linking group within the above given meaning and preferences; especially a C—, CH—, $CH_2$— group is replaced by —NH—, —$NCH_3$—, —NH—CO—, —CO—NH—, —NH—CO—O—, —O—CO—NH—, —NH—CONH—, —$NCH_3$—, —$NCH_3$—CO—, —CO—$NCH_3$—, —$NCH_3$—CO—O—, —O—CO—$NCH_3$—, —$NCH_3$—CON$H_3$—, —O—, —CO, —CO—O—, —O—CO—, —CH=CH—, —C≡C—, —O—CO—O—, or unsubstituted or substituted cyclohexylen or unsubstituted or substituted phenylene;

wherein -$Q^1$- has the meaning and preferences given above;

$R^2$ and $R^3$ independently from each represent hydrogen, fluorine, chlorine, nitrile, unsubstituted or with fluorine substituted $C_1$-$C_{12}$alkyl, in which one or more C—, CH—, $CH_2$— group may be replaced by a linking group; preferably $R^2$ and $R^3$ are independently from each other represents hydrogen and/or nitrile, preferably hydrogen;

X is a bivalent aromatic group, such as phenylene, especially 1,4-phenylene; or X is —$CH_2$—, —CO—, —CS—, —O(CO)—, —(CO)O—, —NH(CO)—, —(CO)NH—, —OC$F_2$—, —SC$F_2$—, —NH—$CF_2$—, —(($C_1$-$C_6$alkyl)-N)CO—, preferably (($CH_3$)N)CO—, or —S(CS)—, —O(CS), —S(CO) preferably —O(CO)—.

The term "briding group" as used in the context of the present invention is preferably selected from —O—, —CO—, —CH(OH)—, —$CH_2$(CO)—, —$OCH_2$—, —$CH_2$O—, —O—$CH_2$—O—, —COO—, —OCO—, —OC$F_2$—, —$CF_2$O—, —$CF_2$—, —CON($C_1$-$C_{16}$alkyl)-, —($C_1$-$C_{16}$alkyl)NCO—, —CONH—, —NHCO—, —HNOCO—, —OCONH—, —NHCONH—, —OCOO—, —CO—S—, —S—CO—, —CSS, —SOO—, —OSO—, —SOS—, —SO—, —$CH_2$(SO)—, —$SO_2$—, —CH=CH—, —C≡C—, —CH=CH—COO—, —OCO—CH=CH—, —CH=N—, —C($CH_3$)=N—, —N=N—, or a single bond; or a cyclic, straight-chain or branched, substituted or unsubstituted $C_1$-$C_{24}$alkylen, wherein one or more C-atom, CH— or $CH_2$-group may independently from each other be replaced by a linking group.

Preferably, the bridging group is —O—, —CO—, —COO—, —OCO—, —OCOO—, —OC$F_2$—, —$CF_2$O—, —CON($CH_3$)—, —($CH_3$)NCO—, —CONH—, —NHCO—, —CO—S—, —S—CO—, —CSS, —SOO—, —OSO—, —CSS—, —SOO—, —OSO—, —CH$_2$(SO$_2$)—, —CH$_2$—CH$_2$—, —OCH$_2$—, —CH$_2$O—, —CH═CH—, —C≡C—, —CH═CH—COO—, —OCO—CH═CH—, or a single bond.

More preferably bridging group is —COO—, —OCO—, —OCOO—, —OCF$_2$—, —CF$_2$O—, —CON(CH$_3$)—, —(CH$_3$)NCO—, —CONH—, —NHCO—, —CO—S—, —S—CO—, —CS—S—, —SOO—, —OSO, especially —COO—, —OCO—, —OCF$_2$—, —CF$_2$O—, —CON(CH$_3$)—, —(CH$_3$)NCO—, —CONH—, —NHCO— or a single bond.

Most preferred bridging group is a single bond, —COO— or —OCO—.

More especially preferred photoaligning materials are polyimide and/or polyamic acid polymers and copolymers wherein the photoaligning groups are cinnamate groups and its derivatives, especially those of formulae:

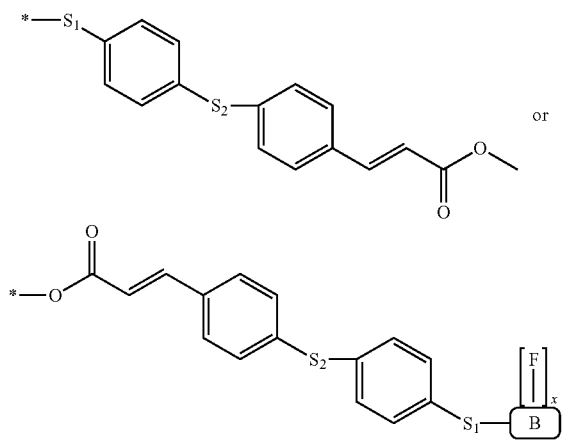

and more especially those of formulae:

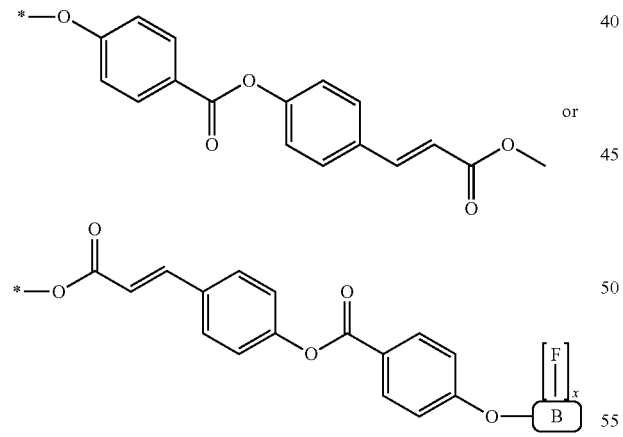

wherein the aromatic rings are unsubstituted or substituted and wherein the compound residue (L)

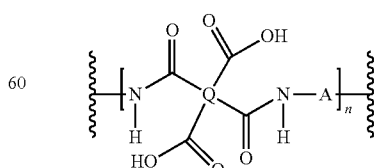

(L)

represents a straight-chain or branched $C_1$-$C_{16}$fluoralkyl group, wherein

F is fluorine, and x is an integer from 0 to 15, preferably an integer from 0 to 10; more preferably 0, 1, 2, 3, 4, 5, 6, 7, 8 or 9 and most preferred 0 or 3, 4, 5 or 7;

B represents a straight-chain or branched $C_1$-$C_{16}$alkyl group, which is in addition to its fluorine substituent(s) unsubstituted or substituted by di-($C_1$-$C_{16}$alkyl)amino, $C_1$-$C_6$alkoxy, nitro, cyano and/or chlorine; and wherein one or more —CH$_2$— group may independently from each other be replaced by a linking group; $S_1$ and $S_2$ independently from each other denote a bridging group as defined above.

The amount of the photoaligning material in the photoaligning composition is 0.001 to 30% by weight, preferably 0.01 to 20%, preferably 1 to 20%, 0.05 to 15%, more preferably 0.1 to 10%, especially more preferred 0.1 to 7%, 3% to 6%, or 3% to 4% by weight relative to the total non-volatile part of the composition. The most preferred amount of the photoaligning material is 3%, 4%, 5%, 6%, 7%, 8%, 9%, 10%, 11%, 12%, 13%, 14% or 15% by weight relative to the total non-volatile part of composition.

In the context of the present invention, it is understood that a photoaligning material may contain one or more different photoalignment groups, meaning that the photoaligning material of the claimed composition can be a copolymer.

It is envisaged by the present invention that the photoalignment composition may contain more than one photoaligning polymer or copolymer.

In a further embodiment, the photoalignment formulation of the present invention comprises:

a) at least one photoalignment material comprising a photoalignment group selected from the group consisting of: cinnamate group, stilbene group, cyanostilbene group, coumarine group, quinolone group, azo group, chalcone group, mono- and di-acetylene groups; benzylidenephtalimide group, benzylideneacetophene group, phenylenediacryloyl group; chromone group; chromene group and stilbazole group; wherein said photoalignment group can be substituted or unsubstituted; and b) at least one polyimide and/or polyamic acid compound comprising repeating structural units represented by formulae (Ia) or (Ib)

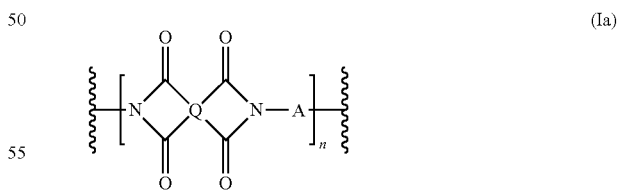

wherein Q is a tetravalent organic residue of a tetracarboxylic dianhydride; and wherein n is ≥1; and
wherein
A is represented by formula (II)

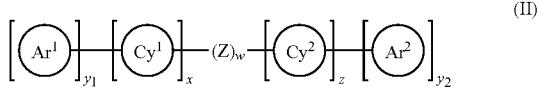

wherein Ar$^1$ and Ar$^2$ are independently from each other unsubstituted or substituted aryl groups of $C_5$-$C_{40}$ atoms; and wherein Cy$^1$ and Cy$^2$ are independently from each other a substituted or unsubstituted heterocyclic group of $C_5$-$C_{40}$ atoms, wherein at least one C—, CH—, CH$_2$— group in the heterocyclic group is replaced by nitrogen;

wherein Z is a linking group; and wherein y, x and z are independently from each other 0, 1 or 2; and wherein w is 0, 1, 2, 3 or 4; and wherein x+z≥1; and comprising repeating structural units of formulae (IIIa) and/or (IIIb)

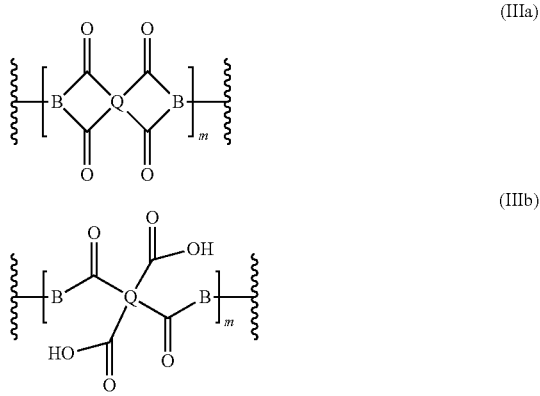

Wherein m is ≥1; and wherein Q has the same meaning as defined above; and wherein Q in the compounds of formula (IIIa) or (IIIb) can be the same or different than in the compounds of formula (Ia) or (Ib); and wherein B is a divalent diamine residue; and wherein the mole ratio in the composition between the monomer of formula (Ia) or (Ib) and the monomer of formula (IIIa) or (IIIb) is comprised between 0.01:99.99 and 99.99:0.01; and c) a solvent or solvent mixture; and d) optionally at least one additive.

The compound b) is a polymer comprising an acid anhydride structural unit derived from a tetracarboxylic acid dianhydride, an amine structural unit derived from a diamine carrying at least one nitrogen-containing heterocycle and an amine structural unit derived from a diamine as described before.

According to the present invention, if several different anhydride structural units and/or several different diamine structural units are present or several different structural units comprising different groups A or different groups B, the compound b) is called a copolymer.

Furthermore the main chain molecular structure of the compound b) comprises repeating amic acid units of formula (Ib) or (IIIb) and imide units of formula (Ia) or (IIIa), whereby the imide units are derived from primarily formed amic acid units by a cyclisation reaction with concomitant cleavage of water molecules. The ratio of amic acid units to imide units depends on the reaction conditions, but generally high temperatures have to be applied to evoke cyclisation or additionally dehydrating agents such as acetic anhydride have to be used. Under the standard conditions of the polymer synthesis at relatively low temperatures of about −10° C. to 80° C. the first copolymer compound is obtained mainly in the polyamic acid form.

In the context of the present invention the term "polyimide" has the meaning of partially or completely imidized polyamic acid or polyamic ester. In analogy, the term "imidisation" has in the context of the present invention the meaning of partially or complete imidisation.

The polymer compound b) is formed by polymerizing at least one tetracarboxylic dianhydride carrying at least one divalent residue A of formula (II) and optionally one or several tetracarboxylic diadnhydride carrying at least one divalent diamine residue B.

Due to the nature of the polymerization reaction, polymer chains with different numbers (n+m) of repeating structural units of formulae (Ia) and/or (Ib) and (IIIa) and/or (IIIb) are obtained, leading to a distribution of chain lengths, and taking into account the different molecular weights of the A, B and Q residues, to a distribution of polymer molecular weights. Although it is possible to measure this distribution with gel permeation chromatography (GPC), it is more convenient to determine the intrinsic viscosity [η] of a 0.5% by weight solution of the polymer compound as a relative measure of the average molecular weight. The intrinsic viscosity [η] should be in the range of 0.01-10 dL/g, preferably in the range of 0.20-5.0 dL/g, even more preferably in the range of 0.20-1.0 dL/g, especially more preferably 0.20-0.85 dL/g, especially more preferably 0.30-0.85 dL/g, or 0.35 dL/g, 0.4 dL/g, 0.45 dL/g, 0.5 dL/g, 0.55 dL/g, 0.6 dL/g, 0.65 dL/g, 0.7 dL/g, 0.75 dL/g or 0.80 dL/g. More preferred is an intrinsic viscosity of 0.50 dL/g, 0.51 dL/g, 0.52 dL/g, 0.53 dL/g, 0.54 dL/g, 0.55 dL/g, 0.56 dL/g, 0.57 dL/g, 0.58 dL/g, 0.59 dL/g or 0.60 dL/g.

The average sum (n+m) of repeating structural units is an integer of 2 to 15000 repeating units, especially from 5 to 250, more especially from 6 to 100 repeating units.

If the molecular weight of polymeric compound b) is too small, that means if (n+m) is below 5, the derived alignment film or coating layer from the composition shows inferior electrical, thermal and mechanical properties. If (n+m) is greater than 200, the viscosity of the inventive composition becomes too high, making the handling and further application very difficult.

The diamines carrying at least one group of formula (II) comprise at least one nitrogen-containing heterocycle in the molecular structure. They can be used alone or in a combination of two or more.

The polyimide and/or polyamic acid polymeric compounds b) may be prepared by methods known to the specialists in the field of polymer chemistry and liquid crystal alignment materials. These compounds are preferably synthesized by reacting at least one tetracarboxylic dianhydride of formula (LI)

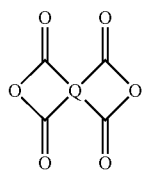

(Formula LI)

with at least one diamine carrying a group of formulae (Ia) or (Ib) or (IIIa) or (IIIb) and optionally one or several divalent diamines residue B according to the meaning and preferences described above, in an organic solvent or solvent mixture. The amount of the diamine carrying a group of formula (Ia) or (Ib) in the polymeric compound b) compound is at least 0.01% by mol relative to the total mol of all diamines in the photoalignment formulation.

The proportion of anhydride functional groups relative to amine functional groups used in the synthesis can be chosen at will, but will to a certain extent determine the average molecular weight of the resulting copolymer compound, as for instance expressed by its intrinsic viscosity [η]. Preferably the ratio of anhydride molecular equivalents relative to amine molecular equivalents will be in the range of 0.75 to 1.25.

The type of organic solvent or solvent mixture may be the same as or different from the solvent used in the preparation of the photoalignment composition of the present invention. It is not particularly limited as long as the primarily formed polyamic acid is dissolved. Preferred are aprotic polar solvents having a high dielectric constant and high polarity but lacking acidic hydrogen atoms, such as N-methyl pyrrolidone, N-ethyl pyrrolidone, N,N-dimethylacetamide, N,N-dimethylformamide, dimethylsufoxide, tetramethylurea, hexamethylphosphoric acid triamide or gamma-butyrolactone. Especially preferred are N-methyl pyrrolidone, N-ethyl pyrrolidone, N,N-dimethylacetamide or mixtures of N-methyl pyrrolidone and/or N-ethyl pyrrolidone with gamma-butyrolactone.

The amount of solvent or solvent mixture is not particularly limited. Preferably it is chosen within the range of about 99% by weight to 60% by weight, with respect to the total amount of reaction mixture (solvents+dianhydrides+diamines). It is convenient to choose the amount of solvent to allow for easy handling of the polyamic acid solution and also perform the subsequent preparation of the photoalignment composition of the present invention without having to adjust the polymer concentration by e.g. additional evaporation of solvents prior to mixing with the other components.

The polymer synthesis is conducted at a temperature of −20° C. to about 150° C., preferably at a temperature of −10° to 120° C., more preferably at a temperature of −10° C. to 80° C., with the reaction time being preferably in the range of 30 minutes to 48 hours.

The initially formed reaction product is mainly in the form of a polyamic acid, derived from the ring opening addition of the amine groups to the cyclic anhydride groups. It may be used as it is to directly prepare the photoalignment composition of the present invention, or the copolyamic acid compound a) can be isolated in solid form by precipitation of the polymer solution into a non-solvent such as water or methanol, followed by drying the collected solid polymer under reduced pressure. The procedure of dissolving the polyamic acid in a solvent and precipitating with a non-solvent can be repeated when a further purification is needed. When the alignment composition according to the present invention has been coated or printed onto a substrate to provide an alignment layer for the photoalignment of liquid crystals, a heat treatment step in the temperature range of 80° C. to 230° C. is usually necessary in order to convert most of the polyamic acid structures to polyimide structures.

Alternatively it is also possible to convert the initially formed polyamic acid solution to a polyimide solution, either partly or entirely, prior to the preparation of the inventive composition, by heating it to a temperature of 80° C. to 200° C. and/or by adding a dehydrating agent such as for example acetic anhydride or trifluoroacetic anhydride. The dehydrating cyclisation reaction may also be catalysed by tertiary amines such as triethylamine, N-ethyl diisopropylamine or pyridine. By using these cyclisation procedures it is possible that some of the imide rings are actually in the form of an isoimide structure.

The polyimide copolymer prepared as described above may be used as it is to directly prepare the photoalignment composition of the present invention, or the polyimide copolymer can be isolated in solid form by precipitation of the polymer solution into a non-solvent such as water or methanol, followed by drying the collected solid polymer under reduced pressure. The procedure of dissolving the polyimide in a solvent and precipitating with a non-solvent can be repeated when a further purification is needed.

In addition to adjust the proper average molecular weight of the polyimide and/or polyamic acid copolymer via the ratio of anhydride molecular equivalents relative to amine molecular equivalents it may be advantageous to add a terminal chain modifier, also called chain stopper, during the polymer synthesis. If the first copolymer contains amine end groups due to a stoichiometric excess of diamine, a monofunctional anhydride may be used in addition to the dianhydride. If the first copolymer contains anhydride end groups due to a stoichiometric excess of dianhydride, a monofunctional amine may be used in addition to the diamine.

The amount of terminal chain modifier is preferably in the range of 10% by weight or less with respect to the total amount of dianhydride and diamine used in the synthesis. Examples of terminal chain modifiers are monofunctional anhydrides, such as succinic anhydride, maleic anhydride, phthalic anhydride, n-decyl succinic anhydride, n-dodecyl succinic anhydride, n-tetradecyl succinic anhydride and n-hexadecyl succinic anhydride. Other terminal modifiers are monoamines, such as aniline, n-butylamine, cyclohexylamine, n-pentylamine, n-hexylamine, n-heptylamine, n-octylamine, n-nonylamine, n-decylamine, n-undecylamine and n-dodecylamine.

One further embodiment according to the present invention are copolymeric compounds according to the present invention in the form of block copolymers comprising recurring block units:

... [Block B]$_b$ ... [Block C]$_c$ ...

Where Block B comprises prepolymerized recurring structural units from at least one molecular type of dianhydride

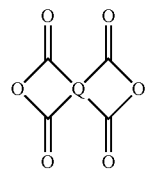

and at least one molecular type of divalent diamine according to formulae (Ia) and/or (Ib)

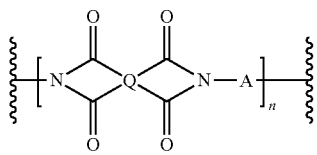
(Ia)

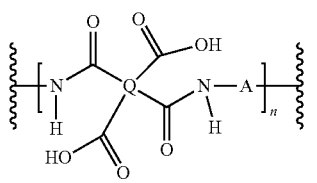
(Ib)

and Block C comprises prepolymerized recurring structural units from at least one molecular type of dianhydride

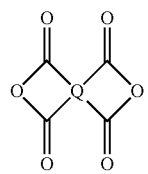

and at least one molecular type of divalent diamine of formulae (IIIa) and/or (IIIb)

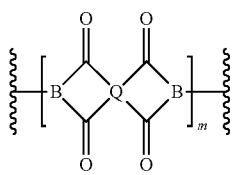
(IIIa)

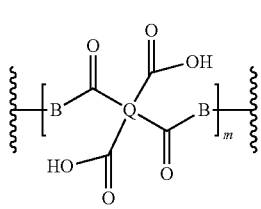
(IIIb)

Where b and c are integers indicating the number of recurring block units in the polymer chain and n and m are integers indicating the number of recurring structural units in block B and block C, such that b*n+c*m is a value of 10 to 1000.

The block copolymers . . . [Block B]$_b$ . . . [Block C]$_c$ . . . can be prepared by several methods known in the art. In one method (Method A) a first Block (e.g. Block B) is prepolymerized by reacting a first dianhydride and a first diamine in a solvent or solvent mixture, using a stoichiometric molar excess of either dianhydride or diamine. In case of a dianhydride excess the first Block will contain anhydride end groups in the prepolymer chain. In case of a diamine excess the first Block will contain amine end groups in the prepolymer chain.

The second dianhydride and the second diamine of the second Block (e.g. Block C) are then added to the reaction solution of the prepolymerized first Block and reacted to provide the second Block, whereby the stoichiometric molar excess of the second dianhydride or the second diamine will be chosen according to the following:

i) if the first Block contains anhydride end groups due to an excess of first dianhydride, then the second diamine for the second Block will be used in a molar excess. This will lead to amine end groups in the second Block ii) if the first Block contains amine end groups due to an excess of first diamine, then the second dianhydride for the second Block will be used in a molar excess. This will lead to anhydride end groups in the second Block.

When the second Block with amine end groups is formed according to i) it will react at the same time with the first Block containing anhydride end groups to yield the compound (I) as a block copolymer.

When the second Block with anhydride end groups is formed according to ii) it will react at the same time with the first Block containing amine end groups to yield the compound (I) as a block copolymer.

A terminal chain modifier may be used in order to restrict the average molecular weight of the compound (I) in the same way as described above for the non-block polymers.

In another method (Method B) a first Block (e.g. Block B) is prepolymerized by reacting a first dianhydride and a first diamine in a solvent or solvent mixture, using a stoichiometric molar excess of either dianhydride or diamine. In case of a dianhydride excess the first Block will contain anhydride end groups in the prepolymer chain. In case of a diamine excess the first Block will contain amine end groups in the prepolymer chain. A second Block (e.g. Block C) is then separately prepared by reacting a second dianhydride with a second diamine in a solvent or solvent mixture, using a stoichiometric molar excess of either dianhydride or diamine. In case of a dianhydride excess the second Block will contain anhydride end groups in the prepolymer chain. In case of a diamine excess the second Block will contain amine end groups in the prepolymer chain. The first Block is then reacted with the second Block to yield the compound (I) in the form of a block polymer, under the proviso that i) if the first Block contains anhydride end groups the second Block should contain amine end groups and ii) if the first Block contains amine end groups the second Block should contain anhydride end groups.

Both Methods A and B are equally useful for preparing the compound b) as a block polymer, but Method A is preferred due to its simplicity and economical advantage.

The preferred photoreactive compounds from the class of polyimide and/or polyamic acid oligomers and polymers including copolymers may be prepared by methods known to the specialists in the field of polymer chemistry or of liquid crystal alignment materials. They are preferably synthesized by reacting at least one tetracarboxylic dianhydride

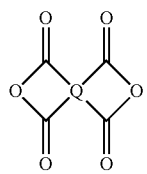

with at least one diamine H$_2$N—P—NH$_2$ comprising photoalignment groups in the molecular structure in an organic solvent or solvent mixture.

The proportion of anhydride functional groups relative to amine functional groups used in the synthesis can be chosen at will, but will to a certain extent determine the average molecular weight of the resulting photoactive polymer compound, as for instance expressed by its intrinsic viscosity [η]. Preferably the ratio of anhydride molecular equivalents relative to amine molecular equivalents will be in the range of 0.75 to 1.25.

The type of organic solvent or solvent mixture is not particularly limited as long as the primarily formed photoaligning polyamic acid is dissolved. Preferred are aprotic polar solvents having a high dielectric constant and high polarity but lacking acidic hydrogen atoms, such as N-methyl pyrrolidone or N-ethyl pyrrolidone and gamma-butyrolactone. Especially preferred are N-methyl pyrrolidone and N-ethyl pyrrolidone or mixtures of N-methyl pyrrolidone and/or N-ethyl pyrrolidone with gamma-butyrolactone.

The amount of solvent or solvent mixture is not particularly limited. Preferably it is chosen within the range of about 99.9% by weight to 60% by weight, with respect to the total amount of reaction mixture (solvents+dianhydride+diamine). It is convenient to choose the solvent amount in order to allow easy handling of the polyamic acid solution and also perform the subsequent preparation of the photoalignment composition of the present invention without having to adjust the polymer concentration by e.g. additional evaporation of solvents prior to mixing with the other components.

The polymer synthesis is conducted at a temperature of −20° C. to about 150° C., preferably −10° C. to 120° C., more preferably at −10° C. to 80° C., with the reaction time being preferably in the range of 30 minutes to 48 hours.

The initially formed reaction product is mainly in the form of a polyamic acid, derived from the ring opening addition of the amine groups to the cyclic anhydride groups. It may be used as it is to directly prepare the photoalignment composition of the present invention, or the polyamic acid compound (II) can be isolated in solid form by precipitation of the polymer solution into a non-solvent such as water or methanol, followed by drying the collected solid polymer under reduced pressure. The procedure of dissolving the polyamic acid in a solvent and precipitating with a non-solvent can be repeated when a further purification is needed. When the alignment composition using the polyimide and/or polyamic acid compound and the photoactive compound comprising photoalignment groups according to the present invention has been coated or printed onto a substrate to provide an alignment layer for the photoalignment of liquid crystals, a heat treatment step in the temperature range of 80° C. to 230° C. is usually applied in order to convert most of the polyamic acid structures to polyimide structures.

Alternatively it is also possible to convert the initially formed polyamic acid solution of the photoactive compound to a polyimide solution, either partly or entirely, prior to the preparation of the inventive composition, by heating it to a temperature of 80° C. to 200° C. and/or by adding a dehydrating agent such as acetic anhydride or trifluoroacetic anhydride. The dehydrating cyclisation reaction may also be catalysed by tertiary amines such as triethylamine, N-ethyl diisopropylamine or pyridine. By using these cyclisation procedures it is possible that some of the imide rings are actually in the form of an isoimide structure.

The polyimide compound prepared as described above may be used in the form of its polymer solution to directly prepare the photoalignment composition of the present invention, or the polyimide compound can be isolated in solid form by precipitation of the polymer solution into a non-solvent such as water or methanol, followed by drying the collected solid polymer under reduced pressure. The procedure of dissolving the polyimide in a solvent and precipitating with a non-solvent can be repeated when a further purification is needed.

In addition to adjust the proper average molecular weight of the polyimide and/or polyamic acid compound via the ratio of anhydride molecular equivalents relative to amine molecular equivalents it may be advantageous to add a terminal chain modifier, also called chain stopper, during the polymer synthesis. If the photoactive compound contains amine end groups due to a stoichiometric excess of diamine a monofunctional anhydride may be used in addition to the dianhydride. If the photoactive compound contains anhydride end groups due to a stoichiometric excess of dianhydride a monofunctional amine may be used in addition to the diamine.

The amount of terminal chain modifier is preferably in the range of 10% or less with respect to the total amount of dianhydride and diamine used in the synthesis.

Examples of terminal chain modifiers are monofunctional anhydrides, such as succinic anhydride, maleic anhydride, phthalic anhydride, n-decyl succinic anhydride, n-dodecyl succinic anhydride, n-tetradecyl succinic anhydride and n-hexadecyl succinic anhydride. Other terminal modifiers are monoamines, such as aniline, n-butylamine, cyclohexylamine, n-pentylamine, n-hexylamine, n-heptylamine, n-octylamine, n-nonylamine, n-decylamine, n-undecylamine and n-dodecylamine.

The sum of weights of the photoalignment compound a) and of the compound b) relative to the total weight of the formulation of the present invention is 0.5% to 30% by weight, preferably 1% to 20% by weight, more preferably 2% to 10% by weight, even more preferably up to 9% by weight, or by 8% by weight, or by 7% by weight, or by 6% by weight, or by 5% by weight, or by 4% by weight, or by 3% by weight.

Preferably, the photoalignment composition according to the present invention is in the form of a solution. The solvent or solvent mixture used in the present application may be of any kind as long as it can dissolve the photoalignment composition and is providing essential properties such as good handling performance, good storage stability, adequate viscosity and good coatability or printability of the solution onto the substrate material.

Non-limiting examples of solvents or solvent mixtures (referred to as c) in the photoalignment composition of the further embodiment of the invention) for the composition of the present invention comprise solvents from the groups of (i) aprotic polar solvents such as N-methyl pyrrolidone; N-ethyl pyrrolidone; N-vinyl pyrrolidone; N,N-dimethyl formamide; N,N-dimethyl acetamide; 1,3-dimethyl-2-imidazolidinone; dimethylsulfoxide.

(ii) ester solvents such as methyl acetate; ethyl acetate; n-propyl acetate; isopropyle acetate; n-butyl acetate; isobutyl acetate; n-amyl acetate; isoamyl acetate; isopropyl propionate; n-butyl propionate; n-pentyl propionate; isobutylpropionate; isobutylisobutyrate; 2-ethylhexylacetate; propylene glycol monomethyl ether acetate; propylene glycol monoethyl ether acetate; propylene glycol monobutyl ether acetate; 1-methoxypropylacetate; 2-hydroxy ethyl acetate; 2-hydroxy ethyl propionate; 2-hydroxy-2-methyl ethyl propionate; cyclohexanol acetate; propylenglycol diacetate; dipropylenglycol methyl ether acetate; 1,4-butanediol diacetate; 1,6-hexanediol diacetate; butyl cellosolve acetate; ethyl lactate; n-propyl lactate; isopropyl lactate; methyl 3-methoxypropionate; methyl 3-ethoxypropionate; ethyl 3-methoxypropionate; ethyl 3-ethoxypropionate.

(iii) lactones such as gamma-butyrolactone; caprolactone.

(iv) ketones such as acetone; methyl ethyl ketone; methyl propyl ketone; methyl isobutyl ketone; 2-heptanone; 3-heptanone; 4-heptanone; methyl isoamyl ketone (2-methyl-5-hexanone); diisobutyl ketone; 5-methyl-3-heptanone; 2-octanone; isophorone; mesityl oxide; cyclohexanone; 3,3,5-trimethylcyclohexanione; cyclopentanone.

(v) carbonates such as diethylcarbonate, dipropylcarbonate, methyl-propylcarbonate.

(vi) glycols and glycol ethers such as ethylene glycol mono ethyl ether; ethylene glycol mono butyl ether; ethylene glycol mono hexyl ether; ethylene glycol mono isopropyl ether; ethylene glycol mono propyl ether; diethylene glycol mono ethyl ether; diethylene glycol mono butyl ether; diethylene glycol mono hexyl ether; diethylene glycol mono isopropyl ether; propylene glycol mono methyl ether; propylene glycol mono ethyl ether; propylene glycol mono propyl ether; propylene glycol mono butyl ether; dipropylene glycol mono methyl ether; dipropylene glycol mono butyl ether; ethylene glycol dimethyl ether; diethylene glycol dimethyl ether; diethylene glycol diethyl ether; propylene glycol dimethyl ether; dipropylene glycol dimethyl ether; dipropylen glycol methyl n-propyl ether.

(vii) ethers such as anisole; tetrahydrofurane; 2-methyl tetrahydrofurane; dioxane; methyl tert butyl ether.

(viii) nitriles such as acetonitrile; isovaleronitrile; 2-methyl butyronitrile.

(ix) acetals such as ethylal (formaldehyde diethylacetal); propylal (formaldehyde di-n-propyl acetal); butylal (formaldehyde di-n-butyl acetal); 1,3-dioxolane; 2,5,7,10-tetraoxaundecane.

(x) alcohols such as isopropanol; iso-butanol; butanol; pentanol; iso-pentanol; cyclohexanol; n-hexanol; methyl iso-butyl-carbinol; 1-methoxypropanol; 2-ethyl-1-hexanol, 2-methyl-1-pentanol.

(xi) halogenated hydrocarbon solvents such as dichloromethane; 1,2-dichloroethane; 1,4-dichloro butane; trichloro ethane; chlorobenzene; o-dichlorobenzene; α,α,α-trifluorotoluene.

(xii) hydrocarbons such as hexane; heptane; octane; nonane; decane; undecane; benzene; toluene; xylene.

The type and the percentage of solvents or solvent mixtures in the composition of the present invention mainly depends on the coating or printing methods used to prepare the liquid crystal alignment film or coating layer for the fabrication of optical and electro-optical elements and devices.

Known methods for printing or coating the present composition include spin coating, roll coating and printing methods such as flexographic, offset, gravure and inkjet printing. Of these inkjet printing has recently gained high popularity, especially for preparing larger devices such as e.g. TV displays. Each of the various methods needs a proper balance of the types and concentrations of the solvent components in the formulation in order to provide excellent coating results such as regular coating thickness, good spreadability and absence of coating defects. As the composition is not restricted to a specific coating or printing method no precise choice of solvents can be given.

In addition, in order to improve the handling property, the coating quality or to adjust viscosity, the formulation may further include a polar protic or aprotic poor solvent or an apolar poor solvent. Examples of polar protic or aprotic poor solvents include, without limitation, groups such as acetals, alcohols, monoalkylated or dialkylated glycols, carboxylic acid esters preferably highly branched, alkoxy aliphatic-carboxylic acid ester, lactate, ketones preferably highly branched, ethers, carbonates, nitrile as long as the dissolved polyamic acid and/or polyimide is not precipitated. Examples of apolar poor solvent include without limitation groups such as hydrocarbons and halogenated hydrocarbon solvents, as long as the dissolved polyamic acids and/or polyimides (I) or (III) or the photoalignment material are not precipitated. Especially preferred polar protic or aprotic poor solvents include monoalkylated or dialkylated glycol ethers and alkoxy aliphatic carboxylic acid esters such as e.g. ethyl 3-ethoxy propionate.

The weight of solvent or solvent mixture c) relative to the total weight of the composition of the present invention is 99.5% to 70% by weight, preferably 99% to 80% by weight and more preferably 98% to 90% by weight.

Further the photoalignment composition of the present invention may optionally comprise one or several additives. They are generally used in minor amounts to improve certain performance criteria of the present composition, such as for instance coating and printing behaviour, storage stability and inhibition of colour formation as well as for instance improving the mechanical and thermal properties and the photoalignment properties of the alignment layer produced from the present composition. They are commonly classified in groups such as antioxidants, inhibitors, stabilizers, surface active agents, flow improvers, defoaming agents, sensitizers, adhesion promoters, thixotropic agents, pigments, initiators, nucleating agents, clarifying agents, antistatics, slip agents, silica, talc, stabilizers, UV stabilizers, lubricants, coupling agents, antimicrobial agents, crosslinking agents, surfactants, photo-active agents, photo-sensitizers, photo generators and others. Additives such as silane-containing compounds and epoxy-containing crosslinking agents may be added. Suitable silane-containing additives are described in Plast. Eng. 36 (1996), (Polyimides, fundamentals and applications), Marcel Dekker, Inc. Suitable epoxy-containing cross-linking additives include 4,4'-methylene-bis-(N,N-diglycidylaniline), trimethylolpropane triglycidyl ether, benzene-1,2,4,5-tetracarboxylic acid 1,2,4,5-N,N'-diglycidyldiimide, polyethylene glycol diglycidyl ether, N,N-diglycidyl-cyclohexylamine and the like. Other suitable additives include 2,2-dimethoxyphenylethanone, a mixture of diphenylmethanone and N,N-dimethylbenzenamine or ethyl 4-(dimethylamino)benzoate, 1-hydroxy-cyclohexyl-phenyl-ketone, 2-benzyl-2-dimethylamino-1-(4-morpholinophenyl)-butanone-1, Irgacure® 500 (1:1 mixture by weight of 1-hydroxy-cyclohexyl-phenyl-ketone and benzophenone), 2,2-dimethoxy-1,2-diphenylethan-1-one or Michler's ketone. Non-limiting examples are hydroquinone, 2,6-di-tert-butyl-4-methylphenol (BHT), 4-ethoxyphenol, 4-methoxyphenol, phenothiazine, and N-phenyl-2-naphthylamine. The amount of additives in the composition is generally less than 20% relative to the total weight of the composition, preferably less than 10% and more preferably less than 5%.

The photoalignment compositions according to definition and preferences of the invention, optionally further comprise an organic solvent. Example of organic solvents are chlorobenzene, pyrrolidone solvents, preferably, N-methyl-2-pyrrolidone, N-ethyl-2-pyrrolidone, N-cyclohexyl-2-pyrrolidone; imidazolidinone, dimethylsulfoxide, dimethylformamide, toluene, chloroform, organic ester, such as acetyl acetic ester or butyl acetic ester, pentyl acetic ester, hexyl acetic ester; further gamma-butyrolactone, methyl cellosolve, butyl cellosolve, butyl carbitol, tetrahydrofuran, diethylene glycol diethylether, dipentylether dipropylene glycol dimethylether, di-iso-butyl ketone monoethylene glycol dimethyl ether, etc. These solvents can be used alone or in mixtures thereof.

The present invention relates to a photoalignment composition for the alignment of liquid crystals, comprising, inter alia, non-photoreactive polymer or copolymer from the class of polyimide and/or polyamic acid compounds, comprising repeating structural units from diamines of formulae (Ia) and/or (Ib) and optionally comprising repeating structural units from diamines of formulae (IIIa) and/or (IIIb). When these compositions are used in the above alignment compositions they improve the stability of the pre-tilt angle of liquid crystals without negatively affecting the electrical performances, such as voltage holding ratio and AC memory.

There are many factors which can influence the pre-tilt angle of liquid crystals, such as for example the baking temperature, the printing method, the sealants and other chemical compounds used during the preparation of the electro-optical element, such as an LCD device, or of the unstructured or structured optical elements, and the substrate on which the composition is applied.

The photoalignment composition of the present invention is used in an orientation layer comprising said photoalignment composition. Said orientation layer may optionally further comprise a polymerisable liquid crystal.

It is understood that the orientation layers of the present invention (in form of a polymer gel, a polymer network, a polymer film, etc.) can be used as orientation layers for liquid crystals. Such orientation layers can be used in the manufacture of electro-optical elements or of unstructured or structured optical-elements.

In the context of the present invention the wording "orientation layer" has the same meaning as "orientation film".

In the context of the present invention polymer or oligomer layers are preferably orientation layers.

In the context of the present invention the wording "polymer or oligomer layer" has the meaning of "polymer layer, copolymer layer, homopolymer layer or oligomer layer".

The compositions according to the present invention may be used alone or in combination with other compositions or materials, depending upon the application. Therefore it is understood that by varying the composition of the formulation it is possible to control specific and desired properties, such as an induced pre-tilt angle, or suppressing of tilt, good alignment quality, contrast ratio, good surface wetting, a high voltage holding ratio, a specific anchoring energy, image sticking etc.

The orientation layers are suitably prepared from a photoalignment composition according to the present invention. The photoalignment composition is applied to a support optionally coated with an electrode [for example a glass plate coated with indium-tin oxide (ITO)] so that homogeneous layers of 0.05 to 50 m thickness are produced. In this process different coating techniques like spin-coating, meniscus-coating, wire-coating, slot-coating, offset-printing, flexo-printing, gravur-printing may be used. Then, or optionally after a prior imidisation step, the regions to be oriented are irradiated, for example, with a high-pressure mercury vapour lamp, a xenon lamp or a pulsed UV laser, using a polarizer and optionally a mask for creating images of structures.

The irradiation time is dependent upon the output of the individual lamps and can vary from a few seconds to several hours. The photo-reaction (dimerisation, polymerisation, crosslinking) can also be carried out, however, by irradiation of the homogeneous layer using filters that, for example, allow only the radiation suitable for the cross-linking reaction to pass through. It is within the meaning of the present invention that "photo-reaction" means "reaction by exposure with light, preferably aligning light".

It is understood that the orientation layers of the invention may be used in the production of optical or electro-optical devices having at least one orientation layer as well as unstructured and structured optical elements and multi-layer systems.

An additional object of the present invention is to provide a method for the preparation of the orientation layer by exposing the photoalignment composition according to the present invention with aligning light. Preferably, the photo-reactive group of the side chains of the photoalignment material reacts by exposure to aligning light.

In the context of the present invention the term photo-reactive groups have the meaning of groups, which are able to react by interaction with light, preferably aligning light.

The treatment with aligning light may be conducted in a single step or in several separate steps. In a preferred embodiment of the invention the treatment with aligning light is conducted in a single step.

In the context of the present invention photo-reactive group has preferably the meaning of a dimerizable, isomerizable, polymerizable and/or cross-linkable group.

In the context of the present invention, aligning light, preferably polarized light is light of wavelengths, which can initiate photoalignment. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. A further embodiment of the invention concerns the generating of aligning light by laser light.

The instant direction of the aligning light may be normal to the substrate or at any oblique angle.

More preferably, aligning light is at least partially linearly polarized, elliptically polarized, such as for example circularly polarized, or non-polarized; most preferably at least circularly or partially linearly polarized light, or non-polarized light exposed obliquely.

Especially, most preferred aligning light denotes substantially polarised light, especially linearly polarised light; or aligning light denotes non-polarised light, which is applied by an oblique irradiation.

Polarised light direction shall mean the intersection line of the alignment layer surface and the plane of polarization of the polarised light during the exposure. If the polarised light is elliptically polarized, the plane of polarization shall mean the plane defined by the incident direction of the light and by the major axis of the polarization ellipse.

The term polarised light direction is used in the context of the present invention not only to describe a direction for the duration of the exposure process, but also after exposure to refer to the direction of the polarised light on the alignment layer as it was applied during exposure.

Polymer or oligomer layers may readily be prepared from a photoalignment composition of the present invention and a further embodiment of the invention relates to an orientation layer comprising said photoalignment composition and which is preferably prepared by treatment with aligning light.

The polymer or oligomer layer is preferably prepared by applying the photoalignment compositions according to the present invention to a support and subsequent evaporation of the solvent and/or of the additives, and, after imidisation or without imidisation, irradiating the polymer or oligomer or polymer mixture or oligomer mixture with aligning light. Such orientation layers are also an object of the present invention. Aligning light has the above given meaning and preferences.

The term "support" as used in the context of the present invention is preferably transparent or not-transparent, preferably glass or plastic substrates, polymer films, such as polyethyleneterephthalat (PET), tri-acetyl cellulose (TAC), polypropylen, optionally coated with indium tin oxide (ITO), however not limited to them.

In general a photoalignment composition according to the present invention is applied by general coating and printing methods known in the art, such as spin-coating, meniscus-coating, wire-coating, slot-coating, offset-printing, flexo-printing, gravure-printing, ink jet printing may be used. Coating methods are for example spin coating, air doctor coating, blade coating, knife coating, reverse-roll coating, transfer roll coating, gravure roll coating, kiss roll coating, cast coating, spray coating, slot-orifice coating, calendar coating, electrodepositing coating, dip coating or die coating.

Printing methods are for example relief printing such as flexographic printing, ink jet printing, intaglio printing such as direct gravure printing or offset gravure printing, lithographic printing such as offset printing, or stencil printing such as screen printing.

A further embodiment of the present invention relates to orientation layers which are unstructured or structured.

In addition the present invention relates to a process for the preparation of structured polymer layers, copolymer layers or oligomer layers comprising varying the direction of orientation and/or the tilt angle within the polymer or oligomer layer. This varying of the direction of orientation and/or the tilt angle can for example be conducted by controlling the direction of the irradiation of the aligning light. It is understood that by selectively irradiating specific regions of the polymer or oligomer layer very specific regions of the layer can be aligned. In this way, layers with a defined tilt angle can be provided.

The irradiation time is dependent upon the output of the individual lamps and can vary from a few seconds to several hours. The photo-reaction can also be carried out, however, by irradiation of the homogeneous layer using filters that, for example, allow only the radiation suitable for the reaction to pass through.

Further preferred is a process for the preparation of a polymer layer, copolymer layer or oligomer layer; for the preparation of planar multi-domain planar alignment of a polymer layer or oligomer layer; and/or for the preparation of a polymer layer, copolymer or oligomer layer having a tilt angle within the given meaning and preferences of the invention.

A further preferred embodiment of the invention relates to an orientation layer comprising one or more photoalignment compositions according to the present invention.

In the context of the present invention orientation layer has the same meaning and preferences as alignment layer.

The invention relates to an orientation layer as described above and according to the invention for the vertical alignment of liquid crystals. In a preferred embodiment of the present invention, the orientation layer is used for the vertical alignment of liquid crystals and for the stabilization of the tilt angle even in the presence of materials which could destabilize said tilt angle.

The term tilt angle as used in the context of the present invention is the angle between the liquid crystal director and the surface of the alignment layer. The liquid crystal director shall mean the average direction of the long axes of the liquid crystal molecules. In the context of the present invention, vertical alignment shall mean that the tilt angle is more than 70°, 75°, preferably more than 80°, 85°, more preferably between 85° and 90°, even more preferably between 86° and 87° or between 87° and 88° or between 88° and 89° or between 89° and 90°.

A preferred method of the present invention concerns a method, wherein the direction of orientation within the orientation layer is varied by controlling the direction of the irradiation with aligning light, and/or wherein by selectively irradiating specific regions of the orientation layer are aligned.

Further, the present invention concerns preferably the use of the orientation layer according to the present invention for the induction of vertical alignment of adjacent liquid crystalline layers.

In general the liquid crystals compositions or liquid crystal layers are not particularly limited. The liquid crystals compositions or liquid crystal layers can thus be made of any of various liquid crystal materials that have been known publicly. The liquid crystals compositions or liquid crystal layers may be made of a liquid crystal material identical to or different from that for display use.

A further embodiment of the present invention relates to the use of said orientation layer, for the alignment, especially the vertical alignment, of
—a) liquid crystal composition comprising one or more polymerizable liquid crystal monomers, or comprising one or more liquid crystal polymers or oligomers, which are the polymerized form of said polymerizable liquid crystal monomers, and/or
—b) liquid crystal compositions comprising one or more polymerizable liquid crystal monomers, or comprising one or more liquid crystal polymers or oligomers, which are the polymerized form of said polymerizable liquid crystal monomers, said liquid crystal compositions being sandwiched between a pair of said orientation layers.

Example of liquid crystal polymers (LCP) are described in US2012/114907 A1, which is herewith incorporated by reference.

Liquid crystal compositions of the present invention may comprise a polymerizable monomer, or a polymer or oligomer, which is the polymerized form of said polymerizable monomer. The polymerizable monomer or the polymer or oligomer, is bifunctional and/or has a rigid core (e.g. benzene). Further preferred is a polymerizable monomer, or a polymer or oligomer, which have one or more ring or condensed ring structures and functional groups bonded directly to the ring or condensed ring structure.

In a further embodiment the present invention relates to a method for manufacturing a liquid crystal display.

In the context of the present invention the term "display" has the same meaning as the term "panel".

In one embodiment according to the present invention relates to a method for manufacturing a liquid crystal display comprising applying at least a single LCP or liquid crystal type onto an orientation layer prepared according to the present invention and optionally polymerizing said LCP.

The liquid crystal may be applied onto the orientation layer in any amount, so the amount is not particularly limited. The amount may be set as appropriate in accordance with, for example, respective thicknesses of the liquid crystal layer.

Further the present invention relates to a method for manufacturing a liquid crystal display comprising bringing into contact a liquid crystal composition with at least a single orientation layer according to the present invention, preferably two orientation layers facing each other.

More specifically the process for the preparation of liquid crystal displays, preferably LCDs comprising vertical alignment of liquid crystals, more especially LCDs, comprising an orientation layer according to the present invention and electrodes, comprises performing an exposure, preferably a first exposure, of the material with the polarised light, wherein the exposure induces an orientation direction of the liquid crystals perpendicular to polarised light, or/and wherein an exposure, preferably a first exposure, induces an orientation direction of the liquid crystals and polarised light direction make an angle higher than 70°, or/and wherein an exposure, preferably a first exposure, with polarized light is conducted with an angle >70° between the electrode and the polarized light direction. The electrodes are preferably in the form of parallel stripes, zig-zag or comb-like electrodes.

The further object of the present invention relates to optical or electro-optical unstructured of structured elements comprising the composition or the orientation layer according to the present invention.

The electro-optical devices may comprise more than one orientation layer. The layer or each of the layers may contain one or more regions of different spatial orientation.

In a preferred embodiment the element is a liquid crystal display cell.

In the context of the present invention elements, device, cell, structure all refer to objects comprising liquid crystal to be oriented by the orientation layer according to the present invention.

Preferably, the present invention further relates to unstructured or structured elements, optical or electro-optical devices, especially a LCD, comprising a pair of substrates facing each other; wherein the substrates is provided with a pair of orientation layers according to the present invention and
a) optionally, a LCP polymer film, wherein said polymer film is formed on that orientation layer, or
b) a liquid crystal composition, wherein said liquid crystal composition is sandwiched between the pair of orientation layers.

The present invention also relates to the use of such orientation layers for the alignment, of liquid crystals, preferably in the manufacture of unstructured or structured optical or electro-optical elements, preferably in the production of hybrid layer elements. These optical or electro-optical devices have at least one orientation layer as well as unstructured and structured optical elements and multi-layer systems. The layer or each of the layers may contain one or more regions of different spatial orientation.

Preferably, the present invention concerns an optical and electro-optical unstructured or structured constructional elements, preferably liquid crystal display cells, multi-layer and hybrid layer elements, comprising at least one polymer layer, copolymer or oligomer layer according to the present invention.

The present invention the wording optical or electro-optical elements has preferably the meaning of multilayer systems, or devices for the preparation of a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, super-twisted nematic (STN) liquid crystal displays, optically compensated birefringence (OCB) liquid crystal displays, pi-cell liquid crystal displays, PLS technology (plane to line switching), PS-IPS (polymer stabilized IPS), in-plane switching (IPS) liquid crystal displays, such as IPS modes like S-IPS (Super IPS), AS-IPS (Advanced super IPS), E-IPS (Enhanced IPS), H-IPS (Horizontal IPS), UH-IPS, S-IPS II, e-IPS, p-IPS (performance IPS); Field induced photoreactive alignment IPS, fringe field switching (FFS) liquid crystal displays; (FPA) field-induced photo-reactive alignment; hybrid FPA; VA-IPS mode liquid crystal displays, or displays using blue phase liquid crystals; all above display types are applied in either transmissive or reflective or transflective mode.

The further examples are a non-limiting selection of examples which will further explain the invention. The further examples will demonstrate that the compositions of the present invention have good or very good image sticking properties, contrast ratios, voltage holding ratios and that the pre-tilt angle of the liquid crystal is stabilized even in case of contamination of the liquid crystalline layer.

EXAMPLES

Definitions

NMP=N-methyl-pyrrolidone

Following examples will illustrate in a non-limiting way the invention. If not stated otherwise, the chemical names of the used compounds are following the IUPAC rules. UV/Vis spectra have been measured with Hitachi U2910 spectrometer in solution of NMP at room temperature.

Synthetic Example 1

1.1 Preparation of 4-(4,4,4-trifluorobutoxy)benzoic acid

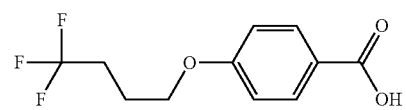 [SMILES: O=C(O)c1ccc(OCCCC(F)(F)F)cc1]

55.00 g (0.408 mol) 4,4,4-trifluorobutan-1-ol are dissolved in 550 mL tetrahydrofuran, 142 mL (0.102 mol)

triethylamine are added at room temperature. 38 mL (0.490 mol) methanesulfonyl chloride were added dropwise under nitrogen. The mixture is stirred for 1 h at 0-5° C. The beige suspension is Hyflo-filtrated and washed with tetrahydrofuran. The filtrate is concentrated. The residue is dissolved in 1.4 L NMP 62.70 g (0.408 mol) of methyl 4-hydroxybenzoate and 226.00 g (1.43 mol) of potassium carbonate are added to the lightly brown solution. The reaction suspension is allowed to react at 80° C. for 14 h. 1 L (1.0 mol) of a 1N NaOH solution is added to the above mixture. The suspension is heated at reflux temperature for 30 min until the reaction is completed. The reaction mixture is allowed to cool at room temperature and thrown in cold water. The solution is carefully acidified with a 25% HCl solution and is stirred for 15 min. The product is filtrated off, washed with water and dried overnight at room temperature under vacuum to give 99.00 g of 4-(4,4,4-trifluorobutoxy)benzoic acid as a white solid.

1.2 Preparation of 4-formylphenyl 4-(4,4,4-trifluorobutoxy)benzoate

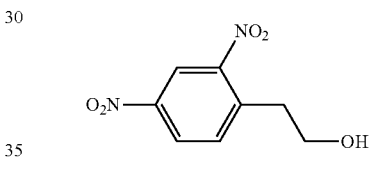

6.89 g (56.4 mmol) of 4-hydroxybenzaldehyde, 14.0 g (56.4 mmol) of 4-(4,4,4-trifluorobutoxy)benzoic acid, 0.69 g (5.6 mmol) of 4-dimethylaminopyridine are dissolved in 100 mL of dichloromethane. 11.89 g (62.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature the reaction mixture was partitioned between dichloromethane and water; the organic phase is washed repeatedly with water, dried over sodium sulphate, filtered and concentrated by rotary evaporation. Crystallization form 2-propanol at 0° C. give 17.1 g of 4-formylphenyl 4-(4,4,4-trifluorobutoxy)benzoate as colourless crystals.

1.3 Preparation of (E)-3-[4-[4-(4,4,4-trifluorobutoxy)benzoyl]oxyphenyl]prop-2-enoic acid

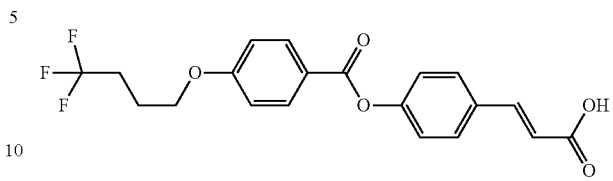

5.00 g (14.2 mmol) of 4-formylphenyl 4-(4,4,4-trifluorobutoxy)benzoate and 3.00 g (28.4 mmol) of malonic acid are dissolved in 18 mL (227.1 mmol) of pyridine. 1.21 g (14.2 mmol) of piperidine are added to the suspension which is allowed to react at 100° C. under argon for 1.5 h. The yellow solution is then thrown on ice. The solution is carefully acidified to pH=1-2 with a 25% HCl solution and is stirred for 15 min. The product is filtrated off and dried at room temperature under vacuum for 10 h to give 5.2 g of (E)-3-[4-[4-(4,4,4-trifluorobutoxy)benzoyl]oxyphenyl]prop-2-enoic acid as white powder.

1.4 Preparation of 2-(2,4-dinitrophenyl)ethanol 22.6 g (100 mmol) 2,4-dinitrophenylacetic acid are dissolved in 150 mL tetrahydrofuran and added dropwise in a the course of 2 hours to 300 mL (300 mmol) of a borane-tetrahydrofuran complex 1.0 M solution in tetrahydrofuran. After 3 hours at 25° C., 200 mL water are carefully added. The reaction mixture is then partitioned between ethyl acetate and water; the organic phase was washed repeatedly with water, dried over sodium sulfate, filtered and concentrated by rotary evaporation. Chromatography of the residue on 400 g silica gel using toluene:ethyl acetate 1:1 as eluent and crystallization form ethylacetate:hexane mixture to yield 20.7 g of 2-(2,4-dinitrophenyl)ethanol as yellowish crystals.

1.5 [4-[(E)-3-[2-(2,4-dinitrophenyl)ethoxy]-3-oxo-prop-1-enyl]phenyl]4-(4,4,4-trifluorobutoxy)benzoate

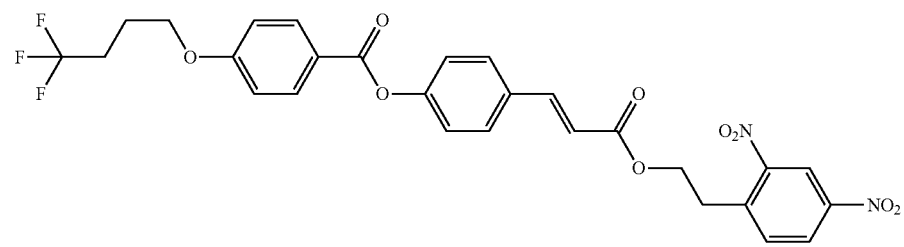 [SMILES: O=C(/C=C/c1ccc(OC(=O)c2ccc(OCCCC(F)(F)F)cc2)cc1)OCCc1ccc([N+](=O)[O-])cc1[N+](=O)[O-]]

2.50 g (11.8 mmol) of 2-(2,4-dinitrophenyl)ethanol, 4.65 g (11.8 mmol) of (E)-3-[4-[4-(4,4,4-trifluorobutoxy)benzoyl]oxyphenyl]prop-2-enoic acid, 144 mg (1.2 mmol) of 4-dimethylaminopyridine are dissolved in 30 mL of dichloromethane. 2.48 g (13.0 mmol) of N-(3-dimethylaminopropyl)-N'-ethylcarbodiimide hydrochloride (EDC hydrochloride) are added at 0° C. The solution is stirred for 1 h at 0° C. and allowed to stir at room temperature overnight. After 22 hours at room temperature the reaction mixture is partitioned between dichloromethane and water. The organic phase is washed repeatedly with water, dried over sodium sulphate, filtered and concentrated by rotary evaporation. Chromatography of the residue on 200 g silica gel using toluene:ethyl acetate 95:5 as eluent and crystallization form ethylacetate:hexane mixture to yield 5.33 g [4-[(E)-3-[2-(2,4-dinitrophenyl)ethoxy]-3-oxo-prop-1-enyl]phenyl] 4-(4,4,4-trifluorobutoxy)benzoate as slightly yellowish crystals.

1.6 Preparation of [4-[(E)-3-[2-(2,4-diaminophenyl)ethoxy]-3-oxo-prop-1-enyl]phenyl] 4-(4,4,4-trifluorobutoxy)benzoate

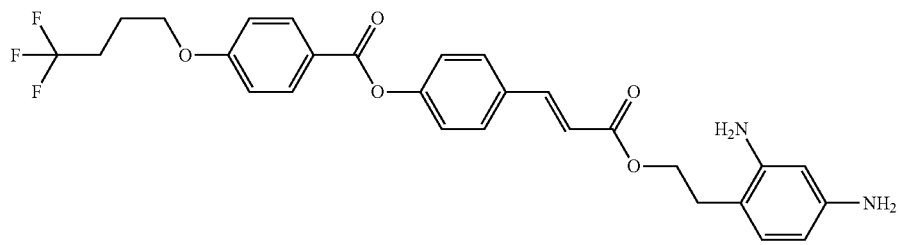

5.04 g (8.57 mmol) of [4-[(E)-3-[2-(2,4-dinitrophenyl)ethoxy]-3-oxo-prop-1-enyl]phenyl] 4-(4,4,4-trifluorobutoxy)benzoate are dissolved in a mixture of 54 mL of N,N-dimethylformamide and 6 mL water. 13.9 g (51.4 mmol) ferric chloride hexahydrate are added. 5.60 g (85.7 mmol) Zinc powder are added portionwise within 60 min. The mixture is allowed to react for 2 hours. The reaction mixture is then partitioned between ethyl acetate and water and filtered. The organic phase is washed repeatedly with water, dried over sodium sulfate, filtered and concentrated by rotary evaporation. Filtration of the residue on 200 g silica gel using toluene:ethyl acetate (1:3) as eluent and crystallization form ethylacetate:hexane mixture yielded 3.21 g [4-[(E)-3-[2-(2,4-diaminophenyl)ethoxy]-3-oxo-prop-1-enyl]phenyl] 4-(4,4,4-trifluorobutoxy)benzoate as yellowish crystals. MS: 528.1 [M+]

$^1$H-NMR (CDCl$_3$, 400 MHz): 2.10 (m, 2H), 2.34 (m, 2H), 2.82 (t, 2H), 3.50 (s, 2H), 3.88 (s, 2H), 4.12 (t, 2H), 4.33 (t, 2H), 6.09 (m, 2H), 6.43 (d, 1H), 6.86 (d, 1H), 6.97 (m, 2H), 7.24 (m, 2H), 7.59 (m, 2H), 7.70 (d, 1H), 8.12 ppm (m, 2H).

Synthetic Example 2

2.1 Preparation of 2-(2-carboxy-4-nitro-phenyl)-5-nitro-benzoic acid

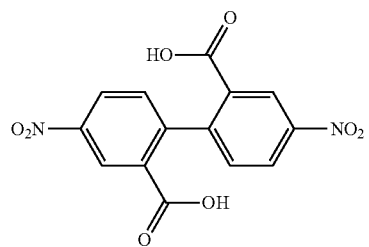 [SMILES: O=C(O)c1cc([N+](=O)[O-])ccc1-c1ccc([N+](=O)[O-])cc1C(=O)O]

30.0 g (120.13 mmol) 2-(2-carboxyphenyl)benzoic acid are dissolved at room temperature in 469 g (4.59 mol) concentrated sulfuric acid (96%). The solution is cooled to −15° C. and a mixture of 92.4 g (1.011 mol) concentrated nitric acid (69%) and 12.0 g (0.117 mol) concentrated sulfuric acid (96%) is added slowly so that the mixture temperature is maintained below 0° C. After the addition the solution is allowed to react at room temperature for 24 h. After the mixture is poured onto crushed ice, the precipitate that formed is collected by filtration, washed with water and dried at room temperature under vacuum for 10 h.

2.2 Preparation of [2-[2-(hydroxymethyl)-4-nitrophenyl]-5-nitro-phenyl]methanol

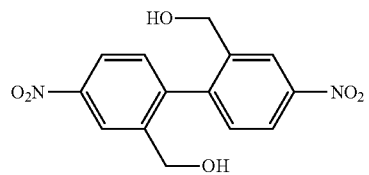 [SMILES: O=[N+]([O-])c1ccc(-c2ccc([N+](=O)[O-])cc2CO)c(CO)c1]

3.6 g (10.83 mmol) 2-(2-carboxy-4-nitro-phenyl)-5-nitro-benzoic acid are dissolved in 25 mL tetrahydrofuran and added dropwise in a course of 1 hour to 65 mL (65.02 mmol) of a borane-tetrahydrofuran complex 1.0 M solution in tetrahydrofuran. After 19 hours at 25° C., 50 mL water are carefully added. After 1 h the solution is acidified to pH=1-2 with 10 mL 1N HCl solution and allowed to stirred for 30 min. The reaction mixture is then partitioned between ethyl acetate and water; the organic phase is washed repeatedly with water, dried over sodium sulfate, filtered and concentrated by rotary evaporation. The residue, 4.2 g of [2-[2-(hydroxymethyl)-4-nitro-phenyl]-5-nitro-phenyl]methanol as white powder is used without further purification.

2.3 Preparation of [4-[(E)-3-[[5-nitro-2-[4-nitro-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate

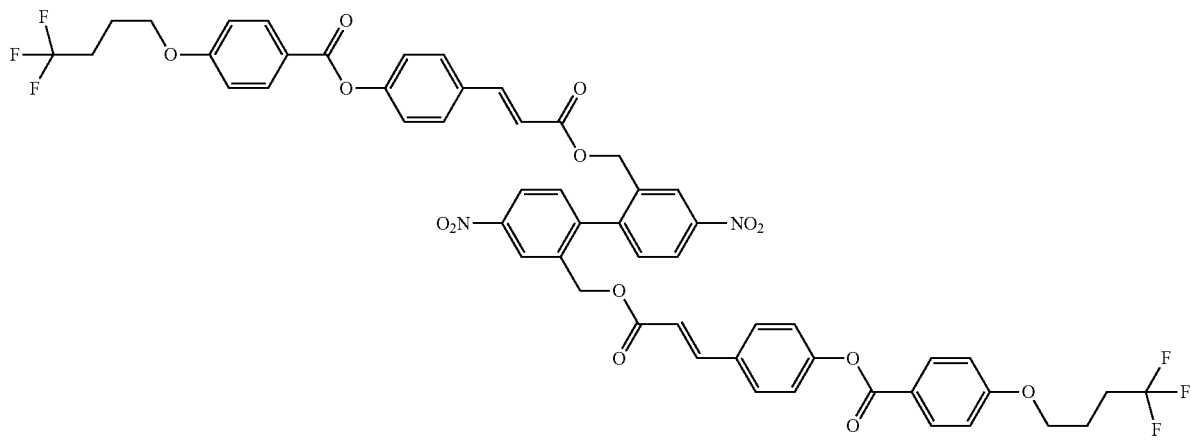 [SMILES: O=C(/C=C/c1ccc(OC(=O)c2ccc(OCCCC(F)(F)F)cc2)cc1)OCc1cc([N+](=O)[O-])ccc1-c1ccc([N+](=O)[O-])cc1COC(=O)/C=C/c1ccc(OC(=O)c2ccc(OCCCC(F)(F)F)cc2)cc1]

3.92 g (12.8 mmol) of [2-[2-(hydroxymethyl)-4-nitro-phenyl]-5-nitro-phenyl]methanol, 13.20 g (33.5 mmol) of (E)-3-[4-[4-(4,4,4-trifluorobutoxy)benzoyl]oxyphenyl]prop-2-enoic acid, 0.630 mg (5.15 mmol) of 4-dimethyl-aminopyridine are dissolved in 200 mL of dichloromethane. 6.91 g (11.16 mmol) of N,N'-dicyclohexylcarbodiimide are added at 0° C. The solution is stirred for 2 h at 0° C. and allowed to stir at room temperature overnight. After 22 hours at room temperature the reaction mixture is partitioned between dichloromethane and water. The organic phase is washed repeatedly with water, dried over sodium sulphate, filtered and concentrated by rotary evaporation. Chromatography of the residue on 150 g silica gel using toluene:ethyl acetate 9:1 as eluent to yield 12.0 g of [4-[(E)-3-[[5-nitro-2-[4-nitro-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate as white crystals.

2.4 Preparation of [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate

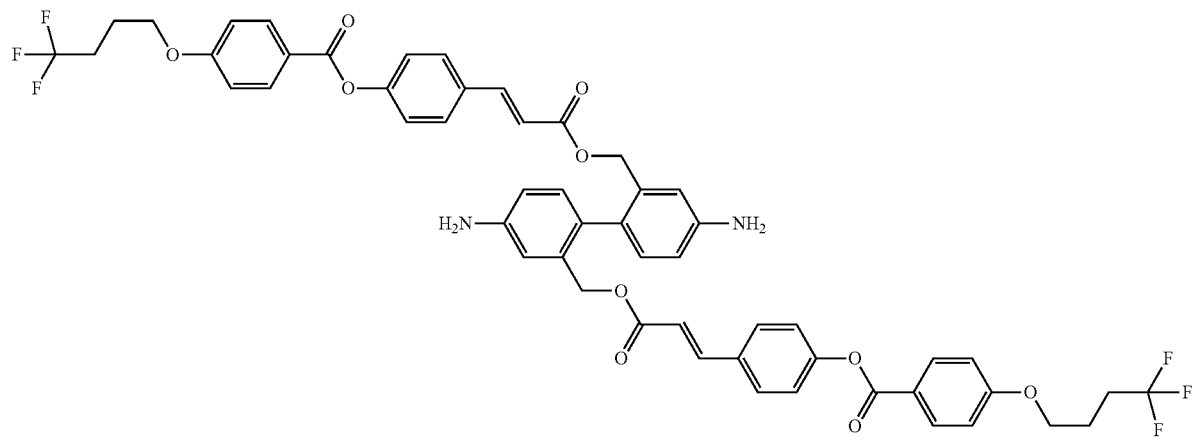

2.27 g (2.14 mol) of [4-[(E)-3-[[5-nitro-2-[4-nitro-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate are dissolved in a mixture of 40 mL of N,N-dimethylformamide and 3 mL water. 3.48 g (12.8 mmol) ferric chloride hexahydrate are added. 1.40 g (21.4 mmol) Zinc powder are added portionwise within 40 min. The mixture is allowed to react for 2 hours. The reaction mixture is then partitioned between ethyl acetate and water and filtered. The organic phase is washed repeatedly with water, dried over sodium sulfate, filtered and concentrated by rotary evaporation.

Chromatography of the residue on 100 g silica gel using toluene:ethyl acetate 7:3 as eluent yield 1.74 g [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate as yellowish crystals. MS: 997.4 [M+H]$^+$, 1014.4 [M+NH$_4$]$^+$ $^1$H-NMR (DMSO-d$_6$, 400 MHz): 1.98 (m, 4H), 2.44 (m, 4H), 4.15 (t, 4H), 4.86 (s, 4H), 5.13 (s, 4H), 6.56 (m, 4H), 6.71 (m, 2H), 6.83 (d, 2H), 7.10 (d, 4H), 7.28 (d, 4H), 7.61 (d, 2H), 7.76 (d, 4H), 8.10 ppm (d, 4H).

Synthetic Example 3

3.1 Preparation of N-(2-aminophenyl)-3,5-dinitro-benzamide

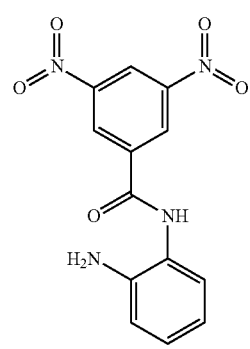 [SMILES: Nc1ccccc1NC(=O)c1cc([N+](=O)[O-])cc([N+](=O)[O-])c1]

At −78° C., 5 g (21.69 mmol) of 3,5-dinitrobenzoyl chloride dissolved in 80 mL dry THF is added dropwise to 4.69 g (43.37 mmol) benzene-1,2-diamine dissolved in 175 mL dry THF. After 4 h the reaction mixture was allowed to reach RT and ca. 800 mL deionised water was added to precipitate the product. The precipitate was filtered off and rinsed with 100 mL deionized water. The crude product is purified by heating to reflux in 400 mL ethyl acetate and 1300 mL acetonitrile and subsequent hot filtration. The solution is cooled to 0° C., the forming precipitate filtered, washed with 100 mL ethyl acetate and dried in the oven at 40° C. to give 3.77 g (57% yield) of N-(2-aminophenyl)-3, 5-dinitro-benzamide as orange solid.

$^1$H-NMR (DMSO-$d_6$, 300 MHz): 5.09 (s, 2H), 6.44-6.69 (m, 1H), 6.79 (dd, 1H), 6.99-7.05 (m, 1H), 7.15 (dd, 1H), 9.00 (t, 1H), 9.19 (d, 2H), 10.29 ppm (s, 1H).

3.2 Preparation of 2-(3,5-dinitrophenyl)-1H-benzimidazole

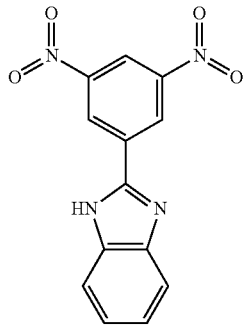 [SMILES: O=[N+]([O-])c1cc(-c2nc3ccccc3[nH]2)cc([N+](=O)[O-])c1]

To 5.6 g (18.53 mmol) N-(2-aminophenyl)-3,5-dinitrobenzamide in a 3-neck flask equipped with condenser and NaOH-outlet 47.5 mL (37.06 mmol, 0.8 M) of Eaton's reagent (7% w/w $P_2O_5$ in $MeSO_3H$) is added and heated for 3 h at 130° C. The reaction mixture reached RT and is added carefully dropwise to 1.2 L of a 7% $NaCO_3$ solution. The precipitate is filtered and washed with 500 mL deionized water, dried in the oven at 40° C. to give 5.18 g, from which 4.6 g are reheated in 180 mL DMF, cooled to RT and 7 mL water are added. The precipitate is filtered and dried in the oven at 40° C. to give 2.36 g (44.8% yield) of 2-(3,5-dinitrophenyl)-1H-benzimidazole as yellow solid.

$^1$H-NMR (DMF-$d_7$, 300 MHz): 7.31-7.38 (m, 2H), 7.73-7.79 (m, 2H), 8.97 (t, 1H), 9.47 (d, 2H), 13.67 ppm (s, 1H).

3.3 Preparation of 5-(1H-benzimidazol-2-yl)benzene-1,3-diamine

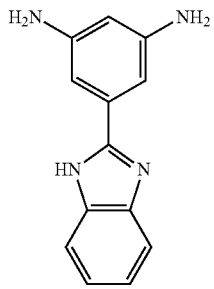 [SMILES: Nc1cc(N)cc(-c2nc3ccccc3[nH]2)c1]

2.5 g (8.79 mmol) 2-(3,5-dinitrophenyl)-1H-benzimidazole is dissolved in 100 mL DMF and hydrogenated by 0.1 w % Pt/C and 4 bar $H_2$ at 80° C. After 1.5 h the hot reaction mixture is rinsed over a Hyflo pad and 400 mL isopropyl ether is added. The red lower phase is separated and evaporated to dryness and dried in the oven at 40° C. The solid is recrystallized with 2-propanol/toluene and 2-propanol/n heptane to give 760 mg (38.6% yield) of 5-(1H-benzimidazol-2-yl)benzene-1,3-diamine as yellowish solid.

$^1$H-NMR (DMSO-$d_6$, 300 MHz): 4.93 (s, 4H), 5.96 (t, 1H), 6.61 (d, 2H), 7.11-7.23 (m, 2H), 7.51 (s, 2H), 12.51 (s, 1H).

Synthetic Example 4

4.1 Preparation of N-(cyano-4-nitrophenyl)-4-nitrobenzamide

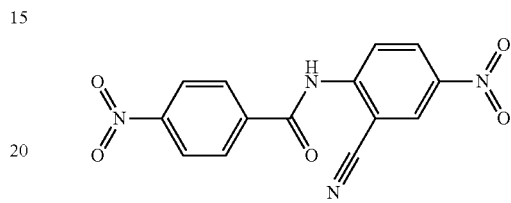

28.5 g (0.154 mol) of 4-nitrobenzoylchoride is added under stirring to 25 g (0.153 mol) of 2-amino-5-nitrobenzonitrile suspended in 100 mL pyridine and additional 100 mL pyridine are added. The reaction mixture is heated for 4 h and slowly allowed to reach room temperature and poured into 1.5 L 2% HCL solution. The orange solid is filtered and washed well with deionized water. 67.7 g of wet crude product is reheated in 750 mL acetone, hot filtered, and 750 mL deionized water is added, stirred for 10 minutes and precipitate is filtered and dried in the oven at 40° C. to give 43.44 g (91% yield) of N-(cyano-4-nitrophenyl)-4-nitrobenzamide.

$^1$H-NMR (DMSO-$d_6$, 300 MHz): 7.92 (d, 1H), 8.22-8.27 (m, 2H), 8.42-8.46 (m, 2H), 8.58 (dd, 1H), 8.81 (d, 1H), 11.36 ppm (s, 1H).

4.2 Preparation of 6-nitro-2-(4-nitrophenyl)-3H-quinazolin-4-one

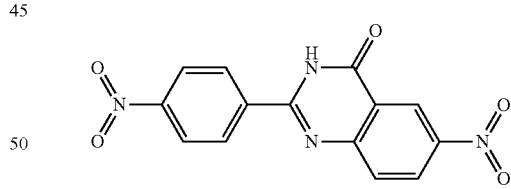

320 mL of 16% NaOH solution and 91.2 mL 30% hydrogen peroxide dissolved in 400 mL ion-free water is added to 20 g (0.064 mol) N-(cyano-4-nitrophenyl)-4-nitrobenzamide. The orange suspension is heated for 1.5 h, slowly allowed to reach room temperature and is diluted with 600 mL water. The reaction mixture is poured into 1.2 L of 5% $H_2SO_4$, stirred for 15 minutes at room temperature, cooled to 0° C., stirred for 10 minutes. White precipitate is filtered and washed with 400 mL deionized water. 83 g of crude product is reheated in 500 mL DMF to 150° C., slowly reach room temperature, stirred for 10 minutes at 00. The precipitate is dried in the oven at 40° C. to give 15.48 g (77.4% yield) of 6-nitro-2-(4-nitrophenyl)-3H-quinazolin-4-one.

¹H-NMR (DMSO-d₆, 300 MHz): 7.94 (dd, 1H), 8.36-8.44 (m, 4H), 8.57 (dd, 1H), 8.81-8.82 (m, 1H), 13.25 ppm (s, 1H).

4.3 Preparation of 6-amino-2-(4-aminophenyl)-3H-quinazolin-4-one

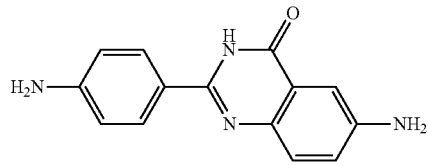 [SMILES: Nc1ccc(-c2nc3ccc(N)cc3c(=O)[nH]2)cc1]

15.3 g (0.049 mol) 6-nitro-2-(4-nitrophenyl)-3H-quinazolin-4-one is dissolved in 500 mL DMF and hydrogenated by 0.1 w % Pt/C and 4 bar $H_2$ at 80° C. After 1 h the hot reaction mixture is rinsed over Hyflo pad and 500 mL water is added. The precipitate is filtered and dried in the oven at 40° C. to give 7.9 g. 5.11 g are dissolved in 700 mL technical alcohol, and 300 mL water first precipitate is discarded, another 5 L deionized water are added and left standing overnight. Next day the precipitate is filtered, dried in the oven at 40° C. to give 750 mg of 6-amino-2-(4-aminophenyl)-3H-quinazolin-4-one as yellowish solid.

¹H-NMR (DMSO-d₆, 300 MHz): 5.49 (s, 2H), 5.64 (s, 2H), 6.59-6.64 (m, 2H), 7.06 (dd, 1H), 7.19 (d, 1H), 7.37 (d, 1H), 7.86 (d, 2H), 11.69 ppm (s, 1H). LC-MS: 253.1 $[M+H]^+$.

Example 1

Preparation of Polyamic Acid Solution PAA1

2.000 g of 4,4'-diaminodiphenyl ether are dissolved in 15.79 g NMP under mechanical stirring. 0.046 g of 2-(4-aminophenyl)-1H-benzimidazol-5-amine are added. The mixture is cooled and further stirred. 1.799 g of 1,2,3,4-cyclobutantetracarboxylic acid dianhydride are added and stirred at room temperature. The resulting polyamic acid solution PAA1, which contains 2% of 2-(4-aminophenyl)-1H-benzimidazol-5-amine has an intrinsic viscosity at 30° C. of 0.40 dL/g.

UV/Vis spectroscopy showed characteristic band of 2-(4-aminophenyl)-1H-benzimidazol-5-amine incorporated into PAA1 at 341 nm in NMP solution (at a concentration of $9.8 \times 10^{-6}$ g PAA1/g (NMP)).

Example 2

Preparation of Polyamic Acid Solution PAA2

Analogue to example 1, PAA2 was prepared using 2.000 g of 4,4'-diaminodiphenyl ether, 16.14 of NMP, 0.093 g of 2-(4-aminophenyl)-1H-benzimidazol-5-amine and 1.836 g of 1,2,3,4-cyclobutantetracarboxylic acid dianhydride. The obtained polyamic acid solution PAA2, which contain 4% of 2-(4-aminophenyl)-1H-benzimidazol-5-amine, has an intrinsic viscosity at 30° C. of 0.41 dL/g. UV/Vis spectroscopy showed characteristic band of 2-(4-aminophenyl)-1H-benzimidazol-5-amine incorporated into PAA2 at 341 nm in NMP solution (with approximately double intensity compared to PAA1).

Example 3

Preparation of Polyamic Acid Solution PAA3

Analogue to example 1, PAA3 was prepared using 2.000 g of 4,4'-diaminodiphenyl ether, 16.687 g of NMP, 0.169 g of 2-(4-aminophenyl)-1H-benzimidazol-5-amine and 1.896 g of 1,2,3,4-cyclobutantetracarboxylic acid dianhydride. The obtained polyamic acid solution PAA3, which contains 7% of 2-(4-aminophenyl)-1H-benzimidazol-5-amine, has an intrinsic viscosity at 30° C. of 0.39 dL/g. UV/Vis spectroscopy showed characteristic band of 2-(4-aminophenyl)-1H-benzimidazol-5-amine incorporated into PAA3 at 341 nm in NMP solution (with approximately 3.5 times intensity compared to PAA1).

Example 4

Preparation of Polyamic Acid Solution PAA4

PAA4 was prepared using 2.000 g of 2,2'-dimethylbenzidine, 16.86 g of NMP, 0.088 g of 2-(4-aminophenyl)-1H-benzimidazol-5-amine and 2.068 g of tetrahydro-5,9-methano-1H-pyrano[3,4-d]oxepin-1,3,6,8(4H)-tetrone. The obtained polyamic acid solution PAA4, which contains 4% of 2-(4-aminophenyl)-1H-benzimidazol-5-amine, has an intrinsic viscosity at 30° C. of 0.53 dL/g. UV/Vis spectroscopy showed characteristic band of 2-(4-aminophenyl)-1H-benzimidazol-5-amine incorporated into PAA4 at 338 nm in NMP solution (at a concentration of $9.8 \times 10^{-6}$ g PAA4/g (NMP)).

Example 5

Preparation of Polyamic Acid Solution PAA5

Analogue to example 4, PAA5 was prepared using 2 g of 2,2'-dimethylbenzidine, 17.4 g of NMP, 0.162 g of 2-(4-aminophenyl)-1H-benzimidazol-5-amine and 2.14 g of tetrahydro-5,9-methano-1H-pyrano[3,4-d]oxepin-1,3,6,8(4H)-tetrone. The obtained polyamic acid solution PAA5, which contains 7% of 2-(4-aminophenyl)-1H-benzimidazol-5-amine, has an intrinsic viscosity at 30° C. of 0.52 dL/g. UV/Vis spectroscopy showed characteristic band of 2-(4-aminophenyl)-1H-benzimidazol-5-amine incorporated into PAA5 at 338 nm in NMP solution (with approximately 1.75 times intensity compared to PAA4).

Example 6

Preparation of Polyamic Acid Solution PAA6

Analogue to example 4, PAA6 was prepared using 1 g of 2,2'-dimethylbenzidine, 8.4 g of NMP, 0.038 g of 2-(4-amino-2-pyridyl)pyridine-4-amine and 1.03 g of tetrahydro-5,9-methano-1H-pyrano[3,4-d]oxepin-1,3,6,8(4H)-tetrone. The obtained polyamic acid solution PAA6, which contains 4% of 2-(4-amino-2-pyridyl)pyridine-4-amine, has an intrinsic viscosity at 30° C. of 0.85 dL/g.

Example 7

Preparation of Polyamic Acid Solution PAA7

Analogue to example 4, PAA7 was prepared using 2 g of 2,2'-dimethylbenzidine, 16.9 g of NMP, 0.045 g of (2-(4-aminophenyl)-1,3-benzoxazol-6-amine, 0.044 g of 2-(4- aminophenyl)-1H-benzimidazol-5-amine and 2.09 g of tetrahydro-5,9-methano-1H-pyrano[3,4-d]oxepin-1,3,6,8(4H)-tetrone. The obtained polyamic acid solution PAA7, which contains 2% of 2-(4-aminophenyl)-1,3-benzoxazol-6-amine and 2% 2-(4-aminophenyl)-1H-benzimidazol-5-amine, has an intrinsic viscosity at 30° C. of 0.58 dL/g. UV/Vis spectroscopy showed characteristic band of 2-(4-aminophenyl)-1H-benzimidazol-5-amine and (2-(4-aminophenyl)-1,3-benzoxazol-6-amine incorporated into PAA7 at 342 nm in NMP solution (at a concentration of $9.8 \times 10^{-6}$ g PAA7/g (NMP)).

Example 8

Preparation of Polyamic Acid PAA8

Analogue to example 4, PAA8 was prepared using 2 g of 2,2'-dimethylbenzidine, 16.9 g of NMP, 0.088 g of (2-(4-aminophenyl)-1,3-benzoxazol-6-amine and 2.09 g of tetrahydro-5,9-methano-1H-pyrano[3,4-d]oxepin-1,3,6,8(4H)-tetrone. The obtained polyamic acid solution PAA8, which contains 4% of 2-(4-aminophenyl)-1,3-benzoxazol-6-amine, has an intrinsic viscosity at 30° C. of 0.57 dL/g. UV/Vis spectroscopy showed characteristic band of (2-(4-aminophenyl)-1,3-benzoxazol-6-amine incorporated into PAA8 at 347 nm in NMP solution (at a concentration of $9.8 \times 10^{-6}$ g PAA8/g (NMP)).

Example 9

Preparation of Polyamic Acid PAA9

0.1 g of 6-amino-2-(4-aminophenyl)-3H-quinazolin-4-one, synthesized as described in synthetic example 4, are suspended in 0.74 g NMP 81.9 mg tetrahydro-5,9-methano-1H-pyrano[3,4-d]oxepin-1,3,6,8(4H)-tetrone are added under mechanical stirring at room temperature. The resulting polyamic acid solution PAA9, which contains 100% (6-amino-2-(4-aminophenyl)-3H-quinazolin-4-one has an intrinsic viscosity at 30° C. of 0.41 dL/g. UV/Vis spectroscopy showed characteristic band of (6-amino-2-(4-aminophenyl)-3H-quinazolin-4-one at $\lambda_{max}$ 336 nm in NMP solution (at a concentration of $9.8 \times 10^{-6}$ g PAA9/g (NMP)).

Example 10

Preparation of Polyamic Acid PAA10

Analogue to example 4, PAA10 was prepared using 1 g of 2,2'-dimethylbenzidine, 8.44 g of NMP, 0.050 g of (4-[5-(4-aminophenyl)-1,3,4-oxadiazol-2-yl]aniline and 1.03 g of tetrahydro-5,9-methano-1H-pyrano[3,4-d]oxepin-1,3,6,8(4H)-tetrone. The obtained polyamic acid solution PAA10, which contains 4% of (4-[5-(4-aminophenyl)-1,3,4-oxadiazol-2-yl]aniline, has an intrinsic viscosity at 30° C. of 0.60 dL/g.

UV/Vis spectroscopy showed characteristic band of (4-[5-(4-aminophenyl)-1,3,4-oxadiazol-2-yl]aniline) incorporated into PAA10 at 336 nm in NMP solution (at a concentration of $9.8 \times 10^{-6}$ g PAA10/g (NMP)).

Example 11

Preparation of Polyamic Acid PAA11

PAA11 was prepared using 2 g of 2-amino-4-[1-(3-amino-4-hydroxyphenyl)-1-methyl-ethyl]phenol, 15.44 g of NMP, 0.072 g of 2-(4-aminophenyl)-1H-benzimidazol-5-amine and 1.77 g of tetrahydro-5,9-methano-1H-pyrano[3,4-d]oxepin-1,3,6,8(4H)-tetrone. The obtained polyamic acid solution PAA11, which contains 4% of 2-(4-aminophenyl)-1H-benzimidazol-5-amine, has an intrinsic viscosity at 30° C. of 0.31 dL/g. UV/Vis spectroscopy showed characteristic band of 2-(4-aminophenyl)-1H-benzimidazol-5-amine incorporated into PAA11 at 338 nm in NMP solution (with similar intensity compared to PAA4).

Example 12

Preparation of Polyamic Acid PAA12

0.5 g of 2-(4-aminophenyl)-1H-benzimidazol-5-amine are suspended in 4 g NMP and 0.5 g tetrahydro-5,9-methano-1H-pyrano[3,4-d]oxepin-1,3,6,8(4H)-tetrone are added under mechanical stirring at room temperature. The resulting polyamic acid solution PAA12, which contains 100% 2-(4-aminophenyl)-1H-benzimidazol-5-amine has an intrinsic viscosity at 30° C. of 0.44 dL/g. UV/Vis spectroscopy showed characteristic band of 2-(4-aminophenyl)-1H-benzimidazol-5-amine at $\lambda_{max}$ of 338 nm in NMP solution (at a concentration of $9.8 \times 10^{-6}$ g PAA12/g (NMP)).

Example 13

Preparation of Polyamic Acid PAA13

Analogue to example 4, PAA13 was prepared using 1 g of 2,2'-dimethylbenzidine, 8.45 g of NMP, 0.050 g of (6-amino-2-(4-aminophenyl)-3H-quinazolin-4-one, as described in synthetic example 4 and 1.03 g of tetrahydro-5,9-methano-1H-pyrano[3,4-d]oxepin-1,3,6,8(4H)-tetrone. The obtained polyamic acid solution PAA13, which contains 4% of (6-amino-2-(4-aminophenyl)-3H-quinazolin-4-one, has an intrinsic viscosity at 30° C. of 0.38 dL/g. UV/Vis spectroscopy showed characteristic band of (6-amino-2-(4-aminophenyl)-3H-quinazolin-4-one at $\lambda_{max}$ 336 nm in NMP solution.

Example 14

Preparation of Polyamic Acid PAA14

Analogue to example 4, PAA14 was prepared using 2 g of 2,2'-dimethylbenzidine, 16.83 g of NMP, 0.077 g of 9H-carbazole-3,6-diamine and 2.07 g of tetrahydro-5,9-methano-1H-pyrano[3,4-d]oxepin-1,3,6,8(4H)-tetrone. The obtained polyamic acid solution PAA14, which contains 4% of 9H-carbazole-3,6-diamine, has an intrinsic viscosity at 30° C. of 0.42 dL/g. UV/Vis spectroscopy showed characteristic band of (9H-carbazole-3,6-diamine incorporated into PAA14 at 355 nm in NMP solution (at a concentration of $1.9 \times 10^{-4}$ g PAA14/g (NMP)).

Example 15

Preparation of Polyamic Acid PAA15

Analogue to example 1, PAA15 was prepared using 1 g of 2,2'-dimethylbenzidine, 8.44 g of NMP, 0.044 g of 5-(1H-benzimidazol-2-yl)benzene-1,3-diamine, synthesized as described in synthetic example 3, and 1.03 g of tetrahydro-5,9-methano-1H-pyrano[3,4-d]oxepin-1,3,6,8(4H)-tetrone. The obtained polyamic acid solution PAA15, which contains 4% of 5-(1H-benzimidazol-2-yl)benzene-1,3-diamine, has an intrinsic viscosity at 30° C. of 0.40 dL/g. UV/Vis spectroscopy showed characteristic band of 5-(1H-benzimidazol-2-yl)benzene-1,3-diamine incorporated into PAA15 at 309 and 324 nm in NMP solution (at a concentration of $9.8 \times 10^{-6}$ g PAA15/g (NMP)).

Example 16

Comparative Polyamic Acid Solution PAAC1

Comparative polyamic acid solution PAAC1 is analogue to PAA2 but without 2-(4-aminophenyl)-1H-benzimidazol-5-amine, prepared in a similar way, and has an intrinsic viscosity at 30° C. of 0.37 dL/g. UV/Vis spectroscopy showed no band at 341 nm (one band at $\lambda_{max}$ 268 nm).

Example 17

Comparative Polyamic Acid Solution PAAC2

Comparative polyamic acid solution PAAC2 is analogue to PAA4 but without 2-(4-aminophenyl)-1H-benzimidazol-5-amine, prepared in a similar way, and has an intrinsic viscosity at 30° C. of 0.51 dL/g. UV/Vis spectroscopy showed no band at 338 nm (one band at $\lambda_{max}$ 266 nm).

Example 18

Photo Alignment Polymer Solution LPP1

Photo alignment polymer solution LPP1 is prepared as a 30% solution of copolyamic acid based on 70 mol % of [4-[(E)-3-[2-(2,4-diaminophenyl)ethoxy]-3-oxo-prop-1-enyl]phenyl] 4-(4,4,4-trifluorobutoxy)benzoate (synthesized as described in synthetic example 1), 30 mol % of [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate (synthesized as described in synthetic example 2) and tetrahydro-5,9-methano-1H-pyrano[3,4-d]oxepin-1,3,6,8(4H)-tetrone in NMP, and has an intrinsic viscosity at 30° C. of 0.35 dL/g.

Example 19

Photo Alignment Polymer Solution LPP2

Photo alignment polymer solution LPP2 is prepared as a 30% solution of copolyamic acid based on 90 mol % of [4-[(E)-3-[2-(2,4-diaminophenyl)ethoxy]-3-oxo-prop-1-enyl]phenyl] 4-(4,4,4-trifluorobutoxy)benzoate, 6.1 mol % of [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate, 3.9 mol % of 3-(3,5-diaminobenzoate) Cholestan-3-ol and tetrahydro-5,9-methano-1H-pyrano[3,4-d]oxepin-1,3,6,8(4H)-tetrone in NMP, and has an intrinsic viscosity at 30° C. of 0.26 dL/g.

Example 20

Photo Alignment Polymer Solution LPP3

Photo alignment polymer solution LPP2 is prepared as a 30% solution of copolyamic acid based on 69 mol % of [4-[(E)-3-[2-(2,4-diaminophenyl)ethoxy]-3-oxo-prop-1-enyl]phenyl] 4-(4,4,4-trifluorobutoxy)benzoate, 29 mol % of [4-[(E)-3-[[5-amino-2-[4-amino-2-[[(E)-3-[4-[4-(4,4,4-trifluorobutoxy)benzoyl]oxyphenyl]prop-2-enoyl]oxymethyl]phenyl]phenyl]methoxy]-3-oxo-prop-1-enyl]phenyl] 4-(4,4,4-trifluorobutoxy)benzoate, 2 mol % of 2-(4-aminophenyl)-1H-benzimidazol-5-amine and tetrahydro-5,9-methano-1H-pyrano[3,4-d]oxepin-1,3,6,8(4H)-tetrone in NMP, and has an intrinsic viscosity at 30° C. of 0.26 dL/g.

Example 21

Photo Alignment Polymer Solution LPP4

Photo alignment polymer solution LPP4 is a 30% solution of polyamic acid based on [4-[(E)-3-[2-(2,4-diaminophenyl)ethoxy]-3-oxo-prop-1-enyl]phenyl] 4-(4,4,4-trifluorobutoxy)benzoate and tetrahydro-5,9-methano-1H-pyrano[3,4-d]oxepin-1,3,6,8(4H)-tetrone in NMP.

Example 22

Photo Alignment Polymer Solution LPP5

1.7 g (4.3 mmol) of (E)-3-[4-[4-(4,4,4-trifluorobutoxy)benzoyl]oxyphenyl]prop-2-enoic acid (synthesized as described in synthetic examples 1.1 to 1.3) and 1.61 (4.3 mmol) of (E)-3-[4-(4-heptylcyclohexanecarbonyl)oxyphenyl]prop-2-enoic acid (synthesized in analogous manner as described in examples 1.1 to 1.2 of WO2008/145225 A2) are suspended in 60 mL of 4-methyl-2-pentanone and 0.62 g of water. 0.18 g (0.86 mmol) of tetraethylammonium bromide are added to give a white suspension. 5 g (17.3 mmol) of 2-(3,4-epoxycyclohexyl)ethyltriethoxysilane are added dropwise. The mixture is stirred at reflux for 48 h. The suspension is allowed to cool down. 20 mL of tetrahydrofuran and 50 mL of ethyl acetate are added and the mixture is extracted twice with 40 mL of water. The phases are separated and the organic phase is concentrated. The resulting solution is poured slowly into 500 mL of ice cold diisopropyl ether. The solid is filtered off and dried under vacuum to give 5.6 g of polymer.

Formulation Examples 1-21 (F1-F21) and
Formulation Comparative Examples 1-3 (FC1-FC3)

Formulations are obtained by mixing the corresponding PAA and/or PAAC with LPP, and diluted to 4% solid content with NMP, gamma-butyrolactone, diethylene glycol diethyl ether and ethylethoxy propionate.

Application Example 1

Test cells are prepared using the "one drop filling method". The sealant material is printed on the edges of the cell and before curing of the sealing material the liquid crystal is applied on the first substrate. Irradiation with UV light occurs when the second substrate is applied on top of the cell.
Preparation of Test Cells
Formulations F1-F21 or comparative formulations FC1-FC3 are applied to a pair of indium tin oxide (ITO) coated rectangular glass plates with single pixel of 8×8 mm by spin coating at 1200 to 1800 rpm for 30 seconds. The films were subjected to pre-baking for 1.5 minutes at 80° C. and post-baking for 40 minutes at 200° C. The resulting layer thickness is around 100 nm. Both ITO covered glass plates were irradiated with polarised UV-B light at a dose of 22 mJ/cm$^2$. The direction of incidence light relative to the substrate normal was of 40° and the incidence plane was in parallel to the long side of the substrate. A photo- and/or thermal-curable acrylic resin is applied near the pixel area of one irradiated plate, in form of three stripes, one along the right side at a board to board distance to the pixel of approx. 0.5 mm, and two on the left upper side as well left down side of the cell at a board to board distance to the pixel of approx. 0.5 mm. The acrylic resin stripes mimic a source of contamination. The pair of irradiated plates is then used to build a cell having 4.5 m spacing in an anti-parallel manner such that the irradiated surfaces were facing each other, by using the UV curable sealant Photolec A-785 (manufactured by Sekisui Chemical Co Ltd) as outside frame sealant. The cell is then maintained at room temperature under high vacuum for 14 hours and thereafter filled with TFT liquid crystal mixture MLC6610 from Merck in vacuum at room temperature. The cell annealing and the sealant thermal curing is processed at 130° C. for 30 min.

Application Example 2

Determination of Pre-Tilt Angle θ

Pre-tilt angle evaluation is done by means of the crystal rotation method. Pre tilt angle is measured with respect to the substrate surface.

Pre-tilt angle is defined as an angle from the glass substrate to the average long axis direction of liquid crystal.

Pre-tilt angle $\theta_0$ is measured on the centre position as well as at the two positions distanced by 3 mm from the centre in the direction of the stripes of acrylic resin. The latter are called pre-tilt angles $\theta_s$. At least two cells are made without acrylic resin, while at least three cells are made with acrylic resin. For each cell the lowest value of the two $\theta_s$ is considered for the calculation $\Delta\theta=\theta_0-\theta_s$. The average values of $\Delta\theta=\theta_0-\theta_s$ are summarized in Table 1.

Application Example 3

Determination of Voltage Holding Ratio (VHR)

VHR is an electrical characterization method to assess the purity of a liquid crystal display or cell. In the case at hand the measurement is carried out by applying a short voltage pulse of 64-μs duration and 1-V amplitude (V0) to the cell and measuring the remaining voltage (V1) across the cell after a typical frame time of 16.67 ms (corresponding to a cell driving frequency of 30 Hz). The measurement is conducted at a temperature of 60° C. The VHR-value of the cell is calculated by the formula $$VHR\ [\%] = \sqrt{\frac{1-\left[\frac{V_1}{V_0}\right]^2}{2\ln\frac{V_0}{V_1}}}\ 100\%$$

The ideal VHR-value is 100% and the lower the purity of the cell, the lower is the VHR-value.

TABLE 1

| Formulation | PAA solution | LPP solution | PAA/LPP solid ratio | Contamination source | VHR after 140 h | Pretilt $\theta_0$ (°) after 140 h | Δθ (°) after 140 h +/− 3 mm |
|---|---|---|---|---|---|---|---|
| F1 | PAA1 | LPP1 | 90:10 | not added | 98.1 | 88.28 | <0.02 |
|  |  |  |  | added | 97.8 | 88.20 | <0.05 |
| F2 | PAA2 | LPP1 | 90:10 | not added | 98.9 | 88.31 | <0.02 |
|  |  |  |  | added | 97.7 | 88.10 | <0.05 |
| F3 | PAA2 | LPP1 | 85:15 | not added | 98.9 | 88.35 | <0.05 |
|  |  |  |  | added | 98.0 | 88.28 | <0.05 |
| F4 | PAA2 | LPP2 | 90:10 | not added | 99.0 | 88.23 | <0.02 |
|  |  |  |  | added | 96.7 | 88.25 | 0.05 |
| F5 | PAA3 | LPP1 | 85:15 | not added | 99.1 | 88.35 | <0.02 |
|  |  |  |  | added | 97.9 | 88.29 | 0.08 |
| Comparative 1 FC1 | PAAC1 | LPP1 | 90-10 | not added | 99.1 | 88.29 | <0.02 |
|  |  |  |  | added | 97.3 | 88.16 | 0.17 |
| F6 | PAA4 | LPP1 | 90:10 | not added | 98.8 | 88.19 | <0.02 |
|  |  |  |  | added | 97.9 | 88.16 | <0.05 |
| F7 | PAA4 | LPP1 | 85:15 | not added | 98.7 | 88.29 | <0.02 |
|  |  |  |  | added | 97.0 | 88.22 | 0.06 |
| F8 | PAA4 | LPP3 | 85:15 | not added | 99.0 | 88.36 | <0.02 |
|  |  |  |  | added | 98.3 | 88.30 | <0.05 |
| F9 | PAA5 | LPP1 | 85:15 | not added | 98.8 | 88.30 | <0.02 |
|  |  |  |  | added | 97.3 | 88.15 | <0.05 |
| F10 | PAA4 | LPP4 | 90:10 | not added | 99.0 | 87.32 | <0.02 |
|  |  |  |  | added | 98.3 | 87.22 | <0.05 |
| Comparative 2 FC2 | PAAC2 | LPP1 | 85:15 | not added | 98.6 | 88.32 | <0.02 |
|  |  |  |  | added | 97.5 | 88.25 | 0.23 |
| F11 | PAA6 | LPP1 | 85:15 | not added | 98.9 | 88.32 | <0.02 |
|  |  |  |  | added | 96.9 | 88.27 | 0.16 |
| F12 | PAA7 | LPP1 | 85:15 | not added | 99.0 | 88.29 | <0.02 |
|  |  |  |  | added | 97.1 | 88.15 | 0.20 |
| F13 | PAA8 | LPP1 | 85:15 | not added | 98.9 | 88.24 | <0.02 |
|  |  |  |  | added | 97.7 | 88.18 | 0.05 |
| F14 | PAA9 (2.4%) PAAC2 (97.6%) | LPP1 | 85:15 | not added | 98.7 | 88.39 | <0.02 |
|  |  |  |  | added | 96.9 | 88.25 | 0.15 |
| F15 | PAA10 | LPP1 | 85:15 | not added | 98.4 | 88.49 | 0.02 |
|  |  |  |  | added | 96.7 | 88.43 | 0.34 |
| F16 | PAA11 | LPP1 | 85:15 | not added | 98.6 | 88.46 | <0.02 |
|  |  |  |  | added | 97.3 | 88.34 | <0.05 |

TABLE 1-continued

| Formulation | PAA solution | LPP solution | PAA/LPP solid ratio | Contamination source | VHR after 140 h | Pretilt θ₀ (°) after 140 h | Δθ (°) after 140 h +/− 3 mm |
|---|---|---|---|---|---|---|---|
| F17 | PAA12 (2.1%) PAAC2 (97.9%) | LPP1 | 85:15 | not added | 98.9 | 88.31 | 0.07 |
|  |  |  |  | added | 97.3 | 88.19 | 0.16 |
| F18 | PAA13 | LPP1 | 85:15 | not added | 99.0 | 88.30 | <0.02 |
|  |  |  |  | added | 96.7 | 88.22 | 0.09 |
| F19 | PAA14 | LPP1 | 85:15 | not added | 99.0 | 88.42 | <0.02 |
|  |  |  |  | added | 97.5 | 88.25 | 0.16 |
| F20 | PAA15 | LPP1 | 85:15 | not added | 98.8 | 88.42 | 0.00 |
|  |  |  |  | added | 97.0 | 88.29 | 0.29 |
| F21 | PAA4 | LPP5 | 93:7 | not added | 98.3 | 87.77 | <0.02 |
|  |  |  |  | added | 98.1 | 87.87 | <0.02 |
| Comparative 3 FC3 | PAAC2 | LPP5 | 93:7 | not added | 98.4 | 87.85 | <0.02 |
|  |  |  |  | added | 97.8 | 87.88 | 0.07 |
| F1 | PAA1 | LPP1 | 90:10 | not added | 98.1 | 88.28 | <0.02 |
|  |  |  |  | added | 97.8 | 88.20 | <0.05 |
| F2 | PAA2 | LPP1 | 90:10 | not added | 98.9 | 88.31 | <0.02 |
|  |  |  |  | added | 97.7 | 88.10 | <0.05 |
| F3 | PAA2 | LPP1 | 85:15 | not added | 98.9 | 88.35 | <0.05 |
|  |  |  |  | added | 98.0 | 88.28 | <0.05 |
| F4 | PAA2 | LPP2 | 90:10 | not added | 99.0 | 88.23 | <0.02 |
|  |  |  |  | added | 96.7 | 88.25 | 0.05 |
| F5 | PAA3 | LPP1 | 85:15 | not added | 99.1 | 88.35 | <0.02 |
|  |  |  |  | added | 97.9 | 88.29 | 0.08 |
| Comparative 1 FC1 | PAAC1 | LPP1 | 90:10 | not added | 99.1 | 88.29 | <0.02 |
|  |  |  |  | added | 97.3 | 88.16 | 0.17 |
| F6 | PAA4 | LPP1 | 90:10 | not added | 98.8 | 88.19 | <0.02 |
|  |  |  |  | added | 97.9 | 88.16 | <0.05 |
| F7 | PAA4 | LPP1 | 85:15 | not added | 98.7 | 88.29 | <0.02 |
|  |  |  |  | added | 97.0 | 88.22 | 0.06 |
| F8 | PAA4 | LPP3 | 85:15 | not added | 99.0 | 88.36 | <0.02 |
|  |  |  |  | added | 98.3 | 88.30 | <0.05 |
| F9 | PAA5 | LPP1 | 85:15 | not added | 98.8 | 88.30 | <0.02 |
|  |  |  |  | added | 97.3 | 88.15 | <0.05 |
| F10 | PAA4 | LPP4 | 90:10 | not added | 99.0 | 87.32 | <0.02 |
|  |  |  |  | added | 98.3 | 87.22 | <0.05 |
| Comparative 2 FC2 | PAAC2 | LPP1 | 85-15 | not added | 98.6 | 88.32 | <0.02 |
|  |  |  |  | added | 97.5 | 88.25 | 0.23 |
| F11 | PAA6 | LPP1 | 85:15 | not added | 98.9 | 88.32 | −0.06 |
|  |  |  |  | added | 96.9 | 88.27 | 0.16 |
| F12 | PAA7 | LPP1 | 85:15 | not added | 99.0 | 88.29 | −0.06 |
|  |  |  |  | added | 97.1 | 88.15 | 0.20 |
| F13 | PAA8 | LPP1 | 85:15 | not added | 98.9 | 88.24 | −0.08 |
|  |  |  |  | added | 97.7 | 88.18 | 0.05 |
| F14 | PAA9 | LPP1 | 2:83:15 | not added | 98.7 | 88.39 | −0.02 |
|  |  |  |  | added | 96.9 | 88.25 | 0.15 |
| F15 | PAA10 | LPP1 | 85:15 | not added | 98.4 | 88.49 | 0.02 |
|  |  |  |  | added | 96.7 | 88.43 | 0.34 |
| F16 | PAA11 | LPP1 | 85:15 | not added | 98.6 | 88.46 | −0.05 |
|  |  |  |  | added | 97.3 | 88.34 | <0.05 |
| F17 | PAA12 | LPP1 | 1.8:83.2:15 | not added | 98.9 | 88.31 | 0.07 |
|  |  |  |  | added | 97.3 | 88.19 | 0.16 |
| F18 | PAA13 | LPP1 | 85:15 | not added | 99.0 | 88.30 | −0.04 |
|  |  |  |  | added | 96.7 | 88.22 | 0.09 |
| F19 | PAA14 | LPP1 | 85:15 | not added | 99.0 | 88.42 | −0.02 |
|  |  |  |  | added | 97.5 | 88.25 | 0.16 |
| F20 | PAA15 | LPP1 | 85:15 | not added | 98.8 | 88.42 | 0.00 |
|  |  |  |  | added | 97.0 | 88.29 | 0.29 |
| F21 | PAA4 | LPP5 | 93:7 | not added | 98.3 | 87.77 | −0.05 |
|  |  |  |  | added | 98.1 | 87.87 | −0.01 |
| Comparative 3 FC3 | PAAC2 | LPP5 | 93.7 | not added | 98.4 | 87.85 | −0.04 |
|  |  |  |  | added | 97.8 | 87.88 | 0.07 |

As shown in table 1, the formulations according to the present invention stabilize the pre-tilt angle in case of contamination, without diminishing the electro-optical properties of the cell as for example the VHR. The Δθ of the formulations according to the present invention are much lower than those of the comparative examples. Comparative compositions FC1, FC2 and FC3 do not stabilize the pre-tilt angle of liquid crystal upon contamination with the acrylic resin. Stabilization of the pre-tilt angle upon contamination is reached also when an LPP based on a polysiloxane backbone is used or when the LPP contains monomers of formulae (Ia) or (Ib). This demonstrates that all photo-aligning materials can be used in the compositions according to the present invention. The skilled person could have not foreseen that the photoalignment compositions according to the present invention comprising a polymer would have a stabilizing effect on the pre-tilt angle of cells contaminated by an acrylic resin, without affecting the electro-optical properties of the cell, as for example the VHR.

The invention claimed is:
1. A liquid crystal photoalignment composition comprising:
- a photoaligning material that is not a polyimide and/or polyamic acid compound, comprising a photoalignment group selected from the group consisting of: cinnamate group, stilbene group, cyanostilbene group, coumarine group, quinolone group, azo group, chalcone group, mono- and di- acetylene groups; benzylidenephthalimidine group, benzylideneacetophene group, phenylenediacryloyl group; chromone group; chromene group and stilbazole group; wherein said photoalignment group can be substituted or unsubstituted; and
- a polyimide and/or polyamic acid compound, each comprising repeating structural units (Ia) and/or (Ib) and optionally comprising different repeating structural units (IIIa) and/or (IIIb);
- wherein the repeating structural units (Ia) and (Ib) are represented by formulae:

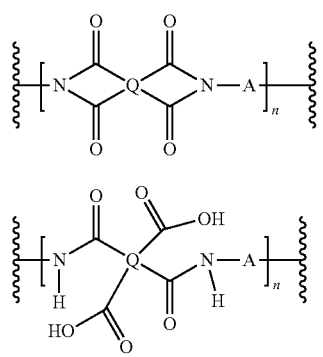

wherein Q is a tetravalent organic residue of a tetracarboxylic dianhydride which is selected from the group consisting of:
1,2,3,4-cyclobutanetetracarboxylic acid dianhydride;
1,2,3,4-cyclopentanetetracarboxylic acid dianhydride;
2,3,5-tricarboxycyclopentylacetic acid dianhydride;
tetrahydro-4,8-methanofuro[3,4-d]oxepin-1,3,5,7-tetrone;
3-(carboxymethyl)-1,2,4-cyclopentanetricarboxylic acid 1,4:2,3-dianhydride;
hexahydrofuro[3',4':4,5]cyclopenta[1,2-c]pyran-1,3,4,6-tetrone;
5-(2,5-dioxotetrahydrofuran-3-yl)-3-methyl-3-cyclohexene-1,2-dicarboxylic acid dianhydride;
pyromellitic acid dianhydride;
4-(2,5-dioxotetrahydrofuran-3-yl)tetrahydronaphthalene-1,2-dicarboxylic acid dianhydride;
5-(2,5-dioxotetrahydro-3-furanyl)-5-methyl-3a,4,5,9b-tetrahydronaphtho[1,2-c]furan-1,3-dione;
5-(2,5-dioxotetrahydro-3-furanyl)-3a,4,5,9b-tetrahydronaphtho[1,2-c]furan-1,3-dione;
5-(2,5-dioxotetrahydro-3-furanyl)-7-methyl-3a,4,5,7a-tetrahydro-2-benzofuran-1,3-dione;
4-tert-butyl-6-(2,5-dioxotetrahydro-3-furanyl)-2-benzofuran-1,3-dione;
4,4'-(hexafluorneoisopropylidene)diphthalic acid dianhydride;
bicyclo[2.2.2]oct-7-ene-2,3,5,6-tetracarboxylic acid dianhydride; and
tetrahydro-5,9-methano-1H-pyrano[3,4-d]oxepin-1,3,6,8(4H)-tetrone; and wherein n is ≥1; and wherein A is a divalent organic residue of a $H_2N$—A—$NH_2$ diamine represented by a compound of formula (IVa), (IVb), (IVc), (VIII), (IX), (XII), (XIII), (XIV), (XV), (XVIIIa) or (XVIIIb):

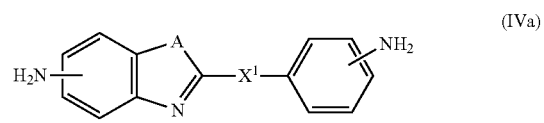

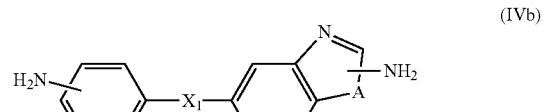

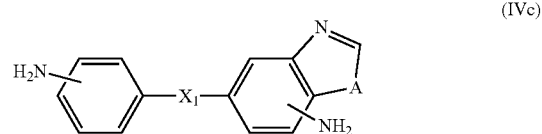

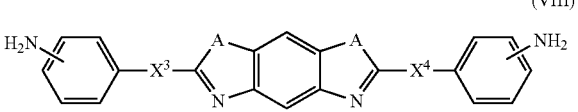

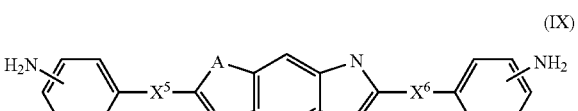

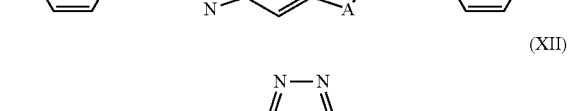

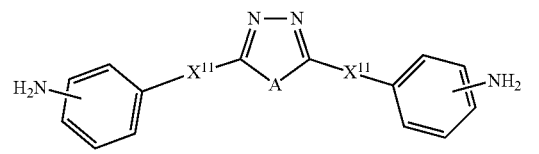

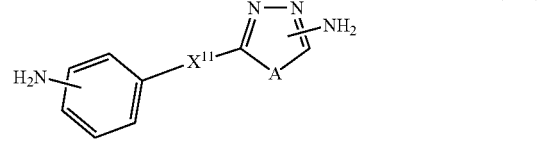

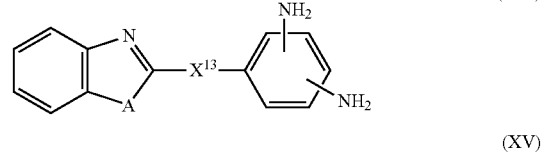

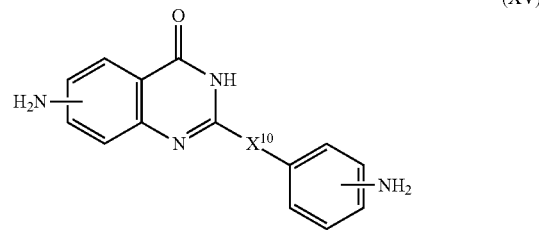

-continued

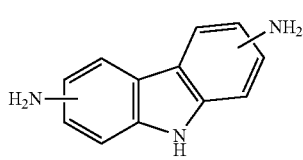
(XVIIIa)

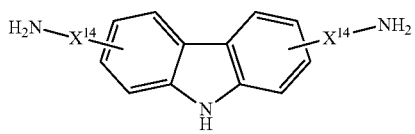
(XVIIIb)

wherein $X_1$, $X^1$, $X^3$, $X^4$, $X^5$, $X^6$, $X^{10}$, $X^{11}$, $X^{13}$ and $X^{14}$ are linking groups which are selected from a single bond, unsubstituted or mono- or poly-substituted $C_1$-$C_8$ alkylene; unsubstituted or mono- or poly-substituted phenyl, unsubstituted or mono- or poly-substituted naphthalene; unsubstituted or mono- or poly-substituted anthracene, or alkoxy groups; and wherein the substituent A of formulae (IVa), (IVb), (IVc), (VIII), (IX), (XII), (XIII) and (XIV) is selected from NH, CH$_2$, O or S; and wherein repeating structural units (IIIa) and (IIIb) are represented by formulae:

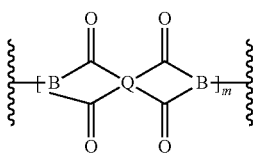
(IIIa)

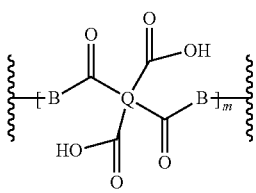
(IIIb)

wherein m is greater than 0; and wherein Q has the same meaning as defined above; and wherein Q in the repeating structural units of formula (IIIa) or (IIIb) is the same or different than in the repeating structural units of formula (Ia) or (Ib); and wherein B is a divalent diamine residue.

2. The liquid crystal photoalignment composition according to claim 1, wherein $X_1$, $X^1$, $X^3$, $X^4$, $X^5$, $X^6$, $X^{10}$, $X^{11}$, $x^{13}$ and $X^{14}$ are selected from a single bond or a straight-chain or branched, substituted or unsubstituted $C_1$-$C_8$ alkylene group, wherein one or more C-atom(s) may be substituted by a "bridging group" which is represented by a single bond, phenylene, cyclohexylene or —O—, and wherein the substituent A of formulae (IVa), (IVb), (IVc), (VIII), (IX), (XII), (XIII) and (XIV) is selected from NH, CH$_2$, O or S.

3. The liquid crystal photoalignment composition according to claim 1, wherein the H$_2$N—A—NH$_2$ diamine for the divalent organic residue for A in formulae (Ia) and (Ib) is selected from the following compounds:

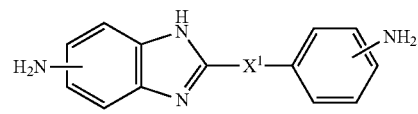
(IVa')

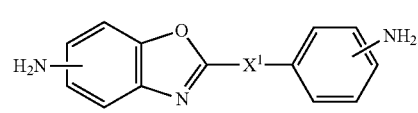
(IVa'')

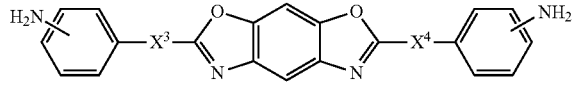
(VIII')

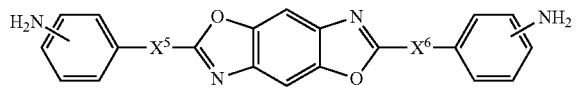
(IX')

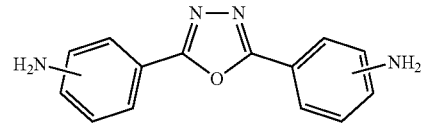
(XII')

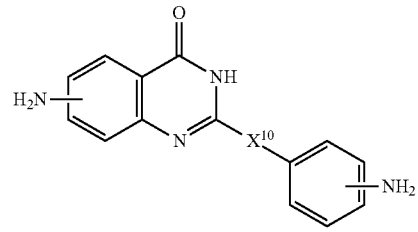
(XV')

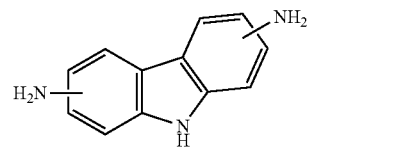
(XVIII')

4. The liquid crystal photoalignment composition according to claim 1, wherein the H$_2$N—A—NH$_2$ diamine is at least one of compounds of formulae (XIX), (XXI), (XXII), (XXIII), (XXIV), (XXV), and (XXVI):

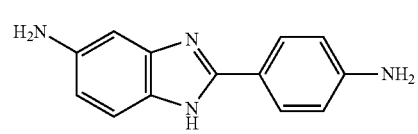
(XIX)

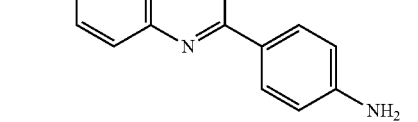
(XXI)

-continued

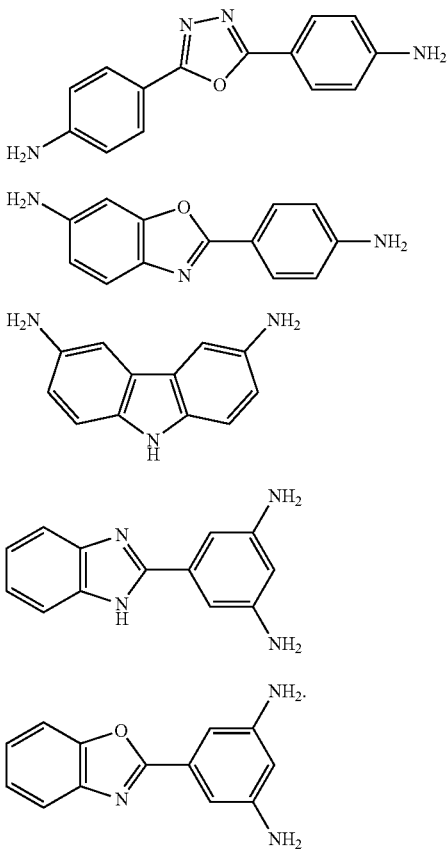

(XXII)

(XXIII)

(XXIV)

(XXV)

(XXVI)

5. The liquid crystal photoalignment composition according to claim 1, wherein the polyimide and/or polyamic acid compound each further comprise repeating structural units according to formulae (IIIa) or (IIIb).

6. The liquid crystal photoalignment composition according to claim 1, wherein the photoaligning material is a homopolymer or a copolymer.

7. The liquid crystal photoalignment composition according to claim 1, wherein the photoalignment group is selected from the group consisting of cinnamate group, cyanostilbene group, azo group and coumarine group.

8. The liquid crystal photoalignment composition according to claim 1, wherein the.

9. The liquid crystal photoalignment composition according to claim 1, wherein the unsubstituted, or mono- or poly-substituted $C_1$-$C_8$ alkylene group for $X_1$, $X^1$, $X^3$, $X^4$, $X^5$, $X^6$, $X^{10}$, $X^{11}$, $X^{13}$ and $X^{14}$ is methylene, ethylene, propylene, butylene or pentylene.

10. The liquid crystal photoalignment composition according to claim 1, further comprising a solvent or solvent mixture and optionally at least one additive.

11. A method of using the liquid crystal photoalignment composition according to claim 1, comprising:
orienting and stabilizing the pre-tilt angle of vertically aligned liquid crystals with the liquid crystal photoalignment composition.

12. A liquid crystal orientation layer comprising the liquid crystal photoalignment composition according to claim 1.

13. Structured or unstructured optical and electro-optical elements and devices comprising the liquid crystal orientation layer according to claim 12.

* * * * *